US007006978B2

(12) United States Patent
Lineberry et al.

(10) Patent No.: US 7,006,978 B2
(45) Date of Patent: Feb. 28, 2006

(54) METHOD AND SYSTEMS FOR DEVELOPING AN ACQUISITION INTEGRATION PROJECT PLAN

(75) Inventors: Susan S. Lineberry, Wilton, CT (US); Jannic Cheyns, London (GB); Ronald Herman, Fairfield, CT (US); Charles Crabtree, Monroe, CT (US)

(73) Assignee: General Electric Capital Corporation, Stamford, CT (US)

( * ) Notice: Subject to any disclaimer, the term of this patent is extended or adjusted under 35 U.S.C. 154(b) by 155 days.

(21) Appl. No.: 09/855,091

(22) Filed: May 14, 2001

(65) Prior Publication Data

US 2002/0169649 A1 Nov. 14, 2002

(51) Int. Cl.
*G06F 17/60* (2006.01)

(52) U.S. Cl. .......................................... 705/8
(58) Field of Classification Search ............... 705/26, 705/10, 8, 9; 703/2; 707/1, 8
See application file for complete search history.

(56) References Cited

U.S. PATENT DOCUMENTS

| 4,942,527 | A | | 7/1990 | Schumacher |
| 5,172,313 | A | | 12/1992 | Schumacher |
| 5,381,332 | A | | 1/1995 | Wood |
| 5,490,097 | A | * | 2/1996 | Swenson et al. ............... 703/2 |
| 5,548,506 | A | * | 8/1996 | Srinivasan ..................... 705/8 |
| 5,566,349 | A | | 10/1996 | Trout |
| 5,765,140 | A | * | 6/1998 | Knudson et al. ............... 705/9 |
| 5,826,252 | A | * | 10/1998 | Wolters et al. ................. 707/1 |
| 5,890,131 | A | * | 3/1999 | Ebert et al. .................... 705/7 |
| 5,893,074 | A | * | 4/1999 | Hughes et al. ................. 705/8 |
| 5,907,490 | A | * | 5/1999 | Oliver ........................... 700/90 |
| 5,920,873 | A | | 7/1999 | Van Huben et al. |
| 5,999,911 | A | * | 12/1999 | Berg et al. ..................... 705/9 |
| 6,088,693 | A | | 7/2000 | Van Huben et al. |
| 6,094,654 | A | | 7/2000 | Van Huben et al. |
| 6,233,537 | B1 | * | 5/2001 | Gryphon et al. ............... 703/1 |
| 6,240,395 | B1 | * | 5/2001 | Kumashiro ..................... 705/7 |
| 6,256,651 | B1 | * | 7/2001 | Tuli ............................. 715/526 |
| 6,256,773 | B1 | | 7/2001 | Bowman-Amuah |
| 6,343,265 | B1 | * | 1/2002 | Glebov et al. ................. 703/25 |
| 6,381,610 | B1 | * | 4/2002 | Gundewar et al. ........ 707/104.1 |

(Continued)

FOREIGN PATENT DOCUMENTS

WO WO 01/39083 A1 * 5/2001

OTHER PUBLICATIONS

Pyron, Tim, Using Microsoft Project 4 for Windows, 1994, QUE Corporation.*

(Continued)

*Primary Examiner*—Susanna M. Diaz
*Assistant Examiner*—Scott L. Jarrett
(74) *Attorney, Agent, or Firm*—Armstrong Teasdale LLP

(57) ABSTRACT

Systems and methods that facilitate integration of one corporate entity into another corporate entity are described herein. In one embodiment, a method in a computer for generating an acquisition integration project plan includes displaying a plurality of pre-defined integration events based upon at least one user selected integration area, each pre-defined integration event being associated with a phase in an acquisition process, displaying at least one user selected, pre-defined integration event for each user selected integration area, displaying at least one of a name of a person responsible, a due date, a completion percentage, and a commentary for each user selected, pre-defined integration event, and storing the user selected, pre-defined integration events and corresponding integration areas as an acquisition integration project plan.

67 Claims, 83 Drawing Sheets

U.S. PATENT DOCUMENTS

| | | | |
|---|---|---|---|
| 6,519,763 B1 * | 2/2003 | Kaufer et al. | 717/101 |
| 6,581,039 B1 * | 6/2003 | Marpe et al. | 705/7 |
| 6,671,692 B1 * | 12/2003 | Marpe et al. | 707/102 |
| 6,671,693 B1 * | 12/2003 | Marpe et al. | 707/102 |
| 6,678,698 B1 * | 1/2004 | Fredell et al. | 707/104.1 |
| 2002/0133384 A1 * | 9/2002 | Dimitruk et al. | 705/7 |
| 2003/0018510 A1 * | 1/2003 | Sanches | 705/9 |

OTHER PUBLICATIONS

Ernst & Young, Mergers & Acquisitions, 1994, John Wiley & Sons, Inc, Second Edition.*

Hammer, Katherine, In Depth—Post-Merger Integration, Jan. 2001.*

Pyron, Tim, Using Microsoft Project 4 for Windows, 1994, QUE Corporation, additional pages.*

Marren, Joseph, "Mergens & Acquisitions A Valuation Handbook", 1993, Business One Irwin.*

Milton L. Rock, Robert H. Rock, Martin Sikora, The Mergers and Acquisitions Handbook□□McGraw-Hill, 2 edition, Jan. 1, 1994, ISBN: 0070533539.*

Timothy J. Galpin, The Complete Guide to Mergers and Acquisitions : Process Tools to Support M&A Integration at Every Level (Jossy-Bass Business & Management Series), Jossey-Bass, Oct. 25, 1999, ISBN: 0787947865.*

Dennis Carey, Robert J. Aiello, Michael D. Watkins, Robert G. Eccles, Alfred Rappaport, Harvard Business Review on Mergers & Acquisitions, Harvard Business School Press, May 1, 2001, ISBN: 1578515556.*

Tim Pyron, Rod Gill, Laura Stewart, Melette Pearce, Winston Meeker, Toby Brown, Ira Brown, Jo ellen Shires, Using Microsoft Project 2000 (Special Edition), Que, Sep. 21, 2000, ISBN: 0789722534.*

Laura Brown, Integration Models: Templates for Business Transformation Sams, 1st edition, Sep. 22, 2000, ISBN: 067232055X.*

Price Pritchett, After the Merger: The Authoritative Guide for Integration Success, Revised Edition McGraw-Hill; 2 edition, May 1, 1997, ISBN: 0786312394.*

Alexandra Reed-Lajoux, The Art of M&A Integration: A Guide to Merging Resources, Processes and Responsibilities McGraw-Hill; 1 edition, Nov. 1, 1997, ISBN: 0786311274.*

Lajoux, Alexander Reed, The Art of M&A Integration—A Guide to Merging Resources, Processes & Responsibilities McGraw-Hill, 1998, ISBN: 0-7863-1127-4.*

Henderson. Gordo, Success isn't jut getting bigger Ivy Business, Quarerly, Autumn 1998, vol. 62, No. 1.*

Stevens, Larry, Trade in your to-do lists Government Computer News, Jun. 10, 1996, vol. 15, No. 12.*

Butler, Janet, Automating process trims software development fat Software Magazine, Aug. 1994, vol. 14, No. 8.*

International Searh Report dated May 13, 2002, Application No. PCT/US02/15365, 6 pages.

Pyron et al. "Microsoft Project 4 for Windows", Apr. 20, 1994, QUE Corporation.

Ernst & Young, Merger & Acquisitions, 1994, John Wiley & Sons. Inc., Second Edition.

* cited by examiner

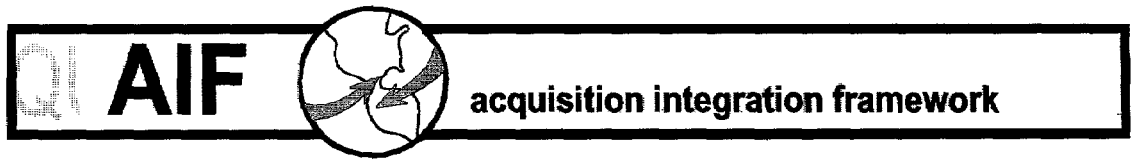

Advisory :

In order to become compliant with Web Security Procedures, we need to cancel generic passwords. Please take a moment and register your proper account. Meanwhile you will be added to our users distribution list, so we can keep you more effectively updated about coming AIF updates and enhancements.

User Name: [              ]

Password: [         ]  | Login |

Change Password

To request a User Name and Password, click here ⟶  | New Account |

If you have forgotten your Password, click here ⟶  | I Forgot |

This site has been accessed      times.

Send Feedback

To: AIF Feedback
From: demo
Comments:

Submit  Cancel

120

AIF Overview

The DMAIC Integration Process, Non-Negotiables, and The Features of the AIF

Background

Acquisition Integration is defined as the "Process of Preparing for and Assimilating a Newly Acquired Company or Portfolio into the    Family". Integration is the vehicle by which we realize the expected goals and benefits of our Acquisitions Because    does numerous acquisitions each year, integration needs to be a repeatable process. A structured approach to integration serves as a source of competitive advantage by providing a strategy for managing integration efforts from day one. In addition, the Acquisition Integration Framework tool facilitates the sharing of integration best practices and lessons learned. All of the    businesses can benefit from the collective knowledge of our acquisition integration experiences. The AIF tool was designed to greatly increasing the speed and success rate of our acquisitions by eliminating the need to "re-create the wheel" each time.

One important principle to the Acquisition Integration Framework is to understand that every integration is different. While you can surely benefit and learn from past integration experience, the success factors for one effort may not be relevant to another integration initiative. Similarly, you can't expect all    tools and processes to be equally applicable to every case. So, you must carefully evaluate the objectives set out by the GE leadership team and the characteristics of the new company to shape and customize the optimal integration approach.

Deliverables Checklists

- ☐ Integration Leader Appointed
- ☐ Steering Committee Appointed
- ☐ Participate in Define Toligate
- ☐ _____
- ☐ _____
- ☐ _____

- ☐ Introduce to the Management Team of the Target Company
- ☐ Assess the Key Players of the Management Team
- ☐ Present Board Presentation for Deal Approval
- ☐ Take Ownership for and Commit to Acheiving Deal Synergies
- ☐ Participate in Measure Toligate
- ☐ _____
- ☐ _____
- ☐ _____

- ☐ Participate in Integration Strategy Workshop
- ☐ Communicate with and Reassure the Employees
- ☐ Communicate with and Reassure the Customers
- ☐ Decide on Company Name and Logo
- ☐ Paticipate in and Analyze Toligate
- ☐ _____
- ☐ _____
- ☐ _____

- ☐ Participate in Day 1 Celebration
- ☐ Participate in Integration Kick-off Session
- ☐ Provide Coaching and Guidance to New Business Leader
- ☐ Monitor Progress of Integration
- ☐ Participate in Implement Toligate
- ☐ _____
- ☐ _____
- ☐ _____

- ☐ Participate in Control Toligate Close and Sign-off on Integration Project
- ☐ Celebrate Completion of Integration
- ☐ Promote Integration Leader into a New Position
- ☐ _____
- ☐ _____
- ☐ _____

| AIF Home | OverView | Dos/Don'ts | Contacts | Examples | Links | Project Plan |

Business Leader:
Due
Diligence Tools/Examples

AIDME Blue Presentation
Integration Excellence
Workshop

Business Leader:
Due Diligence Links

The    Story Presentation

Step 2100: Present an Overview    to Target Management

At the beginning of the due diligence, the    Business Leader should take the time to introduce his leadership team to the Target Company. Presenting an overview pitch on the due diligence process is helpful for the Target Company to understand what may be required of them and how the process will work.

This is also terrific time to get the key members of the Target Company excited about joining the    family. Giving an overview presentation on the history of    and its major accomplishments is recommended.

Example: Management presentations

Intellectual Property
Deliverables Checklists

| | | | |
|---|---|---|---|
| ☐ IP Integration Appointed | ☐ Participate in due diligence | ☐ IP Integration Team in place | ☐ Finalized IP Integration Plan and Budget |
| ☐ Scope of IP Integration - assessment of Importance of IP in transaction. Define key assumptions and "must have" underlying IP aspects of business case or synergies | ☐ "AS is" organizational chart | ☐ Meeting between Deal Team and IP Integration Team | ☐ Kick-off Meetings with Teams |
| | ☐ IP policy/procedure/best practices Gap Analysis | ☐ Refined list of goals/CTQ's | ☐ Responsibilities Assigned |
| | ☐ Outline of Integration Team structure | ☐ Post-acquisition IP organization chart | ☐ Progress Meetings |
| ☐ List of goals/CTQ's | ☐ Preliminary IP integration budget | ☐ Detailed IP Integration Plan with Measure | ☐ IP Integration Dashboards/ Scoreboards in Place |
| | | ☐ CEO sign-off | ☐ Milestones Achieved on Time |
| | | | ☐ IP Control Procedures |
| | | | ☐ Transition Plan |
| ☐ ☐ ☐ ☐ | ☐ ☐ ☐ | ☐ ☐ ☐ | ☐ ☐ ☐ |

| |
|---|
| ☐ Core IP process ownership and accountability in place |
| ☐ Conduct project closure meeting with business team |
| ☐ List of lessons learned |
| ☐ ☐ ☐ |

| AIF Home | OverView | Dos/Don'ts | Contacts | Examples | Links | Project Plan |

Intellectual Property:
All Tools/Examples

Intellectual Property:
All Links

Intellectual Property Overview

*Effective and timely intellectual property integration includes a multitude of tasks to be performed over a period of time. IP Integration is best achieved where these tasks are planned and initiated early in the acquisition time continuum. The earlier the planning, the better. For this reason, the IP integration framework described hereafter moves the planning tasks and the tasks associated with developing an effective plan and integration team, toward the front of the acquisition time continuum. For example, appointing an IP Integration Leader, performing Gap Analysis, defining an IP Integration structure and preparing an initial IP integration budget have all been placed in the measure or pre-signing step. Beginning early on all these tasks facilitates IP Integration. However, for any given acquisition, it may be appropriate for several reasons, to slip these tasks downstream in the acquisition time continuum. For example, some of these tasks, such as Gap Analysis or budget, may be performed in the post-signing/pre-closing or analyze phase. The key is that they are performed.*

*That said, however, the "define" phase should take place prior to due diligence. From an IP integration perspective, two main objectives need to be achieved prior to commencing the due diligence:*

1. An IP Integration Leader needs to be selected.
2. This IP Integration Leader needs to understand the IP aspects of the business case:
   - What role is IP expected to play during and after the transaction?
   - How are we going to implement the IP Objectives?

1000 DEFINE: Appoint IP Integration Leader to Perform IP Analysis

He or she will be part of or lead the due diligence team and be responsible for transitioning the knowledge to the IP Integration Team.

Deliverables for the define phase toligate include:

1. *IP Integration Leader Appointed*
2. *Scope of IP Integration - assessment of importance of IP in transaction. Define key assumptions and " must have" underlying IP aspects of business case or synergies.*
3. *List of goals/CTQ's*

| AIF Home | OverView | Dos/Don'ts | Contacts | Examples | Links | Project Plan |

Intellectual Property:
All Tools/Examples

Intellectual Property:
All Links

Intellectual Property Dos/Don'ts

DO

- Begin integration planning before due diligence
- Understand the relevance and importance of IP to the transaction
- Understand the IP health of the acquired company ... perform a Gap Analysis
- Develop strong cross functional IP integration expertise ... legal, engineering, human resources, security and so on
- Establish clear CTQ's and goals to direct the IP integration
- Involve employees from the acquired company in the integration

Don't

- Underestimate the cost of the IP integration
- Assume ___ has the best practices; look at the best practices of the acquired company
- Don't shy away from tough decisions

230

FIG. 15

Intellectual Property Integration Project Plan

250 ⟶

| Code | Steps/Task | Responsible | % Complete | Due Date | Comments |
|---|---|---|---|---|---|
| 1000 | Pre Due Diligence | | 0% | | |
| 1100 | Appoint IP Integration Leader | | | | |
| 1110 | Determine Job Requirements/Qualifications For IP Integration Leader | | | | |
| 1120 | Select IP Integration Leader | | | | |
| 1200 | Understand the Synergy/Significance of IP in the Transaction | | | | |
| 1210 | Review Available Information Relating to Intellectual Property of Target Company | | | | |
| 1220 | Capture IP Synergies and Significance of IP to the Transaction | | | | |
| 1300 | Define Preliminary IP Integration Scope, Goals and CTQ's | | | | |
| 1310 | Define Scope of IP Integration | | | | |
| 1320 | Capture IP Synergies and Significance of IP to the Transaction | | | | |
| 2000 | Due Diligence | | 0% | | |
| 2100 | IP Integration Leader to participate in Due Diligence Process | | | | |
| 2110 | Participate in IP Due Diligence Process as Appropriate | | | | |
| 2120 | Review IP Due Diligence Checklist | | | | |
| 2130 | Appoint IP Integration Leader | | | | |
| 2140 | Identify IP Red Flags | | | | |
| 2200 | IP Integration Leader to Understand the IP Facets of the Target Company | | | | |
| 2300 | Identify Target Company Current IP Organization and IP Leaders | | | | |
| 2310 | Map Current IP Organizational Structure, Identify IP Leadership & Reporting Structure | | | | |
| 2320 | Perform IP Management Assessment | | | | |
| 2400 | Perform IP Policy/Procedure/Best Practices Gap Analysis | | | | |
| 2410 | Review IP Policies/Procedures/Best Practices at Acquired Company | | | | |
| 2420 | Interview/Survey "IP Connected Functions" at Acquired Company | | | | |
| 2430 | Perform Gap Analysis and prepare Matrix of Gaps | | | | |
| 2440 | Prepare Plan to Close Gaps | | | | |
| 2500 | Define IP Integration Team Structure and Job Responsibilities | | | | |
| 2510 | Determine IP Integration Resource Requirements | | | | |
| 2520 | Determine Size and Composition of IP Integration Team | | | | |
| 2530 | Define Reporting Structure for IP Integration Team | | | | |
| 2540 | Ensure IP Integration Team Members are Both GE and Acquired Company | | | | |
| 2550 | Develop and Complete Integration Team Job Responsibilities | | | | |
| 2600 | Prepare Initial IP Integration project Budget | | | | |
| 2610 | Propose Initial IP Integration Budget | | | | |
| 2700 | Provide IP input into Transaction Document | | | | |
| 3000 | Post Sign / Pre Close | | 0% | | |
| 3100 | Appoint Dedicated IP Integration Team Resources | | | | |
| 3110 | Appoint IP Integration Functional Team Members | | | | |
| 3200 | Knowledge Hand Off to IP Integration Team | | | | |
| 3210 | Review Due Diligence Summary and List of Critical Action Items from Due Diligence Team for IP Action Items | | | | |
| 3220 | Review Contract Requirements and Critical Issues | | | | |
| 3300 | Refine IP Integration Scope, Goals and CTQ's | | | | |
| 3310 | Base on IP Gap Analysis, Refine IP Integration Scope, Goals and CTQ's | | | | |
| 3400 | Determine IP Resource needs for Post-Acquisition IP Organization and Select New IP Leaders | | | | |
| 3410 | Conduct IP Resource Studies and Select Key IP Leaders | | | | |
| 3500 | Define Post-Acquisition IP Organization Structure and Core Processes | | | | |
| 3510 | Generate Organization Chart (with names) for Post-Acquisition Organization | | | | |
| 3600 | Define Detailed IP Integration Plan by Function with Measures | | | | |
| 3610 | Prepare Functional IP Integration Plans | | | | |
| 3620 | Prioritize Tasks, Ensuring Elements Critical to Deals Synergies are Top Priority | | | | |

FIG. 17

Search AIF

Search for: [                    ]

[ Submit ] [ Cancel ]

―――――――――――――――

Note: This search may take up to several minutes.

| Integration Progress Report | Pre Due Diligence | Due Diligence | Post Sign-Pre Close | Post Close | Transition | Total | Comments |
|---|---|---|---|---|---|---|---|
| 1 Business Leader | 20% | 0% | | 0% | 0% | 20% | |
| 2 Integration Manager | 0% | 0% | 0% | 0% | 0% | 0% | |
| 3 Due Diligence Leader | 0% | 0% | 0% | | | 0% | |
| Commercial | | | | | | | |
| 5 Sales & Marketing | 0% | 0% | 0% | 0% | 0% | 0% | |
| 6 E-Commerce | 0% | 0% | 0% | 0% | 0% | 0% | |
| 7 Customer Service | 0% | 0% | 0% | 0% | 0% | 0% | |
| 8 Collections | 0% | 0% | 0% | 0% | 0% | 0% | |
| 9 Sourcing | 0% | 0% | 0% | 0% | 0% | 0% | |
| Operational | | | | | | | |
| 11 Manufacturing | 0% | 0% | 0% | 0% | 0% | 0% | |
| 12 Engineering | 0% | 0% | 0% | 0% | 0% | 0% | |
| 13 Logistics | 0% | 0% | 0% | 0% | 0% | 0% | |
| 14 EHS | 0% | 0% | 0% | 0% | 0% | 0% | |
| 15 Services | 0% | 0% | 0% | 0% | 0% | 0% | |
| 16 Risk | 0% | 0% | 0% | 0% | 0% | 0% | |
| 17 Six Sigma | 0% | 0% | 0% | 0% | 0% | 0% | |
| 18 Systems/IT | 0% | 0% | 0% | 0% | 0% | 0% | |
| HR | | | | | | | |
| 19 Communication | 0% | 0% | 0% | 0% | 0% | 0% | |
| 20 Culture | 0% | 0% | 0% | 0% | 0% | 0% | |
| 21 Strategy | 0% | 0% | 0% | 0% | 0% | 0% | |
| 22 Organization Development | 0% | 0% | 0% | 0% | 0% | 0% | |
| 23 Labor Relations | 0% | 0% | 0% | 0% | 0% | 0% | |
| 24 Employee Benefits | 0% | 0% | 0% | 0% | 0% | 0% | |
| 25 Compensation | 0% | 0% | 0% | 0% | 0% | 0% | |
| 27 Employment Practices | 0% | 0% | 0% | 0% | 0% | 0% | |
| 28 Payroll Benefits | 0% | 0% | 0% | 0% | 0% | 0% | |
| 29 Expatriate Administration | | | | 0% | 0% | 0% | |
| 30 Travel & Living Expenses | | | | 0% | 0% | 0% | |
| Legal | | | | | | | |
| 31 Legal | 0% | 0% | 0% | 0% | 0% | 0% | |
| 32 IP | 0% | 0% | 0% | 0% | 0% | 0% | |
| 33 Compliance | 0% | 0% | 0% | 0% | 0% | 0% | |
| Finance | | | | | | | |
| 34 Treasury | 0% | 0% | 0% | 0% | 0% | 0% | |
| 35 Euro Program | 0% | 0% | 0% | 0% | 0% | 0% | |
| 36 Financial Planning & Analysis | | | 0% | 0% | 0% | 0% | |
| 37 Closing | | | 0% | 0% | 0% | 0% | |
| 38 Tax | 0% | 0% | 0% | 0% | 0% | 0% | |
| 39 Controllership | | | 0% | 0% | 0% | 0% | |
| 40 Insurance | 0% | 0% | 0% | 0% | 0% | 0% | |

Business Leader Integration Project Plan

| Code | Steps/Task | Responsible | % Complete | Due Date | Comments |
|---|---|---|---|---|---|
| 1000 | Pre Due Diligence | | 20% | | |
| 1100 | Appoint Integration Leader | | | | |
| 1110 | Determine Job Requirements for IP Integration Leader | | 100% | | |
| 1120 | Appoint Integration Leader | | | | |
| 1200 | Assign Members to the Integration Steering Committee | | | | |
| 1300 | Participate in Define Tollgate | | | | |
| 2000 | Due Diligence | | 0% | | |
| 2100 | Present an Overview of ___ to Target Management | | | | |
| 2200 | Conduct Management Assessment of Key Players | | | | |
| 2300 | Present Board Presentation for Deal Approval | | | | |
| 2310 | Understand Overall Due Diligence Findings - Make Go/No Go Decision | | | | |
| 2320 | Prepare and Present Board Presentation for Deal Approval | | | | |
| 2400 | Assume Ownership for and Commit to Achieving Projected Deal Synergies | | | | |
| 2500 | Participate in Measure Tollgate | | | | |
| 3000 | Post Sign / Pre Close | | 0% | | |
| 3100 | Schedule & Participate in Integration Strategy | | | | |
| 3200 | Communicate with and Reassure Employee | | | | |
| 3300 | Communicate with and Reassure Customers | | | | |
| 3400 | Decide on Company Name and Logo | | | | |
| 3500 | Participate in Analyze Tollgate | | | | |
| 4000 | Post Close | | 0% | | |
| 4100 | Participate in Day 1 Celebration | | | | |
| 4200 | Approve Finalized Integration Plan & Budget | | | | |
| 4300 | Participate in Integration Kick-Off | | | | |
| 4400 | Provide Coaching & Guidance to New Business Leader | | | | |
| 4500 | Monitor progress of Integration | | | | |
| 4600 | Participate in Implement Tollgate | | | | |
| 5000 | Transition To Normal Operations | | 0% | | |
| 5100 | Participate in Control Tollgate | | | | |
| 5200 | Celebrate Completion of Integration | | | | |
| 5300 | Promote Integration Leader | | | | |

FIG. 20

Integration Manager Integration Project Plan

| Code | Steps/Task | Responsible | % Complete | Due Date | Comments |
|---|---|---|---|---|---|
| 1000 | Pre Due Diligence | | 0% | | |
| 1100 | Integration Leader Appoint | | | | |
| 1200 | Understand business case and projected synergies | | | | |
| 1210 | Read all information available on the business to be acquired | | | | |
| 1220 | Outline al project deal synergies to be achieved as a result of the acquisition | | | | |
| 1300 | Define Integration Goals, CTQ's and Project Charter | | | | |
| 1310 | Capture high level integration goals and determine degree of integration | | | | |
| 1320 | Outline deal and integration CTQ's | | | | |
| 1330 | Prepare high level integration project charter | | | | |
| 1400 | Conduct define tollgate | | | | |
| 2000 | Due Diligence | | 0% | | |
| 2100 | Participate in due diligence process | | | | |
| 2110 | Attend and Participate in Due Diligence | | | | |
| 2120 | Determine SWOT for Each Functional Area | | | | |
| 2130 | Identify Red Flags | | | | |
| 2140 | Validate Findings/Synergy Assumptions Among Functions | | | | |
| 2150 | Provide Integration Input to Deal Pro Forma and Audit Model | | | | |
| 2160 | Navigate Pre-Close Access for Integration Team | | | | |
| 2170 | Report on "Best Practices" and Review for Areas of Improvement | | | | |
| 2200 | Understand the business | | | | |
| 2210 | Understand risk assessment | | | | |
| 2220 | Understand legal/tax structure | | | | |
| 2230 | Understand reporting relationship with | | | | |
| 2240 | Understand Benefits Structure | | | | |
| 2300 | Identify Reporting Structure and Perform Leadership Assessment | | | | |
| 2310 | Map Current Organizational Structure, Identify Leadership & Reporting Structure | | | | |
| 2320 | Review management assessment | | | | |
| 2400 | Define Integration Team Structure and Complete Job Descriptions | | | | |
| 2410 | Determine Integration Resource Requirements | | | | |
| 2420 | Determine Size and Composition of Team | | | | |
| 2430 | Define Reporting Structure for Integration Team | | | | |
| 2440 | Ensure Team members are Both and Acquired Company | | | | |
| 2450 | Develop and Complete Integration Team Job Descriptions, Post | | | | |
| 2460 | Consider Use of Independent Parties | | | | |
| 2500 | Perform Cultural Assessment and Plan to Close Gaps | | | | |
| 2510 | Perform Cultural Assessment on Potential Acquiree | | | | |
| 2520 | Complete Cultural Gap Analysis and Develop Plan to Close Gaps | | | | |
| 2600 | Develop Preliminary Communication Plan | | | | |
| 2610 | Define Key Audiences and Messages for Communication | | | | |
| 2700 | Draft Plan | | | | |
| 2710 | Develop high level integration plan | | | | |
| 2720 | Develop High Level Integration Plan based on Knowledge Obtained during Due Diligence | | | | |
| 2730 | Ensure Plan Addresses all Critical CTQ's for Achieving Deal Synergies | | | | |
| 2800 | Determine High Level Integration Measures and Develop Integration Dashboards | | | | |
| 2810 | Prepare Initial Integration Project Budget | | | | |
| 2820 | Make Initial budget and Link to Costs in Model | | | | |
| 2900 | Conduct measure tollgate | | | | |
| 3000 | Post Sign / Pre Close | | 0% | | |
| 3100 | Appoint Dedicated Integration Team Resources | | | | |

Integration Manager Integration Project Plan

| Code | Steps/Task | Responsible | % Complete | Due Date | Comments |
|---|---|---|---|---|---|
| 3110 | Interview Potential Integration Members | | | | |
| 3120 | Assign Dedicated Integration Team Resources | | | | |
| 3200 | Knowledge Hand Off to Integration Team | | | | |
| 3210 | Review Copy of Due Diligence Summary & List of Critical Action Items from Due Diligence Team | | | | |
| 3220 | Review Contact Matrix and Critical Issues from Legal | | | | |
| 3230 | Understand how Value will be Created | | | | |
| 3240 | Understand Deal Assumptions and Sensitivity Analysis | | | | |
| 3250 | Understand Deal Purchase Cost | | | | |
| 3260 | Understand Cost of Integration | | | | |
| 3270 | Understand Deal Risk Assessment and Mitigation Plans | | | | |
| 3280 | Understand Tax/Legal Structure | | | | |
| 3290 | Understanding Reporting Relationship with | | | | |
| 3300 | Participate in Integration Strategy Workshop | | | | |
| 3400 | Determine "To Be" Organizational Structure to Ensure Synergies are Achieved | | | | |
| 3500 | Complete Detailed Integration Plan by Function with Measures | | | | |
| 3510 | Prepare Functional Integration Plans | | | | |
| 3520 | Prioritize Tasks, Ensuring Critical Elements to Achieve Deal Synergies are Top Priority | | | | |
| 3530 | Agree on Dependencies between Functions | | | | |
| 3540 | Prepare Multigenerational Integration Project Plan | | | | |
| 3550 | Determine Key Milestone Dates and Major Deliverables | | | | |
| 3560 | Identify Functional Integration Measures to Monitor Success | | | | |
| 3570 | Ensure Functional Operational Leadership Ownership and Buy-in to Plans | | | | |
| 3580 | Analyze Other Completion Risks and Develop Mitigation Plans | | | | |
| 3600 | Finalize communication plans and mechanisms | | | | |
| 3610 | Finalize Communications Plans for Internal and External Purposes | | | | |
| 3620 | Establish Integration Team Communication Mechanisms | | | | |
| 3700 | Ensure Active CEO Sponsorship from Both Companies | | | | |
| 3800 | Conduct analyze tollgate | | 0% | | |
| 4000 | Post Close | | | | |
| 4100 | Hold Integration Kick-Off Session with Acquired Company | | | | |
| 4200 | Finalize Integration Scope and Budget - Align to SI/SII Plan | | | | |
| 4210 | Finalize Overall Integration Charter and Goals | | | | |
| 4220 | Perform Resource Analysis | | | | |
| 4230 | Finalize Integration Budget and align with SI/SII Proformas | | | | |
| 4300 | Conduct Integration Team Orientation and Training | | | | |
| 4310 | Hold Team Building Event | | | | |
| 4320 | Orient Integration Team and Establish Roles and Responsibilities | | | | |
| 4330 | Review Functional Detailed Project Plans with Other Team Members | | | | |
| 4340 | Organize Specialized Training for Team Members (if required) | | | | |
| 4400 | Execute Integration | | | | |
| 4500 | Utilize Management Monitoring Mechanisms to Ensure Deal Synergies are Achieved | | | | |
| 4510 | Implement Status Reporting Tools to Monitor Progress | | | | |
| 4520 | Implement Issue Logs and Issue Management Procedures | | | | |
| 4530 | Establish Project Control Process | | | | |
| 4540 | Conduct Regular Status Meetings with Integration Teams | | | | |
| 4550 | Continue to Conduct Regular Status Meetings with Steering Committee | | | | |
| 4560 | Implement Performance Tracking Mechanisms to Ensure Deal Synergies | | | | |
| 4600 | Elicit Voice of the Employee & Establish Means for Obtaining VOE Baseline | | | | |
| 4700 | Evaluate Performance of Team Members | | | | |
| 4710 | Establish Regular Feedback Mechanism to Team Members | | | | |

Integration Manager Integration Project Plan

| Code | Steps/Task | Responsible | % Complete | Due Date | Comments |
|---|---|---|---|---|---|
| 4720 | Conduct 360 Degree Performance Feedback | | | | |
| 4800 | Establish Transition Plan to Operations | | | | |
| 4810 | Benchmark Against Baseline Measures, identify gaps and establish plan to close | | | | |
| 4820 | Establish Ownership for Transition | | | | |
| 4900 | Conduct Improve tollgate | | | | |
| 5000 | Transition To Normal Operations | | 0% | | |
| 5100 | Implement Control Monitoring Mechanisms | | | | |
| 5110 | Conduct Post Integration Assessment to Ensure Policies and Culture are Institutionalized | | | | |
| 5200 | Conduct Project Closure Meeting/Tollgate and Formally Transition to Business | | | | |
| 5210 | Conduct Project Closure Meeting/Tollgate | | | | |
| 5220 | Close Integration Project | | | | |
| 5230 | Review Final Project Evaluation | | | | |
| 5240 | Receive Final Project Execution Sign-Off | | | | |
| 5300 | Conduct post Integration Employee Survey and Measure Against VOE Baseline | | | | |
| 5400 | Capture Lessons Learned and Communicate Integration Successes | | | | |
| 5500 | Communicate and celebrate integration successes | | | | |
| 5600 | Promote Integration Team members into the Business | | | | |

FIG. 23

Due Diligence Leader Integration Project Plan

| Code | Steps/Task | Responsible | % Complete | Due Date | Comments |
|------|------------|-------------|------------|----------|----------|
| 1000 | Pre Due Diligence | | 0% | | |
| 1100 | Decide who is on the DD Team | | | | |
| 2000 | Due Diligence | | 0% | | |
| 2100 | Perform Business & Legal Due Diligence | | | | |
| 2200 | Identify and Outline Deal Synergies | | | | |
| 2300 | Accumulate Integration Issues | | | | |
| 2400 | Confirm Feasibility if Integration Cost and Costs | | | | |
| 2500 | Complete Due Diligence Report Including Integration Issues | | | | |
| 3000 | Post Sign / Pre Close | | 0% | | |
| 3100 | Conduct Knowledge Hands Off Meeting | | | | |

Sales Marketing Integration Project Plan

| Code | Steps/Task | Responsible | % Complete | Due Date | Comments |
|---|---|---|---|---|---|
| 1000 | Pre Due Diligence | | 0% | | |
| 1100 | Appoint Functional Expert for Due Diligence | | | | |
| 2000 | Due Diligence | | 0% | | |
| 2100 | Assess Integration Objectives and Value Drivers | | | | |
| 2110 | Review Acquisition Objectives | | | | |
| 2120 | Define Sales & Marketing Objectives | | | | |
| 2130 | Define priorities & non-negotiables | | | | |
| 2200 | Assess Marketing & Sales Strategies, Resources & Processes | | | | |
| 2210 | Assess Product Lines and Management | | | | |
| 2220 | Assess Sales and Marketing Organization | | | | |
| 2221 | Analyze Sales Force Structure | | | | |
| 2222 | Identify Key Sales Personnel | | | | |
| 2223 | Analyze Distributor/Agent Structure | | | | |
| 2224 | Analyze Other Sales & Marketing Channels | | | | |
| 2225 | Identify Current Training Activities | | | | |
| 2230 | Evaluate Synergies and Opportunities | | | | |
| 2300 | Assess master Brands and Sub-Brands | | | | |
| 2310 | Review Due Diligence Materials and Brand Policies | | | | |
| 2320 | Identify All Brands Used By Both Companies | | | | |
| 2330 | Assess Brand Strength, Coverage, Consistency and Overlap across Markets and Segments | | | | |
| 2400 | Develop branding transition strategy for deal team | | | | |
| 2410 | Synergy opportunities | | | | |
| 2420 | Branding strategy | | | | |
| 2430 | Develop Interim Brand Strategy Action Plan | | | | |
| 3000 | Post Sign / Pre Close | | 0% | | |
| 3100 | Understand company Position in Marketplace | | | | |
| 3110 | Get Voice of the Customer and Market Data | | | | |
| 3120 | Conduct research to understand position and perception | | | | |
| 3200 | Evaluate Market Dynamics and Customer Segmentation | | | | |
| 3210 | Overall assessment of the marketplace | | | | |
| 3220 | Identify and assess market segments | | | | |
| 3230 | Identify similarities & differences | | | | |
| 3240 | Identify and Compare Customer Groups | | | | |
| 3241 | Compare definitions of customer groups | | | | |
| 3250 | Evaluate risks and opportunities | | | | |
| 3251 | Identify compliance risks | | | | |
| 3300 | Evaluate Sales Force and/or Go-to-Market Channels | | | | |
| 3310 | Evaluate Sales Force Structure | | | | |
| 3320 | Assess Effectiveness of Sales Force | | | | |
| 3330 | Identify Key Sales Personnel | | | | |
| 3340 | Evaluate Compensation and Benefits | | | | |
| 3350 | Analyze and Screen Go-to-Market Channels | | | | |
| 3360 | Define Channel Integration Strategy | | | | |
| 3370 | Identify Opportunities for Selling Existing Products | | | | |
| 3400 | Evaluate Product/Services & Pricing | | | | |
| 3410 | Determine Desired Level of Integration for Product Lines | | | | |
| 3420 | Review Multi-Generational Product Plans (MGPP) and Any Plans for New or Enhanced Products | | | | |
| 3430 | Identify Potential Product Overlaps between Companies | | | | |
| 3440 | Assess Pricing Models and Applications | | | | |
| 3450 | Perform a profitability assessment | | | | |
| 3460 | Identify Risks of Product Lines Integration | | | | |

FIG. 26

Sales Marketing Integration Project Plan

| Code | Steps/Task | Responsible | % Complete | Due Date | Comments |
|---|---|---|---|---|---|
| 3470 | Develop Integration Product Line and Pricing Plan Determine Product Line and Development Synergy Opportunities | | | | |
| 3500 | Evaluate marketing communications activities | | | | |
| 3510 | Evaluate Existing Communication Plan | | | | |
| 3520 | Determine desired brand positioning and strategy | | | | |
| 3530 | Understand Company Objectives and Target Audiences | | | | |
| 3540 | Assess Customer and Competition Response | | | | |
| 3550 | Develop Messaging Strategy | | | | |
| 3560 | Develop Communications tactics and Plan | | | | |
| 3570 | Establish Measurement & Feedback System | | | | |
| 3600 | Assess Marketing Information Management | | | | |
| 3610 | Identify/assess how information is held | | | | |
| 3620 | Assess database analysis capabilities | | | | |
| 3630 | Evaluate marketing research process | | | | |
| 3640 | Evaluate Information management Compliance Processes | | | | |
| 3700 | Evaluate Sales & Marketing Resources & Process Synergies | | | | |
| 3710 | Review due diligence results | | | | |
| 3720 | Develop high level map of key processes | | | | |
| 3721 | Assess marketing planning process | | | | |
| 3722 | Assess planning and reporting | | | | |
| 3723 | Assess sales forecasting process | | | | |
| 3724 | Assess supplier management process | | | | |
| 3725 | Assess Product Management process | | | | |
| 3730 | Determine Degree of Infrastructure and Organizational Alignment | | | | |
| 3740 | Assess Sales & Marketing Organization | | | | |
| 3741 | Define marketing organization structure | | | | |
| 3750 | Estimate process & resources synergies | | | | |
| 3800 | Develop Integrated Action Plan | | | | |
| 3810 | Establish Criteria & Objectives | | | | |
| 3820 | Develop Integrated Action Plan | | | | |
| 3830 | Determine new Structure and Alignment | | | | |
| 3840 | Establish measurement & performance system | | | | |
| 3850 | Determine resources and skill requirements | | | | |
| 3900 | Gain Management Support & Stakeholder Buy In | | | | |
| 3910 | Obtain Authorization for Resources | | | | |
| 3920 | Hold Kick Off workshop to review acquisition objectives and action plan | | | | |
| 4000 | Post Close | | 0% | | |
| 4100 | Announce New Sales & Marketing Strategies | | | | |
| 4110 | Roll-out Integrated Channels | | | | |
| 4120 | Implement Integrated product Line and Management | | | | |
| 4130 | Implement Integrated Pricing Strategy | | | | |
| 4140 | Implement Integrated Brand Strategy | | | | |
| 4150 | Implement Integrated Marketing Communications | | | | |
| 4160 | Deploy Integrated Sales Force | | | | |
| 4170 | Implement Integrated Product Development plan | | | | |
| 4180 | Implement Integrated Data Management, Market Research and Intelligence | | | | |
| 4200 | Training of Sales Force and Channel Distribution | | | | |
| 4210 | Define Current Training Activities | | | | |
| 4220 | Determine Training Requirements | | | | |
| 4230 | Train Sales Force | | | | |
| 4300 | Set Sales & Marketing Measurements and Milestones | | | | |

Sales Marketing Integration Project Plan

| Code | Steps/Task | Responsible | % Complete | Due Date | Comments |
|------|------------|-------------|------------|----------|----------|
| 4310 | Create Dashboard | | | | |
| 4320 | Design Performance Measurement | | | | |
| 4400 | Manage Resources and Assess Processes | | | | |
| 5000 | Transition To Normal Operations | | 0% | | |
| 5100 | Implement Monitoring Mechanisms | | | | |
| 5200 | Integrate Sales Planning & Report | | | | |
| 5210 | Integrate Forecasting | | | | |
| 5300 | Transition to Operations | | | | |

FIG. 27

E-Commerce Integration Project Plan

| Code | Steps/Task | Responsible | % Complete | Due Date | Comments |
|---|---|---|---|---|---|
| 1000 | Pre Due Diligence | | 0% | | |
| 1100 | Appoint E Expert for Due Diligence | | | | |
| 2000 | Due Diligence | | 0% | | |
| 2100 | Review & Map E Business Process & Perform Gap Analysis | | | | |
| 2110 | Review Current E Business Strategy | | | | |
| 2120 | Review Current E Business Performance Measurements | | | | |
| 2130 | E Business Targets | | | | |
| 2140 | Estimate Synergies in E Business Processes between Target and | | | | |
| 2200 | Assess E Business Organization & Structure | | | | |
| 2300 | Review Existing E Business Policies | | | | |
| 2400 | Review Analysis of Current Reporting | | | | |
| 2500 | Review & Assess Current Technology | | | | |
| 2600 | Measure Expenses by Major Categories | | | | |
| 2610 | Operating Costs for E Business | | | | |
| 2620 | Create Integration Budget | | | | |
| 3000 | Post Sign / Pre Close | | 0% | | |
| 3100 | Assign E-business Integration Leader | | | | |
| 3200 | Select E-Business Integration Team Members | | | | |
| 3300 | Establish E Goals | | | | |
| 3400 | Determine "To Be" process and Strategies | | | | |
| 3410 | Build Strategy for E Business | | | | |
| 3420 | Set Productivity Goals/Establish Targets | | | | |
| 3430 | Document New Procedures | | | | |
| 3500 | Determine "To Be" Organizational Structure | | | | |
| 3510 | Designing "To Be" Organization Chart | | | | |
| 3520 | Complete Job Profiles for E Business Personnel | | | | |
| 3530 | Identify Training Needs for E Business | | | | |
| 3540 | Plan Training | | | | |
| 3550 | Develop Reward & Recognition Program for E Business | | | | |
| 3600 | Develop Measurement and Reporting | | | | |
| 3700 | Develop High Level E Business Integration Plan | | | | |
| 3710 | Close Gaps - Prioritize Opportunities/Issues | | | | |
| 4000 | Post Close | | 0% | | |
| 4100 | Finalize Detailed Integration Plan | | | | |
| 4200 | Implement "To Be" Process and Technology | | | | |
| 4300 | Implement New Organizational Structure | | | | |
| 4400 | Conduct Training | | | | |
| 4500 | Implement E Business Dashboards | | | | |
| 4600 | Establish Transition Plan | | | | |
| 5000 | Transition To Normal Operations | | 0% | | |
| 5100 | Transition To Process Owner | | | | |
| 5200 | Monitor E-Business Dashboards | | | | |
| 5300 | Ongoing Training and Update | | | | |
| 5400 | Project Documentation Completed, Approved and Archived | | | | |
| 5500 | Capture Lessons Learned | | | | |
| 5600 | Celebrate and Communicate Successes | | | | |

Customer Services Integration Project Plan

| Code | Steps/Task | Responsible | % Complete | Due Date | Comments |
|---|---|---|---|---|---|
| 1000 | Pre Due Diligence | | 0% | | |
| 1100 | Appoint Functional Expert for Due Diligence | | | | |
| 1200 | Investigate Local Rules and Trends in Industry | | | | |
| 2000 | Due Diligence | | 0% | | |
| 2100 | Review & Map "As-Is" Customer Service Processes and Perform Gap Analysis | | | | |
| 2110 | Measure current customer service levels | | | | |
| 2120 | Review service targets and compare to current levels of service | | | | |
| 2130 | Estimate synergies in customer service processes between Target and | | | | |
| 2200 | Collect Information on Customer Needs | | | | |
| 2210 | Assess Service Offerings | | | | |
| 2220 | Understand customer needs and satisfaction levels | | | | |
| 2230 | Review CCRP | | | | |
| 2240 | Assess risk of losing customers/revenue | | | | |
| 2250 | Customer/Distribution channel overlap | | | | |
| 2300 | Review Legal and Contractual Requirements | | | | |
| 2400 | Assess Customer Service Organization and Structure | | | | |
| 2500 | Review Current Technology | | | | |
| 2600 | Analyze Expenses by Major Categories | | | | |
| 2610 | Operations costs for customer service | | | | |
| 2620 | Create integration budget | | | | |
| 3000 | Post Sign / Pre Close | | 0% | | |
| 3100 | Select Customer Service Integration Leader | | | | |
| 3200 | Select Customer Service Integration Team Members | | | | |
| 3300 | Establish Customer Service Integration Goals | | | | |
| 3400 | Determine "To Be" Process & Strategy | | | | |
| 3410 | Build strategy for customer service | | | | |
| 3420 | Design "To Be" Process | | | | |
| 3430 | Set productivity goals/establish targets | | | | |
| 3440 | Document new procedures | | | | |
| 3500 | Determine "To Be" Organizational Structure | | | | |
| 3510 | Designing "To Be" Organizational Chart | | | | |
| 3520 | Complete Job profiles for Customer Service Personnel | | | | |
| 3530 | Identify Training Needs for Customer Service | | | | |
| 3540 | Plan Training | | | | |
| 3550 | Conduct Capacity Planning | | | | |
| 3560 | Develop Reward & Recognition Program for Customer Service | | | | |
| 3570 | Develop Measurements, Reporting and Dashboards | | | | |
| 3600 | Establish Customer Communication Plan | | | | |
| 3700 | Develop High Level Integration Plan | | | | |
| 3770 | Close Gaps - Prioritize Opportunities/Issues | | | | |
| 4000 | Post Close | | 0% | | |
| 4100 | Finalize Detailed Integration Plan | | | | |
| 4200 | Implement "To Be" Processes and New Technology | | | | |
| 4300 | Implement New Organizational Structure | | | | |
| 4400 | Conduct Training | | | | |
| 4500 | Implement Customer Service Dashboards | | | | |
| 4600 | Appoint Process Owner and Establish Transition Plan | | | | |
| 5000 | Transition To Normal Operations | | 0% | | |
| 5100 | Transition To Process Owner | | | | |
| 5200 | Monitor Customer Service Dashboards Continuously | | | | |
| 5300 | Ongoing Training and Updates | | | | |
| 5400 | Project Documentation Completed, Approved and Archieved | | | | |
| 5500 | Celebrate and Communicate Success/Capture Lessons Learned | | | | |

FIG. 30

| Code | Steps/Task | Responsible | % Complete | Due Date | Comments |
|---|---|---|---|---|---|
| | Collections Integration Project Plan | | | | |
| 1000 | Pre Due Diligence | | 0% | | |
| 1100 | Appoint Functional Expert for Due Diligence | | | | |
| 1200 | Investigate Local Rules and Trends in Industry | | | | |
| 2000 | Due Diligence | | 0% | | |
| 2100 | Review & Map "As-Is" Collections Processes/Procedures & Perform Gap Analysis | | | | |
| 2110 | Review Current Collections Strategy | | | | |
| 2120 | Review Current Collection Performance Measurements | | | | |
| 2130 | Collections Target | | | | |
| 2140 | Estimate Synergies in Collection Processes between Target and | | | | |
| 2200 | Assess Collection Organization and Structure | | | | |
| 2300 | Review Existing Collection Policies and Procedures | | | | |
| 2310 | Review Collection Procedures Manual | | | | |
| 2320 | Review Reserving Methodology and Write-Off procedures | | | | |
| 2330 | Review Credit Line Approval and Authorizations Procedures | | | | |
| 2340 | Review Current Reporting, Tracking and Monitoring Mechanisms | | | | |
| 2350 | Review Current Delinquency Forecasting Models | | | | |
| 2400 | Analyze Performance of Existing Portfolio (in Conjunction with Risk or Finance Team) | | | | |
| 2410 | Analyze Delinquency and Aging of Portfolio | | | | |
| 2420 | Analyze History of Write-Offs and Recoveries | | | | |
| 2430 | Analyze Debt in Suspense | | | | |
| 2440 | Determine Impact on Income Statement and Balance Sheet when Applying GAP | | | | |
| 2450 | Conduct Analysis of Current Reporting | | | | |
| 2500 | Review an Assess Current Reporting | | | | |
| 2600 | Assess Legal/Contractual Requirements | | | | |
| 2700 | Review and Assess Use of Outside Suppliers | | | | |
| 2800 | Measure Expenses by Major Categories | | | | |
| 2810 | Operating Costs for Collections/Fee Income | | | | |
| 2820 | Create Integration Budget | | | | |
| 3000 | Post Sign / Pre Close | | 0% | | |
| 3100 | Assign Collections Integration leader | | | | |
| 3200 | Select Collections Integration team members | | | | |
| 3300 | Establish Collections Integration Goals | | | | |
| 3400 | Determine "To Be" Process and Strategy | | | | |
| 3410 | Build Strategy for Collections | | | | |
| 3420 | Design "To Be" Process | | | | |
| 3430 | Set Productivity Goals/Establish Targets | | | | |
| 3440 | Document New Procedures | | | | |
| 3500 | Determine "To Be" Organizational Structure | | | | |
| 3510 | Designing "To Be" Organization Chart | | | | |
| 3520 | Complete Job Profiles for Collections Personnel | | | | |
| 3530 | Identify Training Needs for Collections | | | | |
| 3540 | Plan training | | | | |
| 3550 | Conduct Capacity Planning | | | | |
| 3600 | Develop Reward & Recognition Program for Collections | | | | |
| 3600 | Develop Measurements and Reporting | | | | |
| 3700 | Develop High level Collections Integration Plan | | | | |
| 3710 | Close Gaps, Prioritize Opportunities/Issues | | | | |
| 4000 | Post Close | | 0% | | |
| 4100 | Finalize Detailed Integration Plan | | | | |
| 4200 | Implement "To Be" Processes and New Technology | | | | |
| 4300 | Implement new Organizational Structure | | | | |

Collections Integration Project Plan

| Code | Steps/Task | Responsible | % Complete | Due Date | Comments |
|---|---|---|---|---|---|
| 4400 | Conduct Training | | | | |
| 4500 | Implement Collections Dashboard | | | | |
| 4600 | Establish Transition Plan | | | | |
| 5000 | Transition To Normal Operations | | 0% | | |
| 5100 | Transition to Process Owner | | | | |
| 5200 | Monitor Collections Dashboards Continuously | | | | |
| 5300 | Ongoing Training and Updates | | | | |
| 5400 | Project Documentation Completed, Approved and Archived | | | | |
| 5500 | Capture Lessons Learned | | | | |
| 5600 | Celebrate and Communicate Success | | | | |

FIG. 31

Sourcing Integration Project Plan

| Code | Steps/Task | Responsible | % Complete | Due Date | Comments |
|---|---|---|---|---|---|
| 1000 | Pre Due Diligence | | 0% | | |
| 1100 | Appoint Integration Leader & Identify Team Resources | | | | |
| 1110 | Appoint an Integration Leader | | | | |
| 1120 | Identify Team Resources | | | | |
| 1200 | Understand Business Case and Project Synergies | | | | |
| 1210 | Review Acquisition Business Case and Integration Goals | | | | |
| 1220 | First Cut at Functional Synergies | | | | |
| 1300 | Assign Resources and Timing to Project Plan | | | | |
| 2000 | Due Diligence | | 0% | | |
| 2100 | Pass Data Request to Target | | | | |
| 2200 | Review Information During Due Diligence | | | | |
| 2210 | Identify Key Talent - Coordinate with HR | | | | |
| 2220 | Validate Synergy Assumptions | | | | |
| 2230 | Validate Sustaining Processes - Coordinate with IT and e-commerce Teams | | | | |
| 2300 | Complete the Data Document Summary | | | | |
| 3000 | Post Sign / Pre Close | | 0% | | |
| 3100 | Finalize Synergies and Savings | | | | |
| 3110 | Compare Supply Base and Pricing | | | | |
| 3120 | Develop To-Be Organization | | | | |
| 3130 | Identify Impact on Operational Costs | | | | |
| 3140 | Identify Adaptable Best Practices | | | | |
| 3150 | Identify To-Be Sustaining Processes - Coordinate with IT and e-Commerce | | | | |
| 3200 | Develop Action Plan | | | | |
| 3210 | Consolidate Contract | | | | |
| 3220 | Plan Organizational Changes - Coordinate with HR | | | | |
| 3230 | Consolidate Sustaining Processes - Coordinate with IT and e-Commerce | | | | |
| 4000 | Post Close | | 0% | | |
| 4100 | Execute Action Plan | | | | |
| 4200 | Execute Communication Plan | | | | |
| 4300 | Implement Sustaining Processes | | | | |
| 5000 | Transition To Normal Operations | | 0% | | |
| 5100 | Validate Savings and Sustaining Processes | | | | |
| 5200 | Close Treaties and Risks | | | | |
| 5300 | Document Lessons Learned | | | | |
| 5400 | Transition Ownership to the Business | | | | |

FIG. 32

Manufacturing Integration Project Plan

| Code | Steps/Task | Responsible | % Complete | Due Date | Comments |
|---|---|---|---|---|---|
| 1000 | Pre Due Diligence | | 0% | | |
| 1100 | Select Qualified Manufacturing Manager for Due Diligence and Potentially Integration | | | | |
| 1110 | Identify and Establish Manufacturing Team Leader | | | | |
| 1120 | Identify Manufacturing Team Members | | | | |
| 1200 | Define Goals and Estimate Synergies | | | | |
| 1210 | Review Acquisition Scope | | | | |
| 1220 | Define Manufacturing Goals and Targets | | | | |
| 1230 | Assess First-Cut Plant Synergies and Assign $ Value | | | | |
| 1240 | Establish Synergies Timing and Investment Costs | | | | |
| 1300 | Estimate Manufacturing-Related EHS & HR | | | | |
| 1310 | Coordinate with EHS Module | | | | |
| 1320 | Identify Materials Bad Actors | | | | |
| 1330 | Assess Production Plant & Surroundings History and Issues | | | | |
| 1340 | Assess H&S Procedures | | | | |
| 1350 | Identify Deal Killers | | | | |
| 1360 | Coordinate with HR Module | | | | |
| 1400 | Identify Areas Requiring Future Integration | | | | |
| 1410 | Assess at High-level Manufacturing Process | | | | |
| 1420 | Assess at High-level Information Systems Structure & Capabilities | | | | |
| 1430 | Assess at High-level Quality Processes | | | | |
| 1440 | Identify Deal Killers | | | | |
| 2000 | Due Diligence | | 0% | | |
| 2100 | Pass Data request to target | | | | |
| 2200 | Establish manufacturing Due Diligence Team | | | | |
| 2210 | Confirm Availability of Manufacturing Team Leader | | | | |
| 2220 | Establish Core Manufacturing Team | | | | |
| 2300 | Find Synergies and Quantify | | | | |
| 2310 | Find Plant Synergies and Quantify | | | | |
| 2320 | Find Equipment Synergies | | | | |
| 2330 | Find Workforce Synergies | | | | |
| 2340 | Find Technology Synergies and Quantify | | | | |
| 2350 | Validate Synergies priority, Risk, Timing & Investment Costs | | | | |
| 2400 | Coordinate with EHS Module | | | | |
| 2410 | Baseline & Validate Materials Bad Actors | | | | |
| 2420 | Baseline & Validate Production Plant & Surrounding issues | | | | |
| 2430 | Baseline & Validate H&S Procedures | | | | |
| 2440 | Identify Deal Killers | | | | |
| 2450 | Draft Abatement Plan for EHS | | | | |
| 2500 | Coordinate with HR Module | | | | |
| 2510 | Explore Opportunities for Severance/Early Retirement/Transfer | | | | |
| 2520 | Damage Control Communication Plan for Leaks | | | | |
| 2600 | Baseline & Validate Processes | | | | |
| 2610 | Conduct Machinery Diagnostic | | | | |
| 2620 | Conduct Facility & Production Management Diagnostic | | | | |
| 2630 | Conduct Inventory Management Diagnostic | | | | |
| 2640 | Conduct Quality Management Diagnostic | | | | |
| 2650 | Conduct Information Systems Diagnostic | | | | |
| 2660 | Conduct Management Costing Dianostic | | | | |
| 2700 | Report on Due Diligence Conclusions | | | | |

FIG. 33a

Manufacturing Integration Project Plan

| Code | Steps/Task | Responsible | % Complete | Due Date | Comments |
|---|---|---|---|---|---|
| 3000 | Post Sign / Pre Close | | 0% | | |
| 3100 | Establish Manufacturing Integration Team | | | | |
| 3110 | Confirm Availability of Manufacturing Team Leaders | | | | |
| 3120 | Establish Manufacturing Team Leader | | | | |
| 3200 | Detail Synergies Confirm $ Value and Draft Implementation | | | | |
| 3210 | Detail Plant Synergies, Confirm $ Value & Validate $ Value | | | | |
| 3220 | Refine Workforce Synergies & Validate $ Value | | | | |
| 3230 | Detail Technology Synergies & Validate $ Value | | | | |
| 3300 | Coordinate with EHS Module to Draft EHS Manufacturing Integration Plan | | | | |
| 3400 | Coordinate with HR to Draft HR Manufacturing Integration Plan | | | | |
| 3500 | Coordinate with Six Sigma to Draft Six Sigma Manufacturing Implementation Plan | | | | |
| 4000 | Post Close | | 0% | | |
| 4100 | Achieve Quick Synergies (80/20 Rule) | | | | |
| 4200 | Implement Org. Changes & Communicate with Stakeholder | | | | |
| 4300 | Deliver Longer-Term Synergies | | | | |
| 4310 | Deliver P & E Synergies | | | | |
| 4320 | Deliver Workforce Synergies | | | | |
| 4330 | Deliver Technology Synergies | | | | |
| 4400 | Coordinate Execution of EHS Integration Plan | | | | |
| 4500 | Coordinate Execution for HR Rationalization or Recruiting Plan | | | | |
| 4600 | Coordinate Execution for IT Integration | | | | |
| 5000 | Transition To Normal Operations | | 0% | | |
| 5100 | Monitor Synergies | | | | |
| 5110 | Conduct Frequent Task Force Meetings Initially | | | | |
| 5120 | Identify and Address Process Breakdowns | | | | |
| 5200 | Project Close-Out | | | | |
| 5210 | Review Accomplishments Against Original Objectives | | | | |
| 5220 | Reward Top Performance | | | | |
| 5230 | Capture Lessons Learned | | | | |
| 5240 | Identify Tasks Remaining to Complete Integration | | | | |
| 5250 | Identify Final Owners to Drive & Track Performance | | | | |

FIG. 33b

Engineering Integration Project Plan

| Code | Steps/Task | Responsible | % Complete | Due Date | Comments |
|---|---|---|---|---|---|
| ### | Pre Due Diligence | | 0% | | |
| 1100 | Appoint Due Diligence Team and Likely Integration Resource | | | | |
| 1200 | Understand Business Case and Deal Rationale | | | | |
| ### | Due Diligence | | 0% | | |
| 2100 | Identify Key Talent | | | | |
| 2110 | Develop Skills Matrix and Review for Global Team | | | | |
| 2200 | Identify Synergy Opportunity | | | | |
| 2300 | Identify Key Customer Commitment | | | | |
| 2400 | Identify Current Engineering Programs | | | | |
| 2500 | Prepare Due Diligence Report and Synergies Estimates | | | | |
| ### | Post Sign / Pre Close | | 0% | | |
| 3100 | Define "To Be" Global Technology Organization | | | | |
| 3110 | Define Relationships of Engineering Groups: Development, Manufacturing, Requisition, Services | | | | |
| 3120 | Define Roles and Responsibilities For The Poles | | | | |
| 3130 | Identify Technical Centers of Excellence | | | | |
| 3140 | Identify Key Personnel with Regulatory Responsibility | | | | |
| 3150 | Develop Quality Program Leadership | | | | |
| 3200 | Write Integration Plan | | | | |
| 3210 | Understand Engineering Implications of Overall Business Constraints | | | | |
| 3220 | Identify Integration Team Members | | | | |
| 3230 | Develop Integration Timetable | | | | |
| 3240 | Identify Key Decision Communication Channels | | | | |
| 3250 | Define Global Communication Language | | | | |
| 3300 | Refine Integration Budget | | | | |
| 3310 | Define NPI Budget | | | | |
| 3320 | Define Productivity Program Budget | | | | |
| 3330 | Define R&D Budget | | | | |
| 3340 | Define Quality Budget | | | | |
| 3400 | Review Engineering Programs | | | | |
| 3410 | Rationalize Programs Based in Budget Allocation | | | | |
| 3420 | Prioritize Current Programs By Business and By Pole | | | | |
| 3430 | Develop Productivity Plan Based on Budget Allocation/Identified Synergies | | | | |
| 3440 | Define Program Leadership Responsibilities | | | | |
| 3500 | Establish Engineering Organization Metrics | | | | |
| 3510 | Set Management Goals and Objectives | | | | |
| 3600 | Assess Additional Regulatory Compliance | | | | |
| ### | Post Close | | 0% | | |
| 4100 | Execute Plan to Deliver Synergies | | | | |
| 4200 | Conduct Integration Kick-Off Meeting | | | | |
| 4210 | Team Introduction and Roles | | | | |
| 4220 | Communicate Vision of Future Organization | | | | |
| 4230 | Conduct Workouts Focused on Integration Issues/Activities | | | | |
| 4240 | Introduce Corporate Research and Development | | | | |
| 4250 | Establish Integration Goals and Detailed Plans | | | | |
| 4300 | Conduct Regular Integration Progress Reviews | | | | |
| 4400 | Define Training Requirement | | | | |

FIG. 34

Engineering Integration Project Plan

| Code | Steps/Task | Responsible | % Complete | Due Date | Comments |
|---|---|---|---|---|---|
| 4410 | Patent and Intellectual Property Process | | | | |
| 4420 | Six Sigma and DFSS | | | | |
| 4430 | Compliance | | | | |
| 4440 | Session C Process | | | | |
| 4450 | Engineering Systems: Design, Change Control, Requisition, Etc. | | | | |
| 4500 | Execute On Technical Development Process Integration Plan | | | | |
| 4510 | Establish Make/Buy Strategy for Development | | | | |
| 4520 | Define Engineering Development Tools | | | | |
| 4530 | Outline Technical Communication Methods | | | | |
| 4540 | Establish Unified Specification Methodology | | | | |
| 4550 | Materials, Compatibility Matrices | | | | |
| 4560 | Test Requirements and Methodology | | | | |
| 4570 | Develop Engineering Transfer Process (Prototype To Production) | | | | |
| 4580 | Define Schedule For Product Compliance | | | | |
| 4600 | Product and Technology Planning | | | | |
| 4610 | Define Global Roadmap/MGPD | | | | |
| 4620 | Develop Multigenerational Technology Plan | | | | |
| 4700 | Establish Engineering Infrastructure | | | | |
| 4710 | Global Communications Links and Methodologies | | | | |
| 4720 | Harmonize Manufacturing Quality Systems | | | | |
| 4730 | Integrate Global Parts and Drawing Database | | | | |
| 4740 | Harmonize Global Compliance Documentation | | | | |
| 4750 | Develop Internal Audit Schedule and Team | | | | |
| 4800 | Plan For Any New Licensing/Certification Requirements | | | | |
| ### | Transition To Normal Operations | | 0% | | |
| 5100 | Transition to the Business | | | | |
| 5200 | Capture Lessons Learned | | | | |
| 5300 | Celebrate Success of Integration | | | | |
| 5400 | Promote Integration Team Members into the Business | | | | |

FIG. 35

| Code | Steps/Task | Logistics Integration Project Plan | | | |
|---|---|---|---|---|---|
| | | Responsible | % Complete | Due Date | Comments |
| 1000 | Pre Due Diligence | | 0% | | |
| 2000 | Due Diligence | | 0% | | |
| 3000 | Post Sign / Pre Close | | 0% | | |
| 4000 | Post Close | | 0% | | |
| 5000 | Transition To Normal Operations | | 0% | | |

EHS Integration Project Plan

| Code | Steps/Task | Responsible | % Complete | Due Date | Comments |
|---|---|---|---|---|---|
| 1000 | Pre Due Diligence | | 0% | | |
| 1100 | Appoint EHS Due Diligence Leader | | | | |
| 1200 | Plan and Start EHS Due Diligence | | | | |
| 1210 | Conduct Database Review of Potential EHS Issues | | | | |
| 1300 | Inform CEP and Agree on Plan | | | | |
| 2000 | Due Diligence | | 0% | | |
| 2100 | Identify and Alert EHS Integration Manager | | | | |
| 2110 | Include EHS Integration manager in due diligence | | | | |
| 2120 | Prepare outline integration plan | | | | |
| 2200 | Conduct EHS Due Diligence | | | | |
| 2210 | Baseline: Collect and review EHS information from Target | | | | |
| 2211 | Baseline: Conduct Phase I EHS review | | | | |
| 2212 | Baseline: Conduct Phase II EHS review | | | | |
| 2220 | Compliance: Start EHS compliance review | | | | |
| 2221 | Compliance: Start review of wastewater/storm water permit status and historical compliance | | | | |
| 2222 | Compliance: Start review of air permit status and historical compliance | | | | |
| 2223 | Compliance: Start analysis of waste profile and compliance | | | | |
| 2224 | Compliance: Start Identification of waste transporters and vendors and determination of GE approval status | | | | |
| 2225 | Compliance: Identify major chemical registration issues | | | | |
| 2226 | Compliance: Start Emergency Response & Medical Review | | | | |
| 2227 | Compliance: Start Evaluation of Potential IH Issues | | | | |
| 2228 | Compliance: Start evaluation of Safety and ergonomics issues | | | | |
| 2229 | Compliance: Evaluate Applicability of Property Transfer Requirements | | | | |
| 2300 | Develop EHS Contract Provisions | | | | |
| 2400 | Quantify EHS Issues and Risks | | | | |
| 2500 | Negotiate EHS Contract Provisions | | | | |
| 2600 | Develop EHS Action Plan | | | | |
| 2610 | Negotiate Seller's EHS Action Plan | | | | |
| 2620 | Prepare GE's EHS Action Plan | | | | |
| 2700 | Establish EHS Reserves | | | | |
| 2710 | Identify deal specific milestones for EHS financial reporting (i.e. purchase price adjustments, escrow accounts, purchase accounting) | | | | |
| 2800 | Report Findings to and Agree on approach with CEP | | | | |
| 2900 | Prepare Preliminary Integration Plan and Budget | | | | |
| 3000 | Post Sign / Pre Close | | 0% | | |
| 3100 | Complete EHS Due Diligence | | | | |
| 3110 | Baseline: Continue to review EHS information from target | | | | |
| 3111 | Baseline: Complete Phase II review | | | | |
| 3120 | Compliance: Continue compliance review | | | | |
| 3121 | Compliance: Prepare permit and property transfer paperwork | | | | |
| 3122 | Compliance: Continue review of wastewater/storm water permit status and historical compliance | | | | |
| 3123 | Compliance: review of air permit status and historical compliance | | | | |
| 3124 | Compliance: Continue analysis of waste profile and compliance | | | | |
| 3125 | Compliance: Continue Emergency Response & Medical Review | | | | |
| 3127 | Compliance: Continue evaluation of potential IH issues | | | | |
| 3128 | Compliance: Continue evaluation of Safety and ergonomics issues | | | | |
| 3130 | Risk Reduction: Continue review of potential for catastrophic incidents | | | | |
| 3131 | Risk Reduction: Continue Review of Product-Related Risks | | | | |
| 3140 | EHS Capacity: Continue Evaluation of Existing EHS Staffing, Resources & Procedures | | | | |
| 3150 | Expand baseline of EHS risks and needs | | | | |

FIG. 38

EHS Integration Project Plan

| Code | Steps/Task | Responsible | % Complete | Due Date | Comments |
|---|---|---|---|---|---|
| 3160 | Identify critical EHS issues | | | | |
| 3200 | Transfer Tasks/Information to EHS Integration Manager | | | | |
| 3210 | Identify EHS Integration team members | | | | |
| 3220 | Orient and train team | | | | |
| 3300 | Prepare to implement GE/Business EHS Programs | | | | |
| 3310 | Measurement & Reporting: Establish EHS measurement & reporting procedures | | | | |
| 3311 | Measurement & Reporting: Establish reporting structure for EHS metrics | | | | |
| 3312 | Measurement & Reporting: Adopt tracking system for EHS due diligence, audit and other findings | | | | |
| 3313 | Measurement & Reporting: Establish accident/spill/incident reporting procedure | | | | |
| 3320 | Training: Prepare to conduct training gap analysis | | | | |
| 3330 | Communications: Establish Communication Plan | | | | |
| 3340 | EHS Culture: Design steps to instill EHS Culture | | | | |
| 3400 | Refine EHS Cost Estimates for Final Integration | | | | |
| 3500 | Review EHS Aspects of Deal Pre-Closing | | | | |
| 3510 | Ensure completion of Sellers' EHS action plan items | | | | |
| 3520 | Refine EHS reserves | | | | |
| 3600 | Report findings to and agree on approach with CEP | | | | |
| 3700 | Complete Integration Plan | | | | |
| 3800 | Obtain Business Approval of Integration Plan | | | | |
| 3900 | Load Integration Schedule Into Compliance Calendar | | | | |
| 4000 | Post Close | | | | |
| 4100 | Address Critical EHS issues | | | | |
| 4110 | Manage non-compliance | | | | |
| 4120 | Manage remedial and other EHS risks | | | | |
| 4200 | Hold Kick-off Meeting for EHS Integration Team | | 0% | | |
| 4300 | Supplement EHS Due Diligence Findings | | | | |
| 4310 | Baseline: Review Information held by newly acquired company | | | | |
| 4320 | EHS Capacity: Complete evaluation of existing EHS staffing and procedures | | | | |
| 4330 | Compliance: Complete compliance review | | | | |
| 4331 | Compliance: Complete review of wastewater/storm water permit status and historical compliance | | | | |
| 4332 | Compliance: Complete Review of Air Permit Status & Historical Compliance | | | | |
| 4333 | Compliance: Complete analysis of waste profile and compliance | | | | |
| 4334 | Compliance: Complete identification of waste transporters and vendors and determine GE approval status | | | | |
| 4335 | Compliance: Complete Emergency Response & Medical Review | | | | |
| 4336 | Compliance: Complete evaluation of potential IH issues and implement improvements | | | | |
| 4337 | Compliance: Complete evaluation of Safety and ergonomic issues and implement improvements | | | | |
| 4340 | Risk Reduction: Complete review of potential for catastrophic incidents | | | | |
| 4341 | Risk Reduction: Complete review of product related risks | | | | |
| 4342 | Risk Reduction: Evaluate current site security and improve as necessary | | | | |
| 4343 | Risk Reduction: Complete infrastructure survey | | | | |
| 4350 | Analyze local/regional synergies | | | | |
| 4360 | Complete baseline of EHS risks and needs | | | | |
| 4400 | Understand EHS Aspects of Rationalization Plans | | | | |
| 4500 | Revise EHS integration plan | | | | |
| 4600 | Implement GE/Business EHS Programs | | | | |
| 4610 | Ensure completion of EHS action plan items | | | | |
| 4620 | EHS Capacity: Interview & hire EHS personnel (as necessary) | | | | |
| 4621 | EHS Capacity: Train & develop EHS personnel | | | | |
| 4622 | EHS Capacity: Establish Safety Committees | | | | |
| 4623 | EHS Capacity: Participate in Environment or EHS Council | | | | |
| 4630 | Measurement & Reporting: Start reporting of EHS metrics | | | | |

EHS Integration Project Plan

| Code | Steps/Task | Responsible | % Complete | Due Date | Comments |
|---|---|---|---|---|---|
| 4631 | Measurement & Reporting: Enter new facilities in Global Facilities Database | | | | |
| 4632 | Measurement & Reporting: Use tracking system for EHS due diligence, audit and other findings | | | | |
| 4633 | Measurement & Reporting: Use accident/spill/incident reporting procedures | | | | |
| 4634 | Measurement & Reporting: Integrate Medical/Worker compensation with GE disability team as applicable | | | | |
| 4635 | Measurement & Reporting: Participate in Next Session E | | | | |

EHS Integration Project Plan

| Code | Steps/Task | Responsible | % Complete | Due Date | Comments |
|---|---|---|---|---|---|
| 4640 | Compliance: Perform chemical sweep and MSDS review | | | | |
| 4641 | Compliance: Review hazardous materials transportation issues | | | | |
| 4642 | Compliance: Develop and implement chemical management plan | | | | |
| 4643 | Compliance: Initiate Compliance Self Assessments | | | | |
| 4644 | Compliance: Implement the Health and Safety Framework | | | | |
| 4645 | Compliance: Implement Lock Out Tag Out Program | | | | |
| 4646 | Compliance: Initiate Work Plans | | | | |
| 4650 | Training: Conduct EHS Training gap analysis and implement training programs | | | | |
| 4651 | Training: EHS Policy | | | | |
| 4652 | Training: Plant or Service Managers EHS Training | | | | |
| 4653 | Training: New EHS Fundamentals Course(s) | | | | |
| 4654 | Training: Audit Skills Training | | | | |
| 4655 | Training: EHS Web Training | | | | |
| 4656 | Training: Regulatory required EHS training | | | | |
| 4660 | Communications: Implement Communication Plan | | | | |
| 4661 | Communications: Obtain access to e-mail | | | | |
| 4662 | Communications: Obtain access to EHS web sites | | | | |
| 4663 | Communications: Start QMI's | | | | |
| 4664 | Communications: Enter CEP discussion groups | | | | |
| 4670 | EHS Culture: Instill GE EHS Culture | | | | |
| 4671 | EHS Culture: Survey employees/managers | | | | |
| 4673 | EHS Culture: Develop Mission Statement | | | | |
| 4674 | EHS Culture: Build To Management Support | | | | |
| 4675 | EHS Culture: Develop EHS Accountability of Operations Managers | | | | |
| 4676 | EHS Culture: Develop Change Management System | | | | |
| 4700 | Enforce EHS Contract Provisions | | | | |
| 4800 | Track implementation of EHS Integration Plan | | | | |
| 4810 | Track EHS costs against estimates/reserves | | | | |
| 4820 | Track integration process against goals/schedule | | | | |
| 4900 | Conduct verification audit | | 0% | | |
| 5000 | Transition To Normal Operations | | | | |
| 5100 | Transfer Tasks/Information to EHS Operating Personnel | | | | |
| 5110 | Provide open items list to operating personnel | | | | |
| 5120 | Ensure completion of EHS action plan items | | | | |
| 5200 | Enforce Contractual Provisions | | | | |
| 5300 | Continue to Implement EHS Programs | | | | |
| 5310 | Compliance: Conduct Compliance Self Assessments | | | | |
| 5311 | Compliance: Conduct Business compliance audits | | | | |
| 5312 | Compliance: Complete the Health and Safety Framework Scorecard annually | | | | |
| 5313 | Compliance: Update Work Plans annually | | | | |
| 5314 | Compliance: Follow chemical management plan | | | | |
| 5315 | Compliance: Pursue Audit Protection program opportunities | | | | |
| 5320 | Risk Reduction: Set and track progress against pollution prevention targets | | | | |
| 5330 | Measurement & Reporting: Continue reporting of EHS metrics | | | | |
| 5331 | Measurement & Reporting: Use tracking system for EHS due diligence, audit and other findings | | | | |
| 5332 | Measurement & Reporting: Use accident/spill/incident reporting procedure | | | | |
| 5333 | Measurement & Reporting: Participate in Session E | | | | |
| 5340 | Training: Perform regular training | | | | |
| 5350 | Communications: Continue communications effort | | | | |
| 5360 | EHS Culture: Maintain GE EHS culture | | | | |
| 5361 | EHS Culture: Integrate EHS into NPI and change Management procedures | | | | |
| 5362 | EHS Culture: Complete Six Sigma Training and EHS Project | | | | |

| Code | Steps/Task | Responsible | % Complete | Due Date | Comments |
|---|---|---|---|---|---|
| 5363 | EHS Culture: Evaluate and pursue VPP/ISO 14000 opportunities | | | | |
| 5400 | Capture Lessons Learned | | | | |

EHS Integration Project Plan

FIG. 41

Services Integration Project Plan

| Code | Steps/Task | Responsible | % Complete | Due Date | Comments |
|---|---|---|---|---|---|
| 1000 | Pre Due Diligence | | 0% | | |
| 1100 | Identify Responsibility for Integration Effort | | | | |
| 1110 | Establish Integration Objective | | | | |
| 1120 | Highlight Any Deal Breakers | | | | |
| 1130 | Determine Level of Service Integration Desired | | | | |
| 1140 | First Cut of Service-Related Synergies | | | | |
| 1150 | Estimate Magnitude of Integration Effort (S&M) | | | | |
| 1160 | Gain Resources commitment from Key Stakeholders | | | | |
| 1200 | Select Service Integration Leader and Desired Team | | | | |
| 2000 | Due Diligence | | 0% | | |
| 2100 | Analyze Customers Distribution Channels | | | | |
| 2110 | Match Service Offerings and Note Differences | | | | |
| 2120 | Understand Customer Needs and Satisfaction Levels | | | | |
| 2130 | Assess Any Risk of Revenue/Customer Loss | | | | |
| 2140 | Identify Customer Overlap | | | | |
| 2150 | Understand Distribution Channels and Conflicts | | | | |
| 2160 | Evaluate Growth Potential within Target's Markets | | | | |
| 2200 | Assess Contracts/Installed Base Under Contract | | | | |
| 2210 | Review All Contracts Above Established Thresholds | | | | |
| 2220 | Review Government Contracts and Term | | | | |
| 2230 | Estimate Risks Level and Evaluate Mitigation Process | | | | |
| 2240 | Quantify Number, Location and Type of Equipment | | | | |
| 2250 | Assess Condition of Customer Equipment Under Contract | | | | |
| 2300 | Analyze Service Facilities | | | | |
| 2310 | Map All Locations | | | | |
| 2320 | Baseline Capabilities of All Sites | | | | |
| 2330 | Determine Volume and Capacity | | | | |
| 2340 | Compare Cost Structure | | | | |
| 2350 | Understand Additional constraints | | | | |
| 2360 | Develop Flexible Analysis Tool | | | | |
| 2370 | Create Rationalization Scenarios | | | | |
| 2380 | Review For EHS Compliance | | | | |
| 2400 | Service Resource Assessment | | | | |
| 2410 | Assess Competency Levels of All Personnel | | | | |
| 2420 | Evaluate Service Tools Used | | | | |
| 2430 | Evaluate Productivity Level vs. Established Metrics | | | | |
| 2440 | Identify Key Service Employees | | | | |
| 2500 | Evaluate Outsourced Service Providers | | | | |
| 2510 | Contractual Obligations and Agreements | | | | |
| 2520 | Quality Standards and Performance | | | | |
| 2530 | Viability | | | | |
| 2540 | Capabilities | | | | |
| 2600 | Evaluate Parts Sourcing Policies | | | | |
| 2610 | Evaluate Suppliers Quality Standards and Performance | | | | |
| 2620 | Review Service Levels | | | | |
| 2630 | Compare Parts Costs to GE | | | | |
| 2700 | Review Intellectual Property Issues | | | | |
| 2710 | Assess Licensing Agreements/Patents | | | | |
| 2720 | Review All Proprietary Materials | | | | |
| 2800 | Determine Immediate Synergies | | | | |
| 2810 | Cross-Selling to Both Service Groups' Customers | | | | |

Services Integration Project Plan

| Code | Steps/Task | Responsible | % Complete | Due Date | Comments |
|---|---|---|---|---|---|
| 2820 | GE Insourcing Opportunities | | | | |
| 2830 | Organizational/Operational Overlaps | | | | |
| 2840 | Leverage Existing Supplier Discounts | | | | |
| 2850 | Best Practices to Share Immediately | | | | |
| 3000 | Post Sign / Pre Close | | 0% | | |
| 3100 | Confirm Service Integration Team and Launch | | | | |
| 3200 | Determine Service Organizational Structure | | | | |
| 3210 | Legal Entity Definition | | | | |
| 3220 | P&L vs. Cost Centers | | | | |
| 3230 | Operational Responsibilities and Linkages | | | | |
| 3240 | Confirm Key Stakeholder Agreement | | | | |
| 3300 | Develop and Prioritize Service Integration Plan | | | | |
| 3310 | Prioritize the Opportunities/Issues | | | | |
| 3320 | Create Customer Inquiry and Proposal Plan | | | | |
| 3330 | Create Contract Integration Plan | | | | |
| 3340 | Create Asset/Network Rationalization Plan | | | | |
| 3350 | Create Service Operating Processes Plan | | | | |
| 3360 | Create Billing and Collections Plan | | | | |
| 3370 | Tie to Overall Integration Schedule | | | | |
| 3400 | Define Service-Specific Communications Plan | | | | |
| 3410 | Key Service Employee Retention Plan | | | | |
| 3420 | Assurance to Customers about Continued Service Level | | | | |
| 3430 | Employee Training and Technical Documentation Plan | | | | |
| 3440 | Tie Communication Plan to Overall Integration Schedule | | | | |
| 3500 | Coordinate Overlaps with Functional Modules | | | | |
| 3510 | Coordinate with Sales and Marketing | | | | |
| 3520 | Coordinate with Communications | | | | |
| 3530 | Coordinate with Sourcing | | | | |
| 3540 | Coordinate with Finance | | | | |
| 3550 | Coordinate with IT | | | | |
| 4000 | Post Close | | 0% | | |
| 4100 | Implement Integration Plan | | | | |
| 4110 | P&L Responsibility | | | | |
| 4120 | Organizational Responsibility | | | | |
| 4130 | Spending and Authorizing Levels | | | | |
| 4140 | Financial Targets, etc. | | | | |
| 4200 | Order Inquiry and Proposal Process | | | | |
| 4210 | Define Proposal Generation Process | | | | |
| 4220 | Assign Responsibilities for Technical Support | | | | |
| 4230 | Rationalize Call-Handling Resources | | | | |
| 4300 | Integrate Contract Management Processes | | | | |
| 4310 | Review and Standardize All Quotations and T&C's | | | | |
| 4320 | Determine How to Identify Equipment in the Contract | | | | |
| 4330 | Negotiate Any contract Adjustments | | | | |
| 4340 | Method for Tracking Contract Adjustment | | | | |
| 4350 | Management of Installed Base Date | | | | |
| 4400 | Service Asset / Network Rationalization | | | | |
| 4410 | Service Personnel Deployment - Acquired and Parent | | | | |
| 4420 | Territories/Customer Assignments to Field Engineer | | | | |
| 4430 | Tools and test Equipment Deployment | | | | |
| 4440 | Service Software Tools and Capabilities (including installed base) | | | | |

Services Integration Project Plan

| Code | Steps/Task | Responsible | % Complete | Due Date | Comments |
|---|---|---|---|---|---|
| 4450 | Facilities Rationalization | | | | |
| 4500 | Optimize Service Processes | | | | |
| 4510 | Scheduling and Dispatch for Field Service | | | | |
| 4520 | Parts Sourcing Process | | | | |
| 4530 | Parts and component Repair Process | | | | |
| 4540 | Parts Manufacturing Process | | | | |
| 4550 | Return Good Process | | | | |
| 4600 | Consolidate Billing & Collections | | | | |
| 4610 | Billing Plan for T&M and Out of Scope Work | | | | |
| 4620 | Consolidate Customer Master file, if Applicable | | | | |
| 4630 | Rationalize Process for Preparing Invoices | | | | |
| 4640 | Rationalize Billing Statement Design | | | | |
| 4700 | Execute Service Employee Training Program | | | | |
| 4710 | Integrity/GE Values | | | | |
| 4720 | Technical Training | | | | |
| 4730 | Soft Skills Training | | | | |
| 4740 | Management Training | | | | |
| 4750 | Compliance Training | | | | |
| 4760 | Technical Support and Operating Issues | | | | |
| 4770 | Individual Responsibilities | | | | |
| 4800 | Create Integration Dashboard/Financial Baseline | | | | |
| 4810 | Set Integration Metrics | | | | |
| 4820 | Create Dashboard | | | | |
| 4830 | Define Data Collection Process/Frequency | | | | |
| 4840 | Create Roll-up Savings Tracking Tool | | 0% | | |
| 5000 | Transition To Normal Operations | | | | |
| 5100 | Transition Integration Activities to Operating Management | | | | |
| 5200 | Ensure Completion / Evaluate Performance | | | | |
| 5300 | Feedback | | | | |
| 5310 | Feedback to Business Development Regarding Issues Uncovered During Integration | | | | |
| 5320 | Feedback to Integration Leader on Lessons Learned | | | | |

Risk Management Integration Project Plan

| Code | Steps/Task | Responsible | % Complete | Due Date | Comments |
|---|---|---|---|---|---|
| 1000 | Pre Due Diligence | | 0% | | |
| 1100 | Identify Key Risk Process and Control | | | | |
| 1110 | Identify High Level Risk Processes from Knowledge of Scope of Business | | | | |
| 1200 | Identify Key Data for Risk Polices & Procedure | | | | |
| 1210 | Identify Key Data Requirements and Submit via Data Request | | | | |
| 1300 | Identify Key Risk Management Reporting Routines | | | | |
| 1310 | Sketch of Expected Risk management Reporting Routines | | | | |
| 1400 | Ensure Risk Organization Accountability | | | | |
| 1410 | Ensure Clear Risk Roles and Responsibilities for Project Lead Due Diligence | | | | |
| 1500 | Establish Access to Model Inputs & History | | | | |
| 1510 | Outline Requirement to Examine Model Inputs and Recent History of Parameter Changes | | | | |
| 1600 | Asset Management Assess Data Requirements | | | | |
| 1700 | Identify Key Portfolio Management Risks | | | | |
| 1710 | List Risks Associated with Target's Products, Assets and "Go To Market" Strategy | | | | |
| 2000 | Due Diligence | | 0% | | |
| 2100 | Review & Evaluate Risk Processes & Controls | | | | |
| 2110 | Map Key Risk Related Processes | | | | |
| 2120 | Review Operational Compliance Needs | | | | |
| 2130 | Review Deal Documentation Process | | | | |
| 2140 | Evaluate Process Links to External Relationships | | | | |
| 2150 | Identify Key Risks of Each process and Order of Magnitude | | | | |
| 2160 | Review Adequacy of Key Systems Controls | | | | |
| 2170 | Review Non-Systems Related Controls | | | | |
| 2180 | Review Existing Levels of Approval Authorities | | | | |
| 2190 | Evaluate Existing Non-Earning/Write Off/Reserve Policy | | | | |
| 2200 | Verify Key Data Accuracy & Identify Deficiencies in Risk Policies & Procedures | | | | |
| 2210 | Verify Accuracy of Total A/R Balance | | | | |
| 2220 | Verify Accuracy of Off-Balance Sheet Items | | | | |
| 2230 | Verify Account Balances and Delinquency Calculation | | | | |
| 2240 | Review Problem Account Reporting Standards | | | | |
| 2250 | Verify Historical Loss Performance | | | | |
| 2260 | Verify all Other Key Risk Data | | | | |
| 2270 | Identify any Deficiencies in Data Integrity | | | | |
| 2280 | Establish Corrective Actions to Resolve Data Issues | | | | |
| 2300 | Review Existing Risk Metrics & Reporting | | | | |
| 2310 | Review Existing Risk Metrics | | | | |
| 2320 | Review Existing Risk Reporting | | | | |
| 2400 | Assess People, Organization & Culture | | | | |
| 2410 | Assess Existing Risk Management Culture | | | | |
| 2420 | Assess Existing Risk Management Organization Structure | | | | |
| 2430 | Assess Quality of Existing Risk Management People | | | | |
| 2440 | Evaluate How Risk Structure Will Fit Into Existing CRM Structure | | | | |
| 2450 | Identify CRM Responsibility for the Acquired Business | | | | |
| 2500 | Evaluate Existing Underwriting Process | | | | |
| 2510 | Map and Assess "As Is" Process | | | | |
| 2520 | Identify Changes Required and Assess Impact | | | | |
| 2600 | Assess Risk Model | | | | |
| 2610 | Review Quality and Application of Models | | | | |
| 2620 | Identify (Re) Development Requirements | | | | |

FIG. 44

Risk Management Integration Project Plan

| Code | Steps/Task | Responsible | % Complete | Due Date | Comments |
|---|---|---|---|---|---|
| 2700 | Review Key Asset Management Processes & Results | | | | |
| 2710 | Assess Strategy for "In-Place" Assets | | | | |
| 2720 | Identify and Assess Market Drivers for Supply and Demand for Assets | | | | |
| 2730 | Review Regulatory Environment for Key Asset Classes | | | | |
| 2740 | Work with Sourcing to Identify Key Suppliers and Price/Asset Environment | | | | |
| 2750 | Review Residual Setting Process, Policy and System Adequacy | | | | |
| 2760 | Review Asset Utilization/Concentrations | | | | |
| 2770 | Assess Re-Marketing Channels (Inc. E-Marketing) | | | | |
| 2780 | Assess Inventory Tracking System | | | | |
| 2800 | Analyze Key Portfolio Management Risk Issues | | | | |
| 2810 | Review Product Range & Segment Portfolio | | | | |
| 2820 | Identify Internal & External Loss Drivers | | | | |
| 2830 | Determine Exposure by Key Accounts/Products/Programs/Asset Class | | | | |
| 2840 | Analyze High Exposure/Concentration Risk | | | | |
| 2850 | Determine Exposure by Origination | | | | |
| 2860 | Analyze Delinquency Data By product/Program/Vintage etc. | | | | |
| 2870 | Assess Collections Process and Systems | | | | |
| 3000 | Post Sign / Pre Close | | 0% | | |
| 3100 | Assess if Outstanding Issues Have Impact on Purchase Price or Closing Docs | | | | |
| 3110 | Quantify Impact of Process/Control Issues on Purchase Price/Closing Documentation | | | | |
| 3200 | Determine if Data Integrity Has Impact on Deal Economics/Closing Docs | | | | |
| 3210 | Calculate Magnitude of Data Integrity Issues | | | | |
| 3220 | Determine if Special Closing Conditions are Necessary to Mitigate Data Issues | | | | |
| 3300 | Develop Risk Reporting Package | | | | |
| 3310 | Develop Acquisition Response Dashboard | | | | |
| 3320 | Identify Critical Risk Integration Metrics | | | | |
| 3330 | Construct Triggers and Corrective Actions for Risk Integration Metrics | | | | |
| 3340 | Determine Reports for Internal Business Use | | | | |
| 3350 | Determine Reports for External Requirements | | | | |
| 3360 | Determine HQ Reporting Requirements | | | | |
| 3400 | Develop New Risk Objectives & Infrastructure | | | | |
| 3410 | Assess Existing Risk Department Objectives | | | | |
| 3420 | Develop New Risk Infrastructure | | | | |
| 3500 | Develop Plan to Enhance Underwriting Process | | | | |
| 3510 | Develop Plan to Change Underwriting Methodology | | | | |
| 3520 | Assess Underwriting Training Needed | | | | |
| 3530 | Develop Plan for Training Staff | | | | |
| 3600 | Create Plan For Risk Model Development | | | | |
| 3610 | Use Due Diligence Findings as Basis for Model Enhancement | | | | |
| 3700 | Construct Strategic Plan & Key Measures for Future Management | | | | |
| 3710 | Create Draft Policy 6.0 For Capex | | | | |
| 3720 | Adjust Purchase Price (if necessary) Based on Asset Due Diligence | | | | |
| 3730 | Create Asset Management Dashboards | | | | |
| 3740 | Construct Plan for Managing Assets Through Life Cycle | | | | |
| 3800 | Develop Action Plan For Portfolio Management | | | | |
| 3810 | Develop Plan for Migrating Existing Exposure Reporting to GlobalNet | | | | |
| 3820 | Develop Future Strategy for Products/Risk Mitigants/Pricing | | | | |
| 4000 | Post Close | | 0% | | |
| 4100 | Propose, Confirm & Begin Aligning Risk Process Controls | | | | |

FIG. 45

Risk Management Integration Project Plan

| Code | Steps/Task | Responsible | % Complete | Due Date | Comments |
|---|---|---|---|---|---|
| 4110 | Propose Controls for Key Process Gaps | | | | |
| 4120 | Confirm Assumptions Made in "Measure" Phase with Local Team | | | | |
| 4130 | Begin Execution on Agreed Upon Process/Control Changes | | | | |
| 4140 | Draft Policy 5.0 for Acquired Business | | | | |
| 4150 | Obtain Business Buy-In for New 5.0 | | | | |
| 4160 | Obtain Approval of Policy 5.0 from Corporate | | | | |
| 4200 | Begin Plan to Resolve Data Integrity Issues in Risk Policies & Procedures | | | | |
| 4210 | Review Due Diligence Summary | | | | |
| 4220 | Implement Plan to Resolve Data Integrity Issues | | | | |
| 4300 | Implement Risk Reporting Package | | | | |
| 4310 | Synthesize Existing/New Routines and Reports | | | | |
| 4320 | Work with Systems to Implement Package | | | | |
| 4400 | Tactically Match People, Roles & Objectives | | | | |
| 4410 | Establish New Objectives for Risk Department | | | | |
| 4420 | Work with H.R. to Implement New Organization Structure | | | | |
| 4430 | Match Objectives and Structure to Performance/Skill Set | | | | |
| 4440 | Appoint CRM for Business | | | | |
| 4450 | Link all New Risk Employees Into SmartSite | | | | |
| 4500 | Implement Underwriting Plan & Train | | | | |
| 4510 | Implement Underwriting Methodology Changes | | | | |
| 4520 | Identify People Skill Needs and Training Timetables | | | | |
| 4600 | Implement Plan for Risk Model Development | | | | |
| 4610 | Achieve Buy-In for Plan and Implement on Agreed Timetable | | | | |
| 4700 | Review Assess Management Plans With Acquired Company & Implement | | | | |
| 4710 | Review Capex Policy 6.0 with Acquired Company and Achieve Buy-In | | | | |
| 4720 | Submit Capex Policy 6.0 to 260 and Get Sign Off | | | | |
| 4730 | Synthesize RV Process with ___ Methodology | | | | |
| 4740 | Review Asset management Dashboards with Acquired Company and Achieve Buy-in | | | | |
| 4750 | Discuss Go Forward Asset Life Cycle Model And Achieve Buy In | | | | |
| 4800 | Implement Portfolio Risk Action Plan | | | | |
| 4810 | Review Due Diligence Findings of Portfolio Analysis with Acquired Company | | | | |
| 4820 | Agree on Action Plan with All Relevant Parties | | | | |
| 4830 | Transition Action Plan to Execution Owners | | | | |
| 4840 | Identify Owner for Policy 6.0 Construction | | | | |
| 4850 | Identify Performance Monitors to Key Risk Drivers | | | | |
| 4860 | Policy 6.0 Owner to Take "Policy 6.0 - Insight" Course | | | | |
| 4870 | Submit New Policy 6.0 to Global Risk Management for 260 Approval | | | | |
| 4880 | Agree on Any Collections Process and Systems Improvements | | | | |
| 4890 | Establish Collection Reporting Routines and Targets for Future Periods | | | | |
| 5000 | Transition To Normal Operations | | | | |
| 5100 | Implement Risk Process & Control Plan | | | | |
| 5110 | Follow Through on Key Process Improvement Controls at Key Milestones | | | | |
| 5120 | Monitor Correct Use of Policy and Impact on The Business | | | | |
| 5130 | Visit Key Customers/Clients/Suppliers | | | | |
| 5200 | Risk Data Elements: Monitor Plan For Data Integrity Resolution At Key Milestones | | | | |
| 5210 | Plan Owner Drives Milestone Reviews and Issue Resolution | | | | |
| 5300 | Risk Reporting: Measure Key Metrics & Take corrective Action if Needed | | 0% | | |
| 5310 | Set Up Regular Review Routines | | | | |
| 5320 | Take Corrective Action as Appropriate | | | | |
| 5400 | Continually Re-Assess Risk Organization Effectiveness | | | | |

Risk Management Integration Project Plan

| Code | Steps/Task | Responsible | % Complete | Due Date | Comments |
|---|---|---|---|---|---|
| 5410 | Follow Through on Key Milestones in "Objectives" Plan | | | | |
| 5420 | Re-Assess Effectiveness of New Organization Structure | | | | |
| 5430 | Develop Performance/Potential Matrix for Risk Staff | | | | |
| 5440 | Session C | | | | |
| 5500 | Monitor Impact of Underwriting Changes | | | | |
| 5510 | Monitor Impact of Underwriting Changes | | | | |
| 5520 | Complete "Core" Training Module | | | | |
| 5530 | Complete "ARK InSight" Training Modules | | | | |
| 5600 | Monitor Results of Risk Model Development | | | | |
| 5610 | Track and Evaluate Results of Impact of Model Changes | | | | |
| 5700 | Use Asset Management To Monitor Effective Implementation | | | | |
| 5710 | Conduct Regular Reviews of Capex Management Via 6.0 | | | | |
| 5720 | Monitor RV Setting Process and Business Application | | | | |
| 5730 | Monitor Asset Life Cycle Strategy via Regular Review of Asset Management Dashboards | | | | |
| 5800 | Establish Ongoing Portfolio Management | | | | |
| 5810 | Establish Ongoing 6.0 Reporting Routines and Conduct Regular Reviews | | | | |
| 5820 | Conduct Frequent Collection Review as Appropriate | | | | |

Six Sigma Integration Project Plan

| Code | Steps/Task | Responsible | % Complete | Due Date | Comments |
|---|---|---|---|---|---|
| 1000 | Pre Due Diligence | | 0% | | |
| 1100 | Appoint Functional Expert To Perform Due Diligence | | | | |
| 2000 | Due Diligence | | 0% | | |
| 2100 | Assess Six Sigma Quality Function and Performance | | | | |
| 2110 | Assess Effectiveness of the Target's Six Sigma Performance | | | | |
| 2120 | Understand Focus of Current Six Sigma Quality Efforts | | | | |
| 2130 | Assess Quality Organization Structure and Personnel | | | | |
| 2140 | Review Financial Impact and Costs of Quality Program | | | | |
| 3000 | Post Sign / Pre Close | | 0% | | |
| 3100 | Begin To Perform Core Fulfillment Process Baseline | | | | |
| 3110 | Identify CTQ's Important to the Customer and Shareholder | | | | |
| 3120 | Map Core Fulfillment Processes | | | | |
| 3130 | Determine Sub-Process Impact on CTQs | | | | |
| 3140 | Determine Variance Based Metrics | | | | |
| 3150 | Define Process Capability | | | | |
| 3200 | Draft Strategic Six Sigma Integration Plan And Budget For the Business | | | | |
| 3210 | Develop Six Sigma Integration Plan | | | | |
| 3220 | Review Six Sigma Integration Plan | | | | |
| 3230 | Establish Preliminary Six Sigma Budget | | | | |
| 3240 | Review Preliminary Six Sigma Budget | | | | |
| 3300 | Develop Six Sigma Recruitment Plan | | | | |
| 3310 | Develop Six Sigma Recruitment Plan and Begin Recruitment Process | | | | |
| 3320 | Identify Business Process Champions | | | | |
| 3330 | Establish Business Quality Council (BQC) | | | | |
| 3400 | Develop Six Sigma Training Plan | | | | |
| 3500 | Develop Six Sigma Communication Plan | | | | |
| 4000 | Post Close | | 0% | | |
| 4100 | Hire Six Sigma Resources | | | | |
| 4110 | Hire Six Sigma Leader (QL) | | | | |
| 4120 | Appoint Six Sigma Resources | | | | |
| 4200 | Begin, or Refine Core Fulfillment Process Baseline | | | | |
| 4210 | Identify CTQ's important to the Customer and Shareholder | | | | |
| 4220 | Map Core Fulfillment Processes | | | | |
| 4230 | Determine Sub-Process Impact on CTQ's | | | | |
| 4240 | Determine Variance Based Metrics | | | | |
| 4250 | Define Process Capability | | | | |
| 4260 | Select Six Sigma Projects | | | | |
| 4300 | Deliver Six Sigma Training | | | | |
| 4400 | Execute Six Sigma Projects | | | | |
| 4410 | Execute Six Sigma Projects | | | | |
| 4420 | Conduct Review (Tollgate) Meeting and Review Projects | | | | |
| 4500 | Communicate Six Sigma Efforts | | | | |
| 4510 | Establish Six Sigma Newsletter | | | | |
| 4520 | Establish "Six Sigma Room" | | | | |
| 4600 | Develop And Implement Reward & Recognition Program | | | | |
| 4700 | Implement Management Incentive Plan | | | | |
| 4800 | Maintain Database of Six Sigma Projects | | | | |
| 4900 | Submit Monthly Six Sigma Summary | | | | |

Six Sigma Integration Project Plan

| Code | Steps/Task | Responsible | % Complete | Due Date | Comments |
|---|---|---|---|---|---|
| 5000 | Transition To Normal Operations | | 0% | | |
| 5100 | Transition To Process Owner | | | | |
| 5200 | Deliver Ongoing Training | | | | |
| 5300 | Project Documentation Completed, Approved And Archived | | | | |
| 5400 | Capture Lessons Learned | | | | |
| 5500 | Celebrate And Communicate Successes | | | | |

IT Integration Project Plan

| Code | Steps/Task | Responsible | % Complete | Due Date | Comments |
|------|------------|-------------|------------|----------|----------|
| 1000 | Pre Due Diligence | | 0% | | |
| 1100 | Appoint Integration Leader | | | | |
| 1110 | Determine job requirements for integration leader position | | | | |
| 1120 | Appoint integration leader | | | | |
| 1130 | Assign member to the Integration steering committee | | | | |
| 1200 | Define Team Functional Leaders | | | | |
| 1210 | Define the information technology resources required for the integration | | | | |
| 1300 | Understand Business Case & Project Synergies | | | | |
| 1310 | Review Initial Business Strategy | | | | |
| 1320 | Capture Merger Objectives | | | | |
| 1330 | Review Strengths & Opportunities | | | | |
| 1340 | Ensure Buy-in into Objectives by IT | | | | |
| 1400 | Develop Initial Plan and Timing | | | | |
| 1410 | Review Achievement & Active/Planned Projects | | | | |
| 1420 | Review Current and Planned Projects | | | | |
| 1430 | Review Constraints & Opportunities | | | | |
| 1440 | Document and Communicate Assumptions | | | | |
| 1450 | Define & Communicate Key Dates | | | | |
| 1460 | High-Level Review of IT Budget | | | | |
| 2000 | Due Diligence | | 0% | | |
| 2100 | Conduct Due Diligence | | | | |
| 2110 | Review Due Diligence | | | | |
| 2120 | Assess Resources and Current Organization | | | | |
| 2130 | Retain Key Resources | | | | |
| 2140 | Inventory Current Environment & Begin Quick Hits | | | | |
| 2150 | Review Current Application Inventory | | | | |
| 2160 | Identify & Begin Executing Quick Hits | | | | |
| 2200 | Identify and Prioritize CTQ's | | | | |
| 2210 | Identify External CTQ's | | | | |
| 2220 | Identify Internal CTQ's | | | | |
| 2230 | Understand Non-Negotiables | | | | |
| 2240 | Assess Information Security | | | | |
| 2250 | Define Current Technology and Infrastructure | | | | |
| 2300 | Identify Key Measures for CTQ's | | | | |
| 2310 | Baseline Current IT Environment | | | | |
| 2320 | Measure Critical System Availability | | | | |
| 2330 | Measure Processing Cycle Time | | | | |
| 2340 | Baseline External / Internal Service Agreements | | | | |
| 2350 | Perform Preliminary Assessment of Training Needs | | | | |
| 2360 | Create Targets & Measure progress | | | | |
| 2370 | Baseline Costs vs. IT Budget/Benchmark | | | | |
| 2380 | Baseline Turn Over of IT Staff | | | | |
| 2400 | Define Future State | | | | |
| 2410 | Check For Conflicts/Fit With Other Integration Plans | | | | |
| 2420 | Baseline Actual Savings vs. objectives | | | | |
| 2430 | Refine Plan, Timeline & Deliverables | | | | |
| 2500 | Create Preliminary Communication plan | | | | |
| 2510 | Get Buy-in | | | | |

FIG. 50

IT Integration Project Plan

| Code | Steps/Task | Responsible | % Complete | Due Date | Comments |
|---|---|---|---|---|---|
| 2520 | Publicize Approval | | 0% | | |
| 3000 | Post Sign / Pre Close | | | | |
| 3100 | Identify Functions Required To Met CTQ Strategy | | | | |
| 3110 | Define Skills Required for Integration | | | | |
| 3120 | Identify & Communicate Resources for Integration | | | | |
| 3130 | Define Skills Required for Non-Integration | | | | |
| 3140 | Identify / Reward Crucial Individuals | | | | |
| 3150 | Identify Additional Support Resources | | | | |
| 3160 | Identify Current Technology and Infrastructure Requirements | | | | |
| 3170 | Review Data Quality | | | | |
| 3200 | Identify IT Integration Areas/Opportunities | | | | |
| 3210 | Translate CTQ's into Business Requirements | | | | |
| 3220 | Analyze & Prioritize IT Requirements | | | | |
| 3230 | Assess Outsourcing Opportunities | | | | |
| 3240 | Identify Redundancies in Software/Hardware | | | | |
| 3250 | Identify Consolidation Opportunities | | | | |
| 3260 | Evaluate Best Practices | | | | |
| 3300 | Select Integration Targets Based On Priority / Criticality / Cost | | | | |
| 3310 | Define IT Organization | | | | |
| 3320 | Create New Organizational Chart | | | | |
| 3330 | Assess System and Process Effectiveness | | | | |
| 3340 | Determine IT Security Requirements | | | | |
| 3350 | Determine Disaster Requirements | | | | |
| 3360 | Determine Compliance Requirements | | | | |
| 3370 | Perform Cost/Benefit Analysis | | | | |
| 3380 | Formulate Systems Recommendations | | | | |
| 3390 | Develop MGPP | | | | |
| 3400 | Assess Risks Impacting Integration | | | | |
| 3410 | Determine Technology/Interface Requirements | | | | |
| 3420 | Assess project Risk | | | | |
| 3430 | Set-up Detailed Integration Plan | | | | |
| 3440 | Check For Conflicts/Fit With Other Integration Plans | | | | |
| 3450 | Translate Business Requirements to System Specifications | | | | |
| 3500 | Develop Design and System specifics Based on Business Requirements | | | | |
| 3510 | Develop Conceptual Design | | | | |
| 3520 | Develop Architecture Documentation | | | | |
| 3530 | Develop Specifications | | | | |
| 3540 | Specify Data Conversion Requirements | | | | |
| 3600 | Predict CTQ Performance | | | | |
| 3610 | Evaluate Systems Performance | | | | |
| 3700 | Conduct Gap Analysis | | | | |
| 3710 | Complete Gap Analysis Between Concept and Current | | | | |
| 3800 | Develop Full Communication Plan | | | | |
| 3900 | Develop Full Integration Plan | | | | |
| 3910 | Review IT Capitalization | | | | |
| 3920 | Revise Budget | | | | |
| 3930 | Get Buy-in for Estimated Projects/Dates | | | | |
| 3940 | Develop Full Integration Plan (IT) | | | | |

FIG. 51

IT Integration Project Plan

| Code | Steps/Task | Responsible | % Complete | Due Date | Comments |
|---|---|---|---|---|---|
| 3950 | Convert Statements into Project Charter | | | | |
| 3960 | Identify and Begin Executing Additional Quick-Hits | | | | |
| 3970 | Conduct Tollgate Review and Publicize | | | | |
| 3980 | Order Required Equipment | | | | |
| 4000 | Post Close | | 0% | | |
| 4100 | Execute on Project Plan | | | | |
| 4110 | Design System Conversion/Enhancement | | | | |
| 4120 | Design Application Enhancements | | | | |
| 4130 | Assess Training Needs and Develop Users | | | | |
| 4140 | Design Data Conversion and Interfaces | | | | |
| 4150 | Develop Test Plan | | | | |
| 4160 | Design Technical Environment | | | | |
| 4170 | Perform Application Construction and Testing | | | | |
| 4180 | Implement Technical Environment | | | | |
| 4190 | Conduct Tollgate Review and Publicize | | | | |
| 4200 | Transfer Knowledge / Train Users | | | | |
| 4270 | Conduct Staff Training | | | | |
| 4300 | Monitor Progress | | | | |
| 4310 | Develop Control plan | | | | |
| 4320 | Test and Verify Environment | | | | |
| 4330 | Develop Pilot Deployment Plan | | | | |
| 4340 | Deploy Pilot Environment | | | | |
| 4350 | Conduct Tollgate Review and Publicize | | | | |
| 4360 | Develop Production Deployment Plan | | | | |
| 4400 | Solicit Voice of Employee | | | | |
| 4410 | User Acceptance Testing/Approval | | | | |
| 4500 | Establish Transition Plan | | | | |
| 4600 | Communicate Execution | | | | |
| 5000 | Transition to Normal Operations | | 0% | | |
| 5100 | Participate in Control Tollgate | | | | |
| 5110 | Verify Measurements and Control Plan | | | | |
| 5120 | Develop Systems Cut-Over Plan | | | | |
| 5130 | Deploy Production Environment | | | | |
| 5140 | Verify IT Measurements for Production | | | | |
| 5150 | Complete Transition to Production | | | | |
| 5160 | Get Buy-In and Empower IT Leader | | | | |
| 5170 | Review Actual Savings vs. Objectives and Close Budget | | | | |
| 5180 | Conduct Tollgate Review and Publicize | | | | |
| 5200 | Document Lesson Learned (Post Mortem) | | | | |
| 5300 | Celebrate Completion of Integration | | | | |
| 5400 | Transition of Ownership To Business | | | | |

FIG. 52

Communication Integration Project Plan

| Code | Steps/Task | Responsible | % Complete | Due Date | Comments |
|---|---|---|---|---|---|
| 1000 | Pre Due Diligence | | 0% | | |
| 1100 | Identify/appoint Project Communications leader | | | | |
| 1110 | Analyze scope and nature of communications requirements of project | | | | |
| 1120 | Identify site communications leader and external spokesperson | | | | |
| 1200 | Provide details of Business Case, project Goals, Synergies, Timeline | | | | |
| 1210 | Ensure communications leader is fully briefed on project (and kept updated) | | | | |
| 1300 | Define High Level Draft Communications Plan – key messages, audiences, timing | | | | |
| 1310 | Draft key messages and themes based on project goals and environment | | | | |
| 1400 | Define Communications resource requirements (internal & external) | | | | |
| 1410 | Make a broad assessment of internal and external communications resource requirements | | | | |
| 1500 | Gain Approval for high level assessment of communications/strategy | | | | |
| 1510 | Ensure high level draft communications plan has support of business team/CEO | | | | |
| 1600 | Develop communications strategy for start of due diligence process and possible issues | | | | |
| 1610 | Draft messages to employees (if conducting on site visits) and media holding | | | | |
| 2000 | Due Diligence | | 0% | | |
| 2100 | Communicate leader to participate in Due Diligence | | | | |
| 2110 | Involve communications leader in due diligence stages to initiate communications planning | | | | |
| 2200 | Communication Assessment – Map communications Processes, Channel & Current Practices | | | | |
| 2210 | Assess current and historical communication practices and climate | | | | |
| 2220 | Compile list of communications tools and channels in place | | | | |
| 2230 | Interview those with responsibility for communications, including site leadership | | | | |
| 2240 | Conduct stakeholder analysis as part of understanding local environment | | | | |
| 2250 | Work with HR and Legal functions to understand local workforce consultation | | | | |
| 2260 | Review employee data to assess systems readiness for integration with GE intranet | | | | |
| 2270 | Work with IM to assess systems readiness for integration with GE intranet | | | | |
| 2300 | Assess Communications Resources and Gaps (inc. "e") | | | | |
| 2310 | Identify communications or HR leader to map communications process | | | | |
| 2320 | Assess need for specific media and community/government communications | | | | |
| 2330 | Assess need for PR agency or consultancy support | | | | |
| 2340 | Assess on site communications resources and spokespeople | | | | |
| 2400 | Identify Integration Communications 9 cross-functional) Team and Roles | | | | |
| 2410 | Identify communications team members | | | | |
| 2420 | Identify key contacts for information-gathering and approval process | | | | |
| 2500 | Contribute to Cultural Assessment and Plan | | | | |
| 2510 | Conduct stakeholder analysis to support cultural assessment and planning | | | | |
| 2600 | Further Develop Draft Communication Plan – messages, themes, vehicles | | | | |
| 2610 | Further define themes and messages by key audiences | | | | |
| 2620 | Develop action plan for communications with specific timings/channels | | | | |
| 2630 | Check for alignment with other members of integration team and key contacts | | | | |
| 2640 | Further develop measurement and feedback mechanisms | | | | |
| 2650 | Confirm resource requirements and gain CEO/leadership approval | | | | |
| 2700 | Develop Holding Statement for Pre-Closing inquiries in an information leaks | | | | |
| 2710 | Draft holding statement for inquiries before deal announcement | | | | |
| 2720 | Approve with global business communicator and Corporate before use | | | | |
| 2730 | Agree spokesperson in advance and arrange media training if necessary | | | | |
| 2800 | Assess Cost of Proposals in Communications Plan | | | | |
| 2810 | Ensure CEO/team leadership agree proposed communications expenditures | | | | |
| 2820 | Report expenditures to project finance leader for acquisition budget/coding | | | | |
| 3000 | Post Sign / Pre Close | | 0% | | |

FIG. 53

Communication Integration Project Plan

| Code | Steps/Task | Responsible | % Complete | Due Date | Comments |
|---|---|---|---|---|---|
| 3100 | Identify Leaders for Internal Announcement and Spokesperson for External | | | | |
| 3110 | Identify site leaders for employee communications and establish process | | | | |
| 3120 | Identify spokesperson or PR agency support for media inquiries | | | | |
| 3200 | Finalize Announcement Process, Timetable, Content and background information | | | | |
| 3210 | Finalize communications action plan: timings, channels, responsibilities | | | | |
| 3220 | Identify any legal requirements/constraints on announcement communications | | | | |
| 3230 | Gain final approval of other members of integration team and key contacts | | | | |
| 3240 | Confirm resource requirements and gain final CEO/leadership approval | | | | |
| 3300 | Draft Announcement & Q&A to support Deal Strategy with key audiences | | | | |
| 3310 | Draft Employee Announcement and Employee Q&A Brief | | | | |
| 3320 | Draft media Release (or holding statement if no release) and Q&A Brief | | | | |
| 3330 | Draft Customer Letter and Brief for Sales Team | | | | |
| 3340 | Draft Supplier Announcement and Brief for Sourcing Teams | | | | |
| 3350 | Plan to utilize Internet and Intranet communications channels | | | | |
| 3360 | Consider any global language requirements and plan for translation | | | | |
| 3400 | Evaluate environment and key stakeholder issues as Deal Closing approaches | | | | |
| 3410 | Review stakeholder analysis against developments/new information | | | | |
| 3420 | Establish the gap between the "current" state of each stakeholder group and the "desired" state | | | | |
| 3500 | Complete Detailed Communications Plan by Function with measures | | | | |
| 3510 | Check key assumptions of integration communications plan remain correct | | | | |
| 3520 | Draft message matrix showing key messages against stakeholder/audience | | | | |
| 3600 | Develop Information Resources to support Communications Plan | | | | |
| 3610 | Coordinate production of communications materials such as presentation | | | | |
| 3620 | Arrange any necessary media or presentations/communications training | | | | |
| 3700 | Gain Final CEO & Mgt. Support and Site Buy-In for Communications Plan | | | | |
| 3710 | Gain final leadership approval of integration communications plan | | | | |
| 4000 | Post Close | | 0% | | |
| 4100 | Participate in Integration Kick-Off Meeting and support with materials | | | | |
| 4110 | Ensure copies of all communications materials issued to date are available | | | | |
| 4120 | Present detailed integration communications plan | | | | |
| 4200 | Support Integration Team Orientation & Training | | | | |
| 4210 | Provide communications materials for team orientation/training | | | | |
| 4220 | Present updated communication plan overview | | | | |
| 4230 | Assess communications training needs for integration | | | | |
| 4300 | Lead Implementation of Detailed Communications Plan | | | | |
| 4310 | Execute agreed communication plan | | | | |
| 4320 | Measure implementation against specific timetable and objectives | | | | |
| 4400 | Utilize Status Reporting Tools to Monitor progress and Refine Plan as necessary | | | | |
| 4410 | Verify key stakeholder measurements met and communications effectiveness | | | | |
| 4420 | Revise communications plan to reflect results measured and feedback received | | | | |
| 4430 | Implement review and approval process to ensure consistency, authenticity and team support | | | | |
| 4500 | Enable process of soliciting Voice of Employee and Customer | | | | |
| 4510 | Establish a two-way communication forum to hear employee issues, concerns and ideas | | | | |
| 4520 | Create a process for integrating successes and changes needed for next phases of communication | | | | |
| 4530 | Measure feedback and report on actions taken as a result of feedback received | | | | |
| 4540 | Undertake in-depth opinion research on key issues via focus groups, skip level meetings, individuals | | | | |
| 4550 | Communicate actions taken as a result of survey/opinion research and feedback | | | | |
| 4600 | Evaluate Team member Communication Effectiveness | | | | |
| 4610 | Identify training needs, provide counsel on communications and coach or arrange training | | | | |

FIG. 54

Communication Integration Project Plan

| Code | Steps/Task | Responsible | % Complete | Due Date | Comments |
|---|---|---|---|---|---|
| 5000 | Transition To Normal Operations | | | | |
| 5100 | Establish communications integration and transition plan | | 0% | | |
| 5110 | Audit integration communications processes in place and identify those appropriate for continuation | | | | |
| 5120 | Devise communications plan for transition to business operations. | | | | |
| 5130 | Ensure that business/site management continue to communicate key messages and successes | | | | |
| 5200 | Conduct employee survey post integration | | | | |
| 5210 | Assess communications effectiveness across all key stakeholders | | | | |
| 5220 | Survey communications team | | | | |
| 5230 | Incorporate feedback into communications reassessment | | | | |
| 5300 | Share lessons learned and best practices across | | | | |

FIG. 55

Culture Integration Project Plan

| Code | Steps/Task | Responsible | % Complete | Due Date | Comments |
|---|---|---|---|---|---|
| 1000 | Pre Due Diligence | | 0% | | |
| 1100 | Assign Culture Integration Expert to Due Diligence Team | | | | |
| 2000 | Due Diligence | | 0% | | |
| 2100 | Understand Business Case and Deal Structure | | | | |
| 2200 | Conduct "Mini-Cultural Assessment" | | | | |
| 3000 | Post Sign / Pre Close | | 0% | | |
| 3100 | Establish Cultural Integration Team | | | | |
| 3200 | Develop Overall Culture Integration Plan | | | | |
| 3300 | Incorporate Culture Integration Plan with Other Integration Plans | | | | |
| 3400 | Complete Cultural Assessment and Action Planning | | | | |
| 3500 | Begin Leadership Orientation & Integration | | | | |
| 3600 | Begin Employee Welcome | | | | |
| 4000 | Post Close | | 0% | | |
| 4100 | Implement Integration Plan | | | | |
| 4200 | Introduce Change Tools & Processes | | | | |
| 4300 | Solicit Employee Feedback on Integration Progress & Issues | | | | |
| 5000 | Transition To Normal Operations | | 0% | | |
| 5100 | Identify Team Responsible for Ongoing Day-to-Day Cultural Integration | | | | |
| 5200 | Post Integration Cultural Assessment | | | | |

FIG. 56

HR Strategy Integration Project Plan

| Code | Steps/Task | Responsible | % Complete | Due Date | Comments |
|---|---|---|---|---|---|
| 1000 | Pre Due Diligence | | 0% | | |
| 1100 | Identify HR Integration Leader and Supporting Team | | | | |
| 1200 | Understand the business Case and Projected HR Synergies | | | | |
| 1300 | Understand to What Degree the Target Will Be Integrated | | | | |
| 1400 | Define HR Integration Goals, CTQs, and HR Givens | | | | |
| 1500 | Develop Preliminary HR Integration Plan & Ensure Alignment with Deal Synergies, Timeline | | | | |
| 1600 | Access Public Information | | | | |
| 1700 | Identify Knowledge Gaps in HR Due Diligence Team and Determine Need for Consulting Support | | | | |
| 1800 | Identify HR Change in Ownership Implications | | | | |
| 2000 | Due Diligence | | 0% | | |
| 2200 | Understand "Data Room" Environment, Plan Strategy | | | | |
| 2300 | Map "As-Is" HR Core Processes & Organizational Structure | | | | |
| 2400 | Perform Leadership, Benefit Assessment | | | | |
| 2500 | Define HR Integration Team Structure & Job Descriptions | | | | |
| 2600 | Understand Organizational Dynamics, Culture, Barriers, and Structure Plan | | | | |
| 2700 | Identify Critical HR Issues and Relay to BD Team - Follow Through to Purchase Agreement | | | | |
| 2800 | Develop Integration Plan and Supporting Communications | | | | |
| 3000 | Post Sign / Pre Close | | 0% | | |
| 3100 | Identify HR Integration Team | | | | |
| 3200 | Understand Deal Economics and the HR Value Drivers | | | | |
| 3300 | Determine "To Be" Org. Structure & Core HR Processes to Ensure Synergies | | | | |
| 3400 | Develop Detailed HR Integration Plan Including Key Milestones, Transition CTQs and Metrics | | | | |
| 3500 | Develop Key HR Communication Messages | | | | |
| 3600 | Develop HR Risk Assessment and Potential Mitigating Actions | | | | |
| 4000 | Post Close | | 0% | | |
| 4100 | Leverage Corp Resources: Hold Integration Kickoff Meeting | | | | |
| 4200 | Ensure That All Required Approvals and Notifications Have Been Executed | | | | |
| 4300 | Mobilize HR Integration Using Detailed Plan | | | | |
| 4400 | Utilize Status Reporting Tools to Monitor Progress & Ensure Deal Synergies | | | | |
| 4500 | Evaluate Performance of HR Team members | | | | |
| 4600 | Implement Integration Plan | | | | |
| 4700 | provide Process for Employee Input and Respond to Questions & Concerns | | | | |
| 4800 | Monitor Transition CTQs | | | | |
| 4900 | Identify Team Responsible for Ongoing, Day-to-Day Operations | | | | |
| 5000 | Transition To Normal Operations | | 0% | | |
| 5100 | Implement HR Control Monitoring Mechanisms | | | | |
| 5200 | Transition HR Integration to the Business Operations Team | | | | |
| 5300 | Implement Plan for Ongoing HR Communications | | | | |
| 5400 | Capture HR Lessons Learned | | | | |
| 5500 | Conduct HR Integration Closure Meeting | | | | |

FIG. 57

| Code | Steps/Task | Responsible | % Complete | Due Date | Comments |
|---|---|---|---|---|---|
| 1000 | Pre Due Diligence | | 0% | | |
| 1100 | Appoint Functional Expert for Due Diligence | | | | |
| 1200 | Gain High Level Understanding of the Target Company | | | | |
| 1300 | Understand Business Case and Deal Structure | | | | |
| 1400 | Formulate View of Organization Strengths and Weaknesses | | | | |
| 2000 | Due Diligence | | 0% | | |
| 2100 | Review & Map "As Is" Organization Structure and Staffing Census | | | | |
| 2200 | | | | | |
| 2300 | | | | | |
| 3000 | Post Sign / Pre Close | | 0% | | |
| 3100 | | | | | |
| 3200 | | | | | |
| 4000 | Post Close | | 0% | | |
| 4100 | | | | | |
| 4200 | | | | | |
| 5000 | Transition To Normal Operations | | 0% | | |
| 5100 | | | | | |
| 5200 | | | | | |

Organization Development Integration Project Plan

FIG. 58

HR Labor Relations Integration Project Plan

| Code | Steps/Task | Responsible | % Complete | Due Date | Comments |
|---|---|---|---|---|---|
| 1000 | Pre Due Diligence | | 0% | | |
| 1100 | Appoint Functional Expert for Due Diligence | | | | |
| 1200 | Understand the Proposed Structure of the Deal | | | | |
| 1210 | Understand if Acquisition is to be maintained as an Affiliate | | | | |
| 1220 | Determine if the Deal is a Stock or Asset Transfer | | | | |
| 1230 | Determine if there are any Deal Breakers | | | | |
| 1300 | Understand the Business | | | | |
| 1310 | Determine if there are any Union Contracts and the Identify of the Unions | | | | |
| 1320 | Determine if the Business/Industry is under NLRA or RLA | | | | |
| 1330 | Determine if Business has Works Councils | | | | |
| 1340 | Review Historical Relationships & Practices vis-à-vis Non-Union Components | | | | |
| 1350 | Determine if Union vs. Non-Union Status is Critical to Target's Customers | | | | |
| 2000 | Due Diligence | | 0% | | |
| 2100 | Review All Non-Union Employee Materials | | | | |
| 2200 | Review & Assess Collective Bargaining Agreements | | | | |
| 2210 | Analyze Collective Bargaining Agreements | | | | |
| 2220 | Perform Contract Comparison with IUE Contract | | | | |
| 2300 | Assess Implications of Union Affiliations | | | | |
| 2400 | Review Union Organizing Activity | | | | |
| 2500 | Identify any Notice Obligations | | | | |
| 2600 | Review & Compare Pay Benefits | | | | |
| 2700 | Perform Cost Benefit Analysis | | | | |
| 2800 | Prepare Due Diligence Summary Report | | | | |
| 3000 | Post Sign / Pre Close | | 0% | | |
| 3100 | Develop Strategy to Retain or Eliminate Differences | | | | |
| 3110 | Determine which GE Practices & Policies which can Easily be adopted | | | | |
| 3120 | Develop Strategy to Address Differences between Target's Pay Benefits and Those of Similar GE Operations | | | | |
| 3200 | Review Proposed Changes with UA or UR Consultant | | | | |
| 3300 | Develop Bargaining Strategy | | | | |
| 3310 | Develop Bargaining Strategy in Context with IUE/CBC Bargaining Cycle | | | | |
| 3320 | Ensure "Perfectly Clear" Doctrine | | | | |
| 3330 | Assure Business Practices Support Separateness | | | | |
| 3340 | Consider Other Represented Locations | | | | |
| 3400 | Develop Strategy for Dealing with Works Councils | | | | |
| 4000 | Post Close | | 0% | | |
| 4100 | Execute memorandum of Agreement | | | | |
| 4200 | Provide Notice to Applicable Bodies | | | | |
| 4300 | Develop Pro-Active plan to Remain Union Free | | | | |
| 4400 | Develop Process to Assess Vulnerability | | | | |
| 4500 | Enroll HR Manager in Positive Relations Leadership Course | | | | |
| 5000 | Transition To Normal Operations | | 0% | | |
| 5100 | Transition to Process Owner | | | | |
| 5200 | Capture Lessons Learned | | | | |
| 5300 | project Documentation completed, Approved and Archived | | | | |
| 5400 | Celebrate and Communicate Successes | | | | |

FIG. 59

HR Employee Benefits Integration Project Plan

| Code | Steps/Task | Responsible | % Complete | Due Date | Comments |
|---|---|---|---|---|---|
| 1000 | Pre Due Diligence | | 0% | | |
| 1100 | Understand Business Strategy, Type of Deal and Time Table | | | | |
| 1200 | Understand to what Degree the Target will be Integrated | | | | |
| 1300 | Obtain Preliminary Demographic/Location Data | | | | |
| 1400 | Access Public Information | | | | |
| 1500 | Identify Benefits Knowledge Gaps in HR Due Diligence Team & Determine Need To Support | | | | |
| 1600 | Identify Change in Ownership Implications for Employee Benefits | | | | |
| 2000 | Due Diligence | | 0% | | |
| 2100 | Understand "Data Room" Environment, Plan Strategy | | | | |
| 2200 | Identify Key Employee Segments and Applicable Benefit Treatment | | | | |
| 2300 | Create side by side comparison of Benefit Programs | | | | |
| 2400 | Create cost comparison of Benefit Program | | | | |
| 2500 | Identify Critical Benefit Design, accounting, Funding and Compliance issues | | | | |
| 2600 | Follow Key Issues Through to Purchase Agreement | | | | |
| 2700 | Identify Internal/Supplier Infrastructure to Support Benefit Programs | | | | |
| 3000 | Post Sign / Pre Close | | 0% | | |
| 3100 | Identify Benefits Integration Team | | | | |
| 3200 | Provide input to Draft Purchase Agreement - Obtain Final Signed Copy | | | | |
| 3300 | Develop Benefits Strategy Consistent with Business/HR Strategies | | | | |
| 3400 | Determine Strategy for Internal/Supplier Support for Benefit Programs | | | | |
| 3500 | Assess Opportunities to Leverage GE Purchasing Power | | | | |
| 3600 | Develop Integration plan, Including Key Milestones, Transition CTQ's and Metrics | | | | |
| 3700 | Develop Compliance Strategy and Complete Benefits Compliance Survey | | | | |
| 3800 | Work with CHR to Obtain Necessary Corporate Approvals | | | | |
| 4000 | Post Close | | 0% | | |
| 4100 | Implement Integration Plan | | | | |
| 4200 | Develop and Implement Climate Setting Communications | | | | |
| 4300 | Provide Process for Employee input and respond to questions & concerns | | | | |
| 4400 | Monitor Transition CTQ's | | | | |
| 4500 | Identify Team Responsible for ongoing day-to-day operations | | | | |
| 5000 | Transition To Normal Operations | | 0% | | |
| 5100 | Determine Strategy for Future Benefit changes | | | | |
| 5200 | Continue to Monitor Employee Satisfaction with Benefits and Supplier Delivery Performance | | | | |
| 5300 | Assign "Compliance Owner" and Monitor Status | | | | |
| 5400 | Develop Communication Program for Sustaining Ongoing Benefit Strategy | | | | |

FIG. 60

HR Compensation Integration Project Plan

| Code | Steps/Task | Responsible | % Complete | Due Date | Comments |
|---|---|---|---|---|---|
| 1000 | Pre Due Diligence | | 0% | | |
| 1100 | Review HR Roadmap Elements 1200, 1300 & 1400 | | | | |
| 1110 | Understand Business Case & projected Synergies | | | | |
| 1120 | Understand to What Degree the Target will be integrated | | | | |
| 1130 | Define HR Integration Goals, CTQs and Givens | | | | |
| 1200 | Define Compensation Integration Goals and CTQs | | | | |
| 1300 | Understand Change in Control, Equity Pay Plans & Deferred Plans | | | | |
| 2000 | Due Diligence | | 0% | | |
| 2100 | Map "As is" Compensation Process | | | | |
| 2200 | Understand Compensation Philosophy | | | | |
| 2300 | Understand Key Elements of Compensation Process | | | | |
| 2400 | Understand Key Elements of Executive Compensation Process | | | | |
| 2500 | Understand Key Elements of Exempt/Professional Compensation Program | | | | |
| 2600 | Understand key Elements of Nonexempt Compensation Program | | | | |
| 2700 | Understand Key Elements of Hourly Compensations Program | | | | |
| 2800 | Understand Key Elements of Contingent Workforce Compensation | | | | |
| 3000 | Post Sign / Pre Close | | 0% | | |
| 3100 | Review HR Roadmap Elements 3200, 3300 & 3400 | | | | |
| 3200 | Perform Gap Analysis for Comp Roadmap Elements 2200-2900 | | | | |
| 3300 | Review Gaps, Issues & Alternatives Identified in 3200 with Bus. Level and Subj. Matter Experts | | | | |
| 3400 | Develop Recommendations regarding disposition of road map elements in 3300 | | | | |
| 3500 | Get Business Buy-in from Leadership Team for Recommendations | | | | |
| 3600 | Obtain Formal Approvals | | | | |
| 3700 | Assist Senior Leadership Team to Close Deal | | | | |
| 4000 | Post Close | | 0% | | |
| 4100 | Integrate Compensation Decisions with HR & Business integration | | | | |
| 4200 | Develop Compensation transition Plan | | | | |
| 4300 | Communicate Compensation Decisions to Employees | | | | |
| 4400 | Conduct Compensation Training for Local HR/Compensation Managers | | | | |
| 4500 | Solicit Voice of Employees Regarding Compensation issues | | | | |
| 5000 | Transition To Normal Operations | | 0% | | |
| 5100 | Implement Compensation Compensation Process Controls | | | | |
| 5200 | Perform Compliance Equity Tests | | | | |
| 5300 | Implement Plan or ongoing Communications | | | | |
| 5400 | Identify Lessons Learned | | | | |
| 5500 | Project Closure | | | | |

FIG. 61

Employment Practices Integration Project Plan

| Code | Steps/Task | Responsible | % Complete | Due Date | Comments |
|---|---|---|---|---|---|
| 1000 | Pre Due Diligence | | 0% | | |
| 1100 | Appoint Functional Expert for Due Diligence | | | | |
| 1200 | Understand the Business and the Structure of the Deal | | | | |
| 2000 | Due Diligence | | | | |
| 2100 | Review & Analyze current HR Policies, Practices & Procedures | | | | |
| 2110 | Review Current HR Policies, Practices and Procedures | | | | |
| 2120 | Compare & Contrast HR Employment Practices & Related Policies with and Local Law | | 0% | | |
| 2200 | Assess & Review Compliance with Government Requirements | | | | |
| 2210 | Gather Information Regarding Changes/Complaints with Government Requirements | | | | |
| 2220 | Gather Information on Pending Changes/Complaints Associated with Government Agencies | | | | |
| 2230 | Analyze trends, Costs and Obligations Associated with Government Requirements | | | | |
| 2300 | Assess & Review Compliance with Government Workforce Practices | | | | |
| 2310 | Gather Information on Contingent Workforce Practice | | | | |
| 2320 | Assess/Analyze Potential Liability Related to contingent Workforce Practices | | | | |
| 2400 | Review and Assess Employment Litigation and Changes | | 0% | | |
| 2410 | Gather Information on Pending Litigation | | | | |
| 2420 | Gather Information on Prior Settlements/Awards/Costs | | | | |
| 2430 | Assess/Analyze Litigation trends/Liabilities | | | | |
| 2440 | Assess/Analyze Costs/Obligations Associated with Prior Settlements/Awards | | | | |
| 2500 | Assess Compliance with Employment Data Protection Requirements | | | | |
| 2600 | Review Alternative Dispute Resolution Programs' Experience (if applicable) | | | | |
| 2700 | Summarize Finding, Quantify Savings & Determine if Reserve Dollar is Required | | | | |
| 3000 | Post Sign / Pre Close | | | | |
| 3100 | Appoint Dedicated Resource for Integration | | 0% | | |
| 3110 | Review & Understand the Structure of the Deal | | | | |
| 3120 | Review Due Diligence Team's Work | | | | |
| 3200 | Develop "To Be" HR Policies, Practices and Procedures | | | | |
| 3300 | Draft Detailed Integration Plan | | | | |
| 3400 | Plan for Incorporating into Existing Monitoring & Control Practices | | 0% | | |
| 3500 | Coordinate with Integration communications Team Leader | | | | |
| 4000 | Post Close | | | | |
| 4100 | Finalize Detailed Integration Plan | | 0% | | |
| 4200 | Implement New HR Employment Practices/Compliance | | | | |
| 4300 | Incorporate into Existing Monitoring & Control Practices | | | | |
| 5000 | Transition To Normal Operations | | | | |
| 5100 | Transition to Process Owners | | | | |
| 5200 | Capture Lessons learned | | | | |
| 5300 | Document Work and Obtain Sign-Off | | | | |
| 5400 | Celebrate Successes | | | | |

Payroll Benefits Integration Project Plan

| Code | Steps/Task | Responsible |
|---|---|---|
| 4000 | Post Close | |
| 4100 | Notify Global Services Operation (GSO) | |
| 4110 | Review HR Roadmap Elements 1200 & 1300 | |
| 4120 | Identify Critical Success Factors | |
| 4130 | Complete Business Data Sheet | |
| 4140 | Complete Inter-Company Billing Form | |
| 4200 | Corporate/Pension Board Endorsement | |
| 4210 | Prepare Business Presentation | |
| 4220 | Submit Request to Pension Board | |
| 4230 | Complete and Submit Acquisition Code/Pension Unit Request Form | |
| 4300 | Identify Transition Team members | |
| 4310 | Complete Key Contact List | |
| 4320 | Review Roles and Responsibilities | |
| 4400 | Kick-Off Meeting with Transition Team | |
| 4410 | Schedule Payroll/Benefits Kick Off Meeting | |
| 4420 | Review Business CTQ's | |
| 4430 | Complete Side by Side benefits Comparison | |
| 4440 | Review Standard Pay Practices | |
| 4450 | Complete Payroll and Benefits Questionnaire | |
| 4460 | Complete Implementation plan | |
| 4470 | Develop Communication Strategy & Complete Plan | |
| 4500 | Develop Functional Requirement | |
| 4510 | Complete Active Demographic File | |
| 4520 | Determine Inactive Strategy and Complete Inactive/COBRA Demographic Files | |
| 4530 | Review Oracle HR File Layout | |
| 4600 | Complete Data Requirements | |
| 4610 | Complete Disability Template | |
| 4620 | Understand Health Care Billing process | |
| 4630 | Provide Existing Insurance Supplier Information | |
| 4640 | Review Gates McDonald information | |
| 4700 | Define Special Transition Issues | |
| 4710 | Understand Benefit/Payroll Gaps | |
| 4720 | Determine Flexible Spending Strategy | |
| 4730 | Review Transition of Care Guidelines | |
| 4740 | Determine 401k Transition Needs | |
| 4800 | Ensure Oracle Infrastructure is Operational | |
| 4900 | Plan Education and Enrollment Process Schedule | |
| 4910 | Develop Education/Enrollment Session Rollout Plan | |
| 5000 | Transition To Normal Operations | |
| 5100 | Develop/Ship Communications and Enrollment Material | |
| 5110 | Order Education/Enrollment Material and Review Shipping Expectations | |
| 5200 | Conduct Business Education Sessions | |
| 5210 | Review Web/IVR Employee Self Service Tools | |
| 5300 | Enrollment in Plans | |
| 5310 | Track Enrollment Status | |
| 5400 | All Hands Debrief | |
| 5410 | Provide Business Assessment of Transition | |
| 5420 | Review Employee Feedback on Web Enrollment | |
| 5500 | Project Transition | |
| 5510 | Review process for On-Going Questions/Issue Resolution | |

FIG. 62

Expatriate Admin. Integration Project Plan

| Code | Steps/Task | Responsible | % Complete | Due Date | Comments |
|---|---|---|---|---|---|
| 4000 | Post Close | | 0% | | |
| 4100 | Notify Global Expatriate Services | | | | |
| 4110 | Conference Call to Scope Project and Set Expectations | | | | |
| 4200 | Conduct Workout to identify Current Policy and Processes | | | | |
| 4300 | Analyze & Finalize Project Scope and Measurement | | | | |
| 4310 | Create Project Plan and Identify Team | | | | |
| 4320 | Establish Quality Baseline Measurements and CTQs | | | | |
| 4330 | Establish Weekly QMI's with Team | | | | |
| 4400 | Identify Legal Entity and Billing Process | | | | |
| 4500 | Determine Tax Equalization/Accrual Processes | | | | |
| 4600 | Determine Benefit plan Participation | | | | |
| 4700 | Identify Global Income Reporting Process, Stock Option, IC Reporting | | | | |
| 4800 | Review Contractual Arrangements with Service Providers | | | | |
| 4900 | Prepare Cost/Benefit Analysis | | | | |
| 5000 | Transition To Normal Operations | | 0% | | |
| 5100 | Ensure Critical Project Plan tasks are Complete | | | | |
| 5200 | Execute Communication plan | | | | |
| 5300 | Conduct Expatriate Survey to Measure Employee Satisfaction | | | | |
| 5400 | Communicate Survey Results | | | | |
| 5500 | Close Project | | | | |

FIG. 63

Travel & Living Exp. Integration Project Plan

| Code | Steps/Task | Responsible | % Complete | Due Date | Comments |
|---|---|---|---|---|---|
| 4000 | Post Close | | 0% | | |
| 4100 | Notify Travel Management Services Business | | | | |
| 4110 | Review High Level Business Requirements for Initial Eligibility | | | | |
| 4120 | Identify Transition Team Members | | | | |
| 4130 | Discovery Session with Business & Acquired Business | | | | |
| 4200 | Develop Communication Strategy | | | | |
| 4210 | Develop Implementation Timeline | | | | |
| 4300 | Create GAP Analysis | | | | |
| 4400 | Complete Programming Requirements | | | | |
| 4500 | Develop Solution to handle items Identified in GAP Analysis | | | | |
| 4600 | Review Training Materials with Appointed Business Experts | | | | |
| 4700 | Travelers complete Travel Profiles and Corporate Card | | | | |
| 4800 | Customize and Distribute Communication and Training Materials | | | | |
| 4900 | Completed profiles Entered and Travelers Loaded in Database | | | | |
| 5000 | Transition To Normal Operations | | 0% | | |
| 5100 | Ensure all Old Corporate Card Balances Cleared | | | | |
| 5200 | Close Previous Expense Process | | | | |
| 5300 | Ensure all New Cards Activated and Old Cards | | | | |
| 5400 | Final Communication pieces Distributed | | | | |

Legal Integration Project Plan

| Code | Steps/Task | Responsible | % Complete | Due Date | Comments |
|---|---|---|---|---|---|
| 1000 | Pre Due Diligence | | 0% | | |
| 1100 | Organize Resources For Legal Due Diligence | | | | |
| 2000 | Due Diligence | | 0% | | |
| 2100 | Pass Document Request List To Target | | | | |
| 2200 | map AS IS Legal Organization | | | | |
| 3000 | Post Sign / Pre Close | | 0% | | |
| 3100 | Finalize Contract Matrix | | | | |
| 3200 | Develop Legal TO BE Organization And Synergies | | | | |
| 3300 | Organize Deal Hand Off Meeting | | | | |
| 4000 | Post Close | | 0% | | |
| 4100 | Integrate Local Legal Organization | | | | |
| 4200 | Ensure Litigation Matters Integrated | | | | |
| 4300 | Ensure Regulatory Matters Integrated | | | | |
| 4400 | Ensure Legal Commercial Matters Integrated | | | | |
| 4500 | Ensure Legal Labor & Employment And Employment Practices Matters Integrated | | | | |
| 4600 | Ensure Legal Tax Matters Integrated | | | | |
| 4700 | Ensure Legal E Business Matters Integrated | | | | |
| 4800 | Ensure Legal Sourcing Matters Integrated | | | | |
| 4900 | Perform Contract Enforcement Audit | | | | |
| 5000 | Transition To Normal Operations | | 0% | | |
| 5100 | Ensure Legal Matters EHS Integrated | | | | |
| 5200 | Verify Closure Of Integration Plans | | | | |
| 5300 | Close Out Meeting | | | | |

FIG. 66

Intellectual Property Integration Project Plan

| Code | Steps/Task | Responsible | % Complete | Due Date | Comments |
|---|---|---|---|---|---|
| 1000 | Pre Due Diligence | | 0% | | |
| 1100 | Appoint IP Integration Leader | | | | |
| 1110 | Determine Job Requirements/Qualifications For IP Integration Leader | | | | |
| 1120 | Select IP Integration Leader | | | | |
| 1200 | Understand the Synergy/Significance of IP Transaction | | | | |
| 1210 | Review Available Information Relating to Intellectual property of Target Company | | | | |
| 1220 | Capture IP Synergies and Significance of IP to the transaction | | | | |
| 1300 | Define preliminary IP Integration Scope, Goals and CTQs | | | | |
| 1310 | Define Scope of IP Integration | | | | |
| 1320 | Capture IP Synergies and Significance of IP to the Transaction | | | | |
| 2000 | Due Diligence | | 0% | | |
| 2100 | IP Integration Leader to Participate in Due Diligence process | | | | |
| 2110 | Participate in IP Due Diligence Process as Appropriate | | | | |
| 2120 | Review IP Due Diligence Checklist | | | | |
| 2130 | Identify IP Red Flags | | | | |
| 2140 | Coordinate IP Integration Among Functions | | | | |
| 2200 | IP Integration Leader to Understand the IP Facets of the Target Company | | | | |
| 2300 | Identify Target Company Current IP Organization and IP Leaders | | | | |
| 2310 | Map Current IP Organizational Structure, Identify IP Leadership & Reporting Structure | | | | |
| 2320 | Perform IP Management Assessment | | | | |
| 2400 | Perform IP Policy/Procedure/Best Practices Gap Analysis | | | | |
| 2410 | Review IP Policies/Procedures/Best Practices at Acquired Company | | | | |
| 2420 | Interview/Survey "IP Connected Functions" at Acquired Company | | | | |
| 2430 | Perform Gap Analysis and Prepare Matrix of Gaps | | | | |
| 2440 | Prepare Plan to Close Gaps | | | | |
| 2500 | Define IP Integration Team Structure and Job Responsibilities | | | | |
| 2510 | Determine IP Integration Resource Requirement | | | | |
| 2520 | Determine Size and Composition of IP Integration Team | | | | |
| 2530 | Define Reporting Structure for IP Integration Team | | | | |
| 2540 | Ensure IP Integration Team Members are Both and Acquired Company | | | | |
| 2550 | Develop and Complete Integration Team Responsibilities | | | | |
| 2600 | Prepare Initial IP Integration Project Budget | | | | |
| 2610 | Propose Initial IP Integration Budget | | | | |
| 2700 | Provide IP Input into Transaction Document | | | | |
| 3000 | Post Sign / Pre Close | | 0% | | |
| 3100 | Appoint Dedicated IP Integration Team Resource | | | | |
| 3110 | Appoint IP Integration Functional Team Members | | | | |
| 3200 | Knowledge Hand Off to IP Integration Team | | | | |
| 3210 | Review Due Diligence Summary and List of Critical Action Items from Due Diligence Team for IP Action Items | | | | |
| 3220 | Review Contract Requirements and Critical Issues | | | | |
| 3300 | Refine IP Integration Scope, Goals and CTQs | | | | |
| 3370 | Based on IP Gap Analysis, Refine IP Integration Scope, Goals and CTQs | | | | |
| 3470 | Determine IP Resource needs for Post-Acquisition IP Organization and Select New IP Leaders | | | | |
| 3500 | Conduct IP Resource Studies and Select Key IP Leaders | | | | |
| 3570 | Define Post-Acquisition IP Organizational Structure and Core Processes | | | | |
| 3600 | Generate Organization Chart (with names) for Post-Acquisition Organization | | | | |
| 3610 | Define Detailed IP Integration Plan by Function with Measures | | | | |
| 3610 | Prepare Functional IP Integration Plans | | | | |
| 3620 | Prioritize Tasks, Ensuring Elements Critical to Deals Synergies are Top Priority | | | | |

FIG. 67

Intellectual Property Integration Project Plan

| Code | Steps/Task | Responsible | % Complete | Due Date | Comments |
|---|---|---|---|---|---|
| 3630 | Agree on Dependencies between Functions | | | | |
| 3640 | Determine Milestone Dates and Deliverables | | | | |
| 3650 | Establish Key Measurements for Monitoring Success of Integration Goals and CTQ's | | | | |
| 3700 | Obtain CEO (Both Companies) Support for IP Integration | | | | |
| 4000 | Post Close | | | | |
| 4100 | Review and Finalize IP Integration Plan, Scope and Budget | | | | |
| 4110 | Review and Finalize IP Integration Plan and Scope | | | | |
| 4120 | Review Resources Needs and Availability | | 0% | | |
| 4130 | Review and Confirm IP Integration Budget | | | | |
| 4200 | Ensure IP Integration Team Understands Scope, Goals, CTQs, Plan Deliverables, Budget, Responsibilities | | | | |
| 4210 | Kick-off Meeting with Integration Team | | | | |
| 4220 | Orient IP Integration Team Establish Roles and responsibilities | | | | |
| 4230 | Review Detailed IP Integration Project Plan with Functional Team Members | | | | |
| 4300 | Hold IP Integration Kick-Off Session with Acquired Company | | | | |
| 4400 | Execute Integration | | | | |
| 4500 | Monitor Progress of IP Integration and Ensure Plan Execution | | | | |
| 4510 | Implement Performance Tracking and Status Reporting Tools to Monitor Progress | | | | |
| 4520 | Implement Issue Logs and Issue Management Procedures | | | | |
| 4530 | Establish Process for Controlling Project Scope/Budget | | | | |
| 4540 | Conduct Regular Status Meetings with IP Integration Team | | | | |
| 4600 | Establish Transition Plan to Operations | | | | |
| 4610 | Benchmark Against Work Done in Measure Phase and Identify Gaps and Establish Plan to Close Gaps | | | | |
| 4620 | Establish Ownership for Transition | | | | |
| 5000 | Transition To Normal Operations | | | | |
| 5100 | Implement Control Monitoring Mechanisms | | 0% | | |
| 5110 | Conduct Post Integration Audit to Ensure Policies and Culture are Institutionalized | | | | |
| 5200 | Conduct IP Integration Project Closure Meeting/Tollgate and Formally transition to Business | | | | |
| 5210 | Conduct IP Project Closure Meeting/Tollgate | | | | |
| 5220 | Review Final IP Integration project Status | | | | |
| 5230 | Close IP Integration project | | | | |
| 5300 | Capture Lessons Learned and Communicate IP Integration Successes | | | | |

FIG. 68

Treasury Integration Project Plan

| Code | Steps/Task | Responsible | % Complete | Due Date | Comments |
|------|------------|-------------|------------|----------|----------|
| 1000 | Define | | 0% | | |
| 1100 | Appoint Compliance Expert for Compliance/Integrity Due Diligence | | | | |
| 1200 | Understand the Business | | | | |
| 1300 | Understand the Deal | | | | |
| 1400 | Investigate Local Rules and Industry Trends | | | | |
| 2000 | Measure | | 0% | | |
| 2100 | Review & Assess Current Compliance Environment | | | | |
| 2110 | Review Existing Compliance Policies & Procedures | | | | |
| 2120 | Review & Assess Current Compliance Infrastructure & Personnel | | | | |
| 2130 | Review Current Issues and Concerns | | | | |
| 2140 | Conduct Compliance Interviews with Key Management | | | | |
| 2150 | Review Process maps and Conduct process Walk Throughs | | | | |
| 2160 | Conduct Sample Testing | | | | |
| 2200 | Conduct Gap Analysis | | | | |
| 2210 | Conduct Gap Analysis between Local Law and US Law | | | | |
| 2220 | Conduct Gap Analysis between Target and | | | | |
| 2300 | Determine Need for Additional Compliance Processes and Practices | | | | |
| 2400 | Develop Preliminary Compliance Risk Mitigation Plans | | | | |
| 2500 | Create compliance Integration Budget | | | | |
| 2600 | Complete Due Diligence Report Summarizing Red Flags, Quantify Exposure | | | | |
| 3000 | Analyze | | 0% | | |
| 3100 | Assign Compliance Integration Leader | | | | |
| 3200 | Secure Senior Management Support | | | | |
| 3300 | Select Compliance Integration team members | | | | |
| 3310 | Review Copy of Due Diligence Summary and List of Critical Action Items | | | | |
| 3320 | Complete Detailed Compliance Program Assessment (CPA) | | | | |
| 3400 | Understand, Assess & Prioritize Compliance Risks using COM | | | | |
| 3410 | Review Copy of Due Diligence Summary and List of Critical Action Items | | | | |
| 3420 | Complete Detailed compliance Program Assessment (CPA) | | | | |
| 3430 | Conduct Risk Prioritization & Issue Identification | | | | |
| 3500 | Determine "To Be" Compliance Operating Model and Action Plan | | | | |
| 3510 | Determine Personnel Requirements | | | | |
| 3520 | Determine Policy Requirements | | | | |
| 3530 | Determine and Document Business Specific Policies & procedures | | | | |
| 3600 | Plan "Spirit & Letter" Integration Training | | | | |
| 3610 | Identify Employees to Receive Training | | | | |
| 3620 | Develop Training logistics Plans | | | | |
| 3630 | Determine & Prepare material for Training | | | | |
| 3640 | Assess language Requirements for Training | | | | |
| 3650 | Develop Training Schedule | | | | |
| 3660 | Communicate Leadership Support for Integrity Roll-out | | | | |
| 3670 | Communicate Leadership Support for Integrity Roll-Out | | | | |
| 3700 | Develop plan for Implementing tracking System | | | | |
| 3800 | Develop Compliance Communication plan | | | | |
| 3900 | Develop High Level Compliance Integration plan | | | | |
| 4000 | Implement | | 0% | | |
| 4100 | Review Contract | | | | |
| 4200 | Finalize Detailed Integration plan | | | | |

Treasury Integration Project Plan

| Code | Steps/Task | Responsible | % Complete | Due Date | Comments |
|---|---|---|---|---|---|
| 4300 | Implement New Compliance Infrastructure | | | | |
| 4400 | Implement New Compliance Policies and Practices | | | | |
| 4500 | Implement Compliance Dashboards | | | | |
| 4600 | Conduct Compliance Training & Track | | | | |
| 4700 | Establish Transition Plan | | | | |
| 5000 | Control | | 0% | | |
| 5100 | Transition to process Owner | | | | |
| 5200 | Ongoing Training and Updates | | | | |
| 5300 | Ongoing Communication | | | | |
| 5400 | Ongoing Compliance Risk Assessment (Session D Process) | | | | |
| 5500 | Project Documentation Completed, Approved and Archived | | | | |
| 5600 | Capture Lessons Learned | | | | |
| 5700 | Celebrate and Communicate Success | | | | |

Treasury Integration Project Plan

| Code | Steps/Task | Responsible | % Complete | Due Date | Comments |
|---|---|---|---|---|---|
| 1000 | Pre Due Diligence | | 0% | | |
| 1100 | Appoint Resource For Due Diligence and/or Integration | | | | |
| 1200 | Review Business Case | | | | |
| 1300 | Confirm Resources and Timing | | | | |
| | | | | | |
| 2000 | Due Diligence | | 0% | | |
| 2100 | Pass Data Request to Target | | | | |
| 2200 | Review Information During Due Diligence | | | | |
| 2300 | Exchange Information with Corporate treasury | | | | |
| 2400 | Report Out on Due Diligence Findings, Integration Objectives and Estimated Synergies | | | | |
| | | | | | |
| 3000 | Post Sign / Pre Close | | 0% | | |
| 3100 | Return Completed Corporate Treasury Questionnaire Once Deal Approved | | | | |
| 3200 | Set Up Local Contracts for Transaction Funding | | | | |
| 3300 | Familiarize and Execute Procedures for Transaction Funding | | | | |
| | | | | | |
| 4000 | Post Close | | 0% | | |
| 4100 | Establish Contact With Local Treasury | | | | |
| 4200 | Organize Short Term Funding Requirements | | | | |
| 4300 | Organize Longer Term Funding | | | | |
| 4400 | Integrate Accounting Structure | | | | |
| 4500 | Integrate Banking Structure | | | | |
| | | | | | |
| 5000 | Transition To Normal Operations | | 0% | | |
| 5100 | Transition to Normal operating procedures | | | | |
| 5200 | Monitor Dashboards | | | | |
| 5300 | Ensure Ongoing Training | | | | |
| 5400 | Complete Documentation | | | | |
| 5500 | Close Integration project | | | | |

FIG. 71

EURO Program Integration Project Plan

| Code | Steps/Task | Responsible | % Complete | Due Date | Comments |
|---|---|---|---|---|---|
| 1000 | Pre Due Diligence | | 0% | | |
| 1100 | Prepare for due diligence | | | | |
| 1110 | Contact business Euro Leader | | | | |
| 1120 | Contact EMU PMO Leader | | | | |
| 1130 | Review pre due diligence documentation | | | | |
| 1140 | Modify euro due diligence questionnaire | | | | |
| 2000 | Due Diligence | | 0% | | |
| 2100 | Understand customer/industry expectations | | | | |
| 2200 | Conduct business process reviews using questionnaire | | | | |
| 2300 | Identify business issues and gaps | | | | |
| 2400 | Assess current systems and gaps | | | | |
| 2410 | Profile system functionally | | | | |
| 2420 | Develop scenario analysis | | | | |
| 2430 | Determine cost and timescales | | | | |
| 2500 | Compile due diligence report | | | | |
| 3000 | Post Sign / Pre Close | | 0% | | |
| 3100 | Develop euro project | | | | |
| 3110 | Create euro project charter | | | | |
| 3120 | Validate charter with business leadership | | | | |
| 3130 | Determine team meetings reporting | | | | |
| 4000 | Post Close | | 0% | | |
| 4100 | Measure euro project | | | | |
| 4110 | Review due diligence data and address open questions | | | | |
| 4120 | Conduct voice of the employee | | | | |
| 4130 | Assess readiness of critical suppliers | | | | |
| 4140 | Conduct voice of the customer | | | | |
| 4150 | Evaluate and determine priorities | | | | |
| 4200 | Analyze euro project | | | | |
| 4210 | Plan project streams | | | | |
| 4220 | Define implementation plan | | | | |
| 4230 | Refine budget | | | | |
| 4240 | Obtain management approval | | | | |
| 4300 | Implement euro project | | | | |
| 4310 | Execute implementation Plan | | | | |
| 4320 | Monitor Implementation | | | | |
| 4330 | Track budget | | | | |
| 4340 | Develop training and communication plan | | | | |
| 4350 | Conduct implementation tollgate | | | | |
| 4400 | Prepare for changeover | | | | |
| 4410 | Develop changeover approach | | | | |
| 4420 | Build conversion modules | | | | |
| 4430 | Conduct conversion test | | | | |
| 4440 | Build detailed conversion plan | | | | |
| 4450 | Develop business continuity plans | | | | |
| 4460 | Develop control plan | | | | |
| 4470 | Conduct changeover tollgate | | | | |
| 4500 | Conduct training and communication campaign | | | | |
| 4600 | Execute changeover | | | | |

EURO Program Integration Project Plan

| Code | Steps/Task | Responsible | % Complete | Due Date | Comments |
|---|---|---|---|---|---|
| 4610 | Execute conversion programs | | | | |
| 4620 | Reconcile financial balances | | | | |
| 4630 | Test euro capabilities | | | | |
| 4640 | Compile lessons learned | | 0% | | |
| 5000 | Transition To Normal Operations | | | | |
| 5100 | Implement control plan | | | | |
| 5200 | Transfer responsibilities to operations personnel | | | | |
| 5300 | Conduct project closure | | | | |

| Code | Steps/Task | Responsible | % Complete | Due Date | Comments |
|---|---|---|---|---|---|
| 3000 | Post Sign / Pre Close | | 0% | | |
| 3100 | Identify owner for Financial Planning & analysis integration | | | | |
| 3200 | Review due diligence model | | | | |
| 3300 | Understand Business Model & Business Processes | | | | |
| 3310 | Assess Business Model | | | | |
| 3320 | Understand Key Business Processes | | | | |
| 3400 | Evaluate existing data, reporting & Analysis tools | | | | |
| 3410 | Assess Robustness of Existing Closing and Estimating processes | | | | |
| 3420 | Review Existing Financial Reports | | | | |
| 3430 | Assess reporting tools | | | | |
| 3440 | Review available data | | | | |
| 3450 | Review acquiree forecasting capabilities | | | | |
| 3500 | Evaluate and Restructure Financial Planning & Analysis Organization (if Appropriate) | | | | |
| 3510 | Evaluate Existing Finance Staff | | | | |
| 3520 | Identify/provide training for finance department | | | | |
| 4000 | Post Close | | 0% | | |
| 4100 | Establish Reporting Calendar, instruction and data requirements | | | | |
| 4110 | Establish Financial Reporting Calendar and Data Requirements from Acquirer | | | | |
| 4120 | Request the Planning Template, Pitch Format, and or the Applicable DR Forms | | | | |
| 4200 | Develop/Enhance Existing Financial Planning Model | | | | |
| 4300 | Develop Process to Deliver Analysis by Management Structure | | | | |
| 4400 | Create/Modify Financial Planning Model as Needed | | | | |
| 4500 | Closing and Financial Analysis | | | | |
| 5000 | Transition To Normal Operations | | 0% | | |

FIG. 74

Closing Reporting Integration Project Plan

| Code | Steps/Task | Responsible | % Complete | Due Date | Comments |
|---|---|---|---|---|---|
| 3000 | Post Sign / Pre Close | | 0% | | |
| 3100 | Identify Critical Elements and Resources/Develop Closing/Financial Reporting Integration Plan | | | | |
| 3110 | Assign Integration Leader for the Closing/Financial Reporting Process | | | | |
| 3120 | Make Initial contact with OTC Accounting & FP&A personnel | | | | |
| 3130 | Develop first pass at plan time and significant milestones | | | | |
| 3200 | Assemble Closing/Reporting Integration Team | | | | |
| 3210 | Identify internal resources required by first pass plan (legal, finance, management, and systems) | | | | |
| 3220 | Understand external (acquiring business) resources assigned to integration project | | | | |
| 3230 | Hold initial team meeting to discuss expectations, answer questions | | | | |
| 3300 | Determine Legal Structure | | | | |
| 3310 | Map out legal structure show any parent and subsidiary relationships (including % ownership) | | | | |
| 3320 | Map Business-show structure offices, districts, regions, etc. | | | | |
| 3400 | Determine How the Business Will Report for Management Purposes | | | | |
| 3500 | Determine how and to whom the Business will report their financial results | | | | |
| 3510 | Determine to whom the business will submit financial results | | | | |
| 3520 | Obtain current year fiscal calendar | | | | |
| 3530 | Obtain most recent quarterly close letter from Finance home page | | | | |
| 3540 | Obtain last year-end close letter from Finance home page | | | | |
| 3550 | Assume all submissions, schedules, and information requests will be required | | | | |
| 3600 | Reporting Overview | | | | |
| 3610 | Review Accounts | | | | |
| 3620 | Obtain explanations of any variances from a GAP or local accounting standards | | | | |
| 3630 | Determine which General Ledger will be Utilized as the Primary Ledger | | | | |
| 3640 | Prepare conversion plan if existing ledger system will be utilized | | | | |
| 3650 | Prepare conversion plan if parent ledger system will be utilized | | | | |
| 3700 | Determine if Internal Billing Will be Used | | | | |
| 3710 | Contact IBS personnel in Shelton, CT if IBS usage is anticipated | | | | |
| 3800 | Determine if GSO will be Used for Transaction Subsystems | | | | |
| 3810 | Prepare conversions plan for any service to be transferred to GSO | | | | |
| 4000 | Post Close | | 0% | | |
| 4100 | Prepare a Proposed Chart of Accounts | | | | |
| 4110 | Obtain current Chart of Accounts and Structure and Usage Guide | | | | |
| 4120 | Map current Account Structure to Account Structure | | | | |
| 4130 | Review Proposed Account Mapping with Accounting | | | | |
| 4140 | Develop Timetable for Implementing any proposed Changes | | | | |
| 4200 | Analyze Consolidation Accounting Procedures | | | | |
| 4210 | Obtain Standards and Reporting Guidelines | | | | |
| 4220 | Check Finance intranet page for Applicable Accounting Procedures | | | | |
| 4230 | Implement Applicable Procedures Internally | | | | |
| 4300 | Analyze Submission, Schedule and Information Request Content | | | | |
| 4310 | Gain an Understanding of Submission, Schedule, and Information Request Content | | | | |
| 4400 | Establish Acquisition Accounting Cost Center | | | | |
| 4410 | Implement Appropriate Routines to Capture Acquisition-related Expenses | | | | |
| 4420 | Arrange for Proper Review and Retention of Supporting Documentation | | | | |
| 4500 | Implement Necessary Systems to Enable Submission of Financial Results | | | | |
| 4510 | Assemble System Team Responsible for Submission | | | | |
| 4520 | Gain an Understanding of Submission process | | | | |
| 4600 | Submission of Current Period Operating Results | | | | |
| 4610 | Close Accounting Period | | | | |
| 4620 | Calculate Appropriate local and US Taxes in Accordance with Instructions | | | | |
| 4630 | Map Financial Results to Account Structure | | | | |
| 4640 | Follow Up with local HQ for Exact Submission instructions | | | | |
| 4650 | Reconcile HQ Results with Local Books | | | | |

FIG. 75

Tax Integration Project Plan

| Code | Steps/Task | Responsible | % Complete | Due Date | Comments |
|---|---|---|---|---|---|
| 1000 | Pre Due Diligence | | 0% | | |
| 1100 | Understand Business Case for Acquisition | | | | |
| 1110 | Determine the business fit | | | | |
| 1120 | Determine business flexibility | | | | |
| 1200 | Determine Current Tax Staffing | | | | |
| 1210 | Assess involvement of Tax personnel in transaction | | | | |
| 1220 | Assess current target tax expertise | | | | |
| 1230 | Engage external advisors where necessary | | | | |
| 1300 | Identify Key non-tax Contacts | | | | |
| 1310 | Identify business, legal and accounting team leaders | | | | |
| 1320 | Coordinate tax integration no plan with business and financial integration plan | | | | |
| 1400 | Understand the Structuring Variables | | | | |
| 1410 | Determine the probable form of the transaction | | | | |
| 1420 | Review BD Model | | | | |
| 1430 | Determine the financial statement treatment of the acquisition | | | | |
| 1440 | Review the integration plan for the financial reporting information | | | | |
| 1450 | Tax input on LOI | | | | |
| 1500 | Develop High-level Tax Staffing/Responsibility Plan | | | | |
| 1510 | Determine high-level roles and responsibilities | | | | |
| 1520 | Determine involvement of corporate tax personnel | | | | |
| 1530 | Identify required pre-closing steps | | | | |
| 1540 | Identify "can't miss" steps/dates | | | | |
| 2000 | Due Diligence | | 0% | | |
| 2100 | Plan/Complete/Review/Summarize Due Diligence | | | | |
| 2110 | Plan due diligence | | | | |
| 2120 | Collate and review identified tax risks | | | | |
| 2140 | Collate and summarize identified tax opportunities/synergies | | | | |
| 2150 | Identify part responsible for management of tax risks | | | | |
| 2160 | Identify party responsible financially for tax risks | | | | |
| 2170 | Summarize tax indemnification provision | | | | |
| 2180 | Plan procedure to track and settle tax indemnifications | | | | |
| 2200 | Acquisition Agreement Coordination | | | | |
| 2210 | Provide tax language to M&A lawyers | | | | |
| 2220 | Provide GE purchasing entities and legal structure to M&A lawyers | | | | |
| 2230 | Secure business approval of tax planning | | | | |
| 2300 | Acquisition Agreement Signing | | | | |
| 2310 | Negotiate tax provisions of acquisition agreements with target's tax professionals | | | | |
| 2320 | Review final acquisition agreements | | | | |
| 2330 | Consider purchase price allocation issues | | | | |
| 3000 | Post Sign / Pre Close | | 0% | | |
| 3100 | Assess Current Tax System Procedures | | | | |
| 3110 | Assess and document quality of data available for tax filings | | | | |
| 3120 | Assess and document procedures to capture key tax data | | | | |
| 3130 | Assess impact of financial transition on current tax systems/procedures | | | | |
| 3200 | Prepare Transaction Tax Reporting Plan/Timetable | | | | |
| 3210 | Review transaction with planners | | | | |
| 3220 | Review corporate tax information requirements | | | | |
| 3230 | Summarize requirements into transaction data collection plan | | | | |

FIG. 76

Tax Integration Project Plan

| Code | Steps/Task | Responsible | % Complete | Due Date | Comments |
|---|---|---|---|---|---|
| 3240 | Obtain buy-in to transaction data collection plan | | 0% | | |
| 3250 | Communicate transaction data collection plan including deadlines | | | | |
| 3300 | Understand Transaction Reporting Responsibilities | | | | |
| 3310 | Determine reporting requirements for transaction | | | | |
| 3320 | Determine reporting responsibilities for the transaction | | | | |
| 3330 | Determine availability of transaction information | | | | |
| 3400 | Short Period Filing Requirements | | | | |
| 3410 | Determine applicable short-period filing requirements | | | | |
| 3420 | Determine responsibility for short-period filings | | | | |
| 3430 | Determine if the short-period filing will include any part of the transaction itself | | | | |
| 3500 | Prepare Operations Tax Reporting Plan/Timetable | | | | |
| 3510 | Review business operations of acquisition | | | | |
| 3520 | Secure and file prior financial and tax data | | | | |
| 3530 | Include Integration steps into pre-closing and tax pre-closing meetings | | | | |
| 3540 | Review corporate tax data collection package | | | | |
| 3550 | Summarize requirements into operations data collection plan | | | | |
| 3560 | Obtain buy-in to operations data collection plan | | | | |
| 3570 | Communicate operations data collection plan including deadlines | | | | |
| 3600 | Support and Implement Effective Closing for Tax Purposes | | | | |
| 3610 | Finalize legal structure | | | | |
| 3620 | Coordinate funds flow with Treasury | | | | |
| 3630 | Insure tax payments can be made | | | | |
| 3640 | Coordinate with Human Resources | | | | |
| 4000 | Post Close | | 0% | | |
| 4100 | Implement Identified Tax Opportunities and Compliance Measures | | | | |
| 4110 | Review opportunities identified during due diligence | | | | |
| 4120 | Schedule opportunities "brainstorming" session | | | | |
| 4130 | Summarize opportunities and prioritize based on time sensitivity and value | | | | |
| 4140 | Assign responsibility for opportunity areas | | | | |
| 4150 | Ensure compliance with tax initiatives | | | | |
| 4200 | Review Accounting Methods/Elections | | | | |
| 4210 | Review effect of transaction form on accounting methods | | | | |
| 4220 | Review all Accounting methods currently in effect | | | | |
| 4230 | Compare current accounting methods to method for business | | | | |
| 4240 | Summarize accounting method opportunities with relevant responsibilities | | | | |
| 4300 | Determine Impact on Overall Tax Position | | | | |
| 4310 | Summarize foreign source income effect of acquisition | | | | |
| 4320 | Summarize planned foreign repatriation impact of acquisition | | | | |
| 4330 | Summarize FSC impact of acquisition | | | | |
| 4340 | Summarize impact of acquisition on current year estimated tax position | | | | |
| 4350 | Summarize impact of acquisition on alternative minimum tax position and forecast | | | | |
| 4400 | Integrate into Tax System | | | | |
| 4410 | Transition sales & use, property and payroll tax reporting | | | | |
| 4420 | Transition to tax data collection system | | | | |
| 4430 | Determine opportunities to utilize corporate tax resources | | | | |
| 4500 | Transition IRS/State Exam Responsibilities | | | | |
| 4510 | Coordinate with federal exam group on transition of existing examinations | | | | |
| 4520 | Determine requirement for submission of prior year foreign earnings and tax information | | | | |

FIG. 77

Tax Integration Project Plan

| Code | Steps/Task | Responsible | % Complete | Due Date | Comments |
|---|---|---|---|---|---|
| 4530 | Determine impact of existing exam issues on post-acquisition years | | | | |
| 4540 | Coordinate issues which have impact on both acquisition and existing operations | | | | |
| 4550 | Coordinate with state exam group on transition of existing examinations | | | | |
| 4560 | Determine impact of existing exam issues on post-acquisition state years | | | | |
| 4570 | Coordinate state exam issues which have impact on both acquisition and existing operations | | | | |
| 4580 | Coordinate due diligence issues resolution | | | | |
| 4600 | Coordinate Tax Data Submissions with Corporate Tax | | | | |
| 4610 | Review initial tax data submission with finance and IT personnel | | | | |
| 4620 | Consider opportunities to streamline business data collection process | | | | |
| 4630 | Coordinate no income taxes with centers of compliance and planning | | | | |
| 5000 | Transition To Normal Operations | | 0% | | |
| 5100 | Review First year Filings for Additional Opportunities | | | | |
| 5110 | Compare results to acquisition projections | | | | |
| 5120 | Consider techniques to increase foreign tax credit, FSC results and reconsider general tax planning | | | | |
| 5130 | Review deferred tax assets for deduction acceleration opportunities | | | | |
| 5140 | Consider opportunities to restructure to reduce state income taxation | | | | |
| 5200 | Review Financial Accounting of Tax Results | | | | |
| 5210 | Review tax benefits anticipate data business level | | | | |
| 5220 | Review deferred tax accounting results | | | | |
| 5230 | Review booking of tax contingencies at business and corporate level | | | | |
| 5300 | Review Tax Opportunities | | | | |
| 5310 | Review status of identified opportunities for current book income impact | | | | |
| 5320 | Re-prioritize opportunities based on first year results | | | | |
| 5330 | Capture continuous improvement opportunities in savings plan | | | | |
| 5340 | Consider outside review and benchmarking opportunities | | | | |
| 5400 | Assess Tax Staffing Plan | | | | |
| 5410 | Consider tax staff requirements in light of business integration | | | | |
| 5420 | Assess experience of tax staff compared to post-acquisition needs | | | | |

FIG. 78

Controllership Integration Project Plan

| Code | Steps/Task | Responsible | % Complete | Due Date | Comments |
|---|---|---|---|---|---|
| 3000 | Post Sign / Pre Close | | 0% | | |
| 3100 | Plan the Controllership Effort | | | | |
| 3110 | Review the Controllership Effort | | | | |
| 3120 | Hold Debrief Meeting with Due Diligence Team | | | | |
| 3130 | Review Recent Controllership Issues | | | | |
| 3140 | Prioritize Issues & Concerns | | | | |
| 3150 | Assign Ownership | | | | |
| 3160 | Establish Timeline | | | | |
| 3200 | Establish Controllership Integration Team and Plan | | | | |
| 3210 | Identify Resources for core Integration: Business Experts, Corporate, CAS, etc. | | | | |
| 3220 | Identify Activities Critical to Successful completion | | | | |
| 3221 | Schedule Finance Assimilation Meeting | | | | |
| 3230 | Establish Timeline for Controllership Integration Completions | | | | |
| 3240 | Develop Finance Risk Mitigation Plan | | | | |
| 3250 | Establish Communication Plan | | | | |
| 3260 | Determine Tools to use to Monitor Integration progress | | | | |
| 3270 | Outline Controllership Enhancement Plan | | | | |
| 3280 | Identify Potential Synergies | | | | |
| 3290 | Obtain Buy in From Upper Management on plan | | | | |
| 3300 | Assess Controllership | | | | |
| 3310 | Identify Legal Entity Structures | | | | |
| 3320 | Map Management and US Reporting Processes | | | | |
| 3330 | Understand Implications of Legal Structure-Corporations, Partnerships | | | | |
| 3340 | Understand Transfer Pricing Requirements and Opportunities | | | | |
| 3350 | Identify and Assess Unusual or Non-Arms Length Agreements | | | | |
| 3360 | Understand Tax Implications of Restructuring Entities | | | | |
| 3400 | Assess Order-Ship Bill Processes | | | | |
| 3500 | Assess Purchase/Accounts Payable Process | | | | |
| 3600 | Assess Inventory Management Process | | | | |
| 3700 | Assess Plant & Equipment Processes | | | | |
| 3800 | Assess Cash Controllership | | | | |
| 3900 | Develop Controllership Risk Mitigation Plans | | | | |
| 4000 | Post Close | | 0% | | |
| 4100 | Define Local Finance Structure | | | | |
| 4110 | Assess People Quantity and Quality | | | | |
| 4120 | Determine Resource Needs at Acquired Business | | | | |
| 4130 | Short-Term and Long Term Retention/Termination Plan | | | | |
| 4140 | Identify Non-Finance Responsibilities | | | | |
| 4150 | Determine Impact on Planned Restructuring on Controls | | | | |
| 4160 | Develop Risk Abatement Plan for Attrition of Key Personnel | | | | |
| 4170 | Assess Bench Strength in Finance Organization | | | | |
| 4200 | Balance Sheet Account Control | | | | |
| 4210 | Identify owner of Account | | | | |
| 4220 | Determine Account Reconciliation Status | | | | |
| 4230 | Understand contents of all Account | | | | |
| 4300 | Education on GE Finance Structure | | | | |
| 4310 | Communicate Organizational Charts (Controllership, FP&A, Tax, Acct) | | | | |
| 4320 | Define Roles, Responsibilities of Finance Leaders | | | | |

FIG. 79

| Controllership Integration Project Plan |||||||
|---|---|---|---|---|---|
| Code | Steps/Task | Responsible | % Complete | Due Date | Comments |
| 4330 | Explain Corporate Owned Accounts | | | | |
| 4340 | Communicate External and Internal Audit Relationships and Arrangements | | | | |
| 4350 | Define Accounting "Rules of the Road" | | | | |
| 4360 | Understand Key Contacts and Experts | | | | |
| 4370 | Explain Controllership Culture | | | | |
| 4380 | Communicate Approval Authority Process | | | | |
| 5000 | Transition To Normal Operations | | 0% | | |
| 5100 | Conduct Controllership Training | | | | |
| 5110 | Conduct Training on Account Reconciliation Requirements | | | | |
| 5120 | Present Overview of Critical GAPs for the Business | | | | |
| 5130 | Assess need for Local US GAP Training | | | | |
| 5140 | Determine Need for Purchase Accounting Training | | | | |
| 5150 | Determine Need for Training on Systems and Ledgers | | | | |
| 5200 | Close Integration Project | | | | |

FIG. 80

Insurance Integration Project Plan

| Code | Steps/Task | Responsible | % Complete | Due Date | Comments |
|---|---|---|---|---|---|
| 1000 | Pre Due Diligence | | 0% | | |
| 1100 | Appoint Resource to Assess Insurance During Due Diligence | | | | |
| 2000 | Due Diligence | | 0% | | |
| 2100 | Pass Date Request to Target | | | | |
| 2200 | Review Data Received from Target | | | | |
| 2300 | Report Conclusions on Synergies and Integration Objectives | | | | |
| 3000 | Post Sign / Pre Close | | 0% | | |
| 3100 | Identify Integration Resources | | | | |
| 3200 | Inform Corporate Insurance of Local Contact | | | | |
| 3300 | Corporate Insurance provides Directions Local Resources | | | | |
| 4000 | Post Close | | 0% | | |
| 4100 | Local Resource Contacted by Marsh | | | | |
| 4300 | Provide Data to Marsh | | | | |
| 4400 | Address Issues with marsh | | | | |
| 4500 | Develop Action plan | | | | |
| 4600 | Implement Integration plan and Realize Synergies | | | | |
| 4700 | Monitor Changes | | | | |
| 5000 | Transition To Normal Operations | | 0% | | |
| 5100 | Communicate Changes, New Contracts and Contract Documentation | | | | |
| 5200 | Organize Close Out Meeting | | | | |

METHOD AND SYSTEMS FOR DEVELOPING AN ACQUISITION INTEGRATION PROJECT PLAN

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to integrating an acquired company with an acquiring company and more particularly, to methods and systems for assimilating a newly acquired asset or company with another asset or company.

Acquisition integration, as used herein, refers to processes and systems for assimilating a newly acquired asset (e.g., a portfolio) or company with an existing asset or company. For example, acquisition integration occurs when one company acquires another company. Acquiring a company includes multiple phases. Such phases include, for example, a pre-due diligence phase during which objectives to achieve in an acquisition are defined, a due diligence phase during which candidate companies being considered for acquisition are studied, a post-sign/pre-close (i.e., contracts are signed but operating provisions are not yet effective) phase during which contractual contingencies are resolved, a post-closing (i.e., contracts fully effective) phase during which the acquired company comes under the control of the acquiring company, and a transition to operations phase where the former two companies begin to operate as a single entity.

Integrating the operations and staff functions of the acquired company with the acquiring company traditionally starts with the post-sign/pre-close phase and continues into the post-closing phase. During the post-sign/pre-close phase, the integration activities may be minimal due to complexities and concerns relating to contractual contingencies, e.g., governmental reviews and approvals.

Although integration traditionally has been performed starting with the post-sign/pre-close phase, there have been attempts to initiate integration earlier in the acquisition time continuum, such as in the pre due-diligence phase. Attempts to initiate integration efforts early in the acquisition process can meet with resistance due, for example, to a desire to focus resources on identifying and screening candidate companies and avoiding perceived unnecessary costs associated with tasks traditionally performed much later in the acquisition time continuum.

Companies that perform numerous acquisitions throughout any given year may designate a group of individuals to work on acquisitions. Large companies with various operating businesses may designate multiple groups to work within assigned businesses on different acquisitions or on common acquisitions with other groups. The acquisition groups, however, typically focus on identifying candidate companies, performing due diligence on selected candidate companies, and then negotiating and finalizing the agreements necessary to acquire the selected company or companies. Once the acquisition agreements are executed, the acquisition group transitions to another acquisition project. Some members of the group that worked on the just completed acquisition may move on to new jobs, and new members are assigned to the acquisition group. The acquisition group is not necessarily involved in the post-closing integration.

As a result, the knowledge and experience gained through the acquisition process by each member of the group may not necessarily even be passed along to the post-acquisition integration group. Also, a process utilized in one particular acquisition often is not formally captured in a way that promotes repeating the process for another acquisition. That is, one group working with one business may not necessarily share its experiences and knowledge with another group working in another business, or even with another group in the same business.

Checklists are commonly utilized in the due diligence phase of an acquisition. A legal due diligence checklist, for example, identifies areas of concern regarding possible legal liabilities that should be analyzed when contemplating acquiring a company. An individual performing the legal due diligence can use the checklist as a tool to help ensure that the usual areas of concern have been addressed.

Checklists, however, typically are used in the due diligence phase and do not span across multiple phases of the acquisition process. In addition, the checklist is used to indicate whether a particular task has been fully completed (e.g., does not indicate the extent to which a task is partially completed) and does not facilitate capturing process changes implemented in connection with a particular acquisition. Consequently, changes in the acquisition process for particular types of acquisitions often are not broadly communicated and easily replicated throughout a business.

Further, even with the use of checklists, clearly communicating and assigning tasks to internal and external resources deployed on an acquisition, as well as tracking task completion and results, can be time consuming and difficult due to the number of people involved and the number of tasks to be completed. For an acquisition of a multi-national company having multiple sites throughout the world and thousands of employees located in many countries, communicating and assigning tasks to be completed is time consuming and complex.

Success in an acquisition, i.e., achieving the acquiring company goals, depends on integration of the acquired company into the acquiring company. Such integration includes not only the operations of the companies, but also the management structures and corporate cultures. Improving the processes and systems utilized in connection with acquisition integration therefore should enhance the likelihood for successful acquisitions.

BRIEF SUMMARY OF THE INVENTION

In one aspect, a method in a computer for generating an acquisition integration project plan is provided which comprises displaying a plurality of pre-defined integration events based upon at least one user selected integration area, each pre-defined integration event being associated with a phase in an acquisition process, receiving at least one user selection of a pre-defined integration event for each user selected integration area, displaying the user selected, pre-defined integration events for each user selected integration area, displaying at least one of a name of a person responsible, a due date, a completion percentage, and a commentary for each user selected, pre-defined integration event, and storing the user selected, pre-defined integration events and corresponding integration areas as an acquisition integration project plan.

In another aspect, a computer is provided which is programmed to display a plurality of pre-defined integration events based upon at least one user selected integration area, each pre-defined integration event being associated with a phase in an acquisition process, display at least one user selected, pre-defined integration event for each user selected integration area, display at least one of a name of a person responsible, a due date, a completion percentage, and a commentary for each user selected, pre-defined integration event, and store the user selected, pre-defined integration events and corresponding integration areas as an acquisition integration project plan.

In yet another aspect, a database for acquisition integration is provided which comprises data corresponding to at least one integration area and data corresponding to integration events for each integration area.

In still another aspect, a system for acquisition integration is provided which comprises a database comprising data corresponding to integration events for at least one integration area and a server configured to prompt a user to select an integration area and to provide information regarding a status of integration events within the integration area.

In a further aspect, a method for acquisition integration planning is provided which comprises selecting, from an electronic interface, at least one of a plurality of integration areas, identifying a responsible person for each integration area using the interface, identifying a responsible person and a due date for each integration event within an integration area through the interface, and requesting, from the electronic interface, a percentage completion for each integration event.

In still another aspect, an apparatus is provided which comprises means for prompting a user to select at least one integration area, means for displaying a plurality of integration events for the selected integration areas, and means for generating an integration acquisition project plan using selected integration events is provided.

In another aspect, a computer program embodied on a computer-readable medium is provided which comprises a code segment that manages integration areas for acquisition integration, a code segment that organizes integration events for each integration area, and a code segment that generates an acquisition integration plan including a set of integration events and deliverable checklists based on user selected integration areas, to guide the user through integration process.

In still another aspect, a method is provided for operating a computer which comprises prompting a user to select an integration area from an acquisition integration main user interface, displaying a set of selectable integration events for the selected integration area, and generating an integration project plan incorporating selected integration events.

In yet another aspect, a computer is provided which is programmed to prompt a user to select an integration area from a computer generated screen configured as an acquisition integration main user interface, display a set of selectable integration events for the selected integration area, and generate an integration project plan incorporating user selected integration events.

In a further aspect, a computer-readable medium is provided which is executable by a computer for receiving user selections of pre-defined integration areas, receiving user selections of pre-defined integration events for the selected integration areas, and generating an acquisition integration plan with the user selected, pre-defined integration areas and integration events for a planned acquisition.

BRIEF DESCRIPTION OF THE DRAWINGS

FIG. 4 is an example of a login user interface for an acquisition integration framework tool.

FIG. 7 is an example of an AIF Overview user interface.

FIG. 9 is a second portion of Business Leader integration area and deliverables checklists user interface.

FIG. 10 is an example of an integration event explanation user interface.

FIG. 13 is an intellectual property deliverables checklist.

FIG. 14 is an example of an Intellectual Property Overview user interface.

FIG. 15 is an example of an Intellectual Property "Do's and Don'ts" user interface.

FIG. 17 an example of a portion of an Intellectual Property Integration Project Plan.

FIG. 19 is an example of an Integration Progress Report user interface.

FIGS. 20 through 80 are spreadsheets listing pre-defined integration areas and a list of pre-defined integration events for each integration area.

DETAILED DESCRIPTION OF THE INVENTION

Set forth below is a description of embodiments of methods and systems for acquisition integration. The term acquisition integration, as used herein, refers to processes and systems for assimilating a newly acquired asset (e.g., a portfolio) or company with an existing asset or company. For example, acquisition integration processes and systems are utilized to incorporate a purchasing company's philosophies and operating styles into an acquired company, while realizing that the acquired company may bring "best practices" and operating philosophies that will improve the acquiring company. As used herein, the term "best practices" refers to processes and systems for performing tasks or functions that exceed the results of other known processes and systems.

While the methods and systems are sometimes described in the context of a specific acquisition, the methods and systems are not limited to practice in connection with only one particular type of acquisition. Rather, the methods and systems can be used in connection with the acquisition integration of many different types of assets and companies.

Generally, the methods and systems described below are easy to use, and facilitate clear communication and tracking of tasks performed in connection with an integration. Ease of use facilitates initiation of the acquisition integration processes early in the overall acquisition process. In addition, and as described below, the methods and systems are flexible to accommodate unique aspects of each acquisition. The methods and systems also capture the knowledge and experience gained in each acquisition, which facilitates a sharing of such knowledge and experiences with others involved in performing acquisition integration as well as enhances the repeatability of processes that are determined to be best practices.

Figure 1:
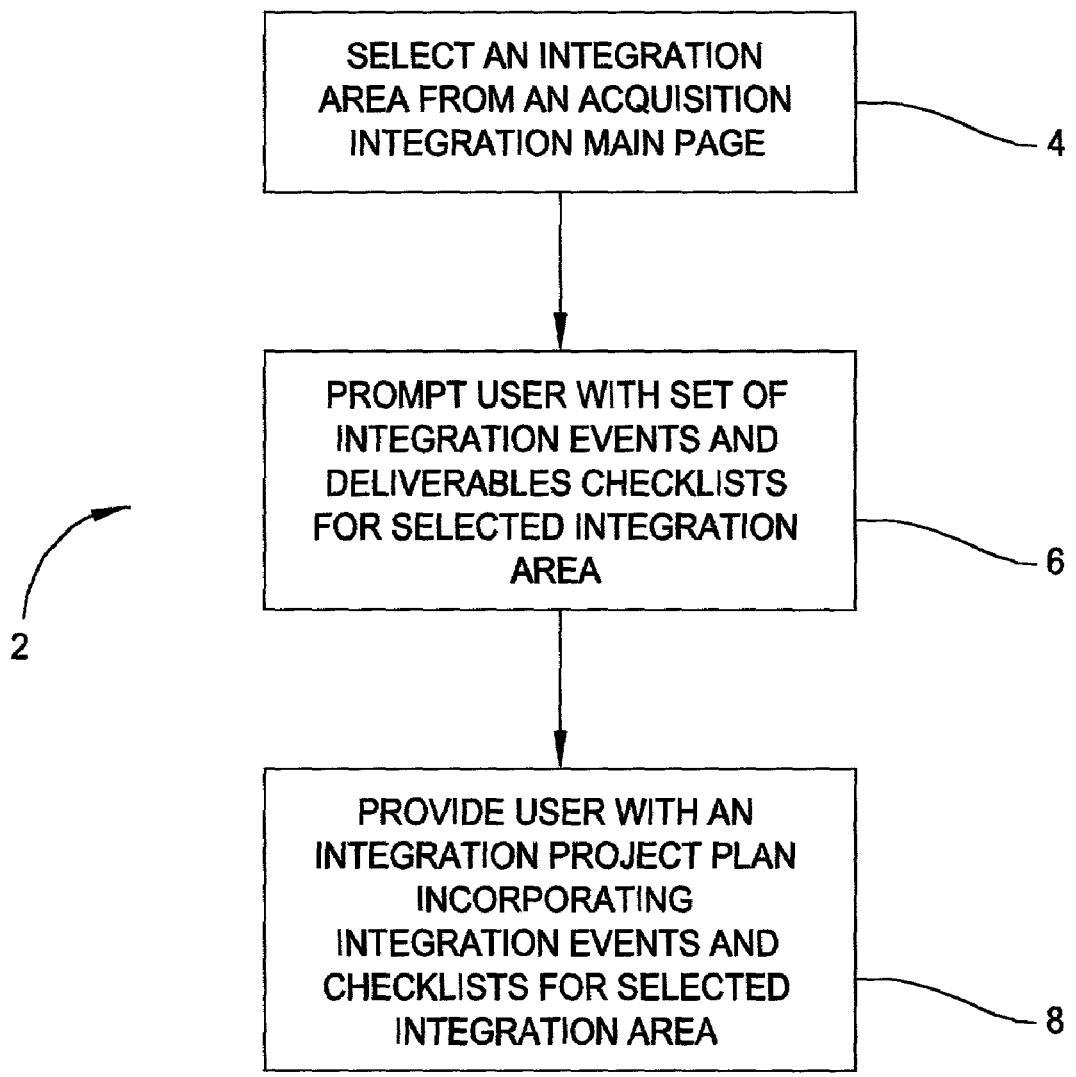
FIG. 1 is a flowchart illustrating process steps for generating a functional acquisition integration plan.

Referring now specifically to the drawings, FIG. 1 is a flowchart 2 illustrating process steps for generating an acquisition integration project plan. A person familiar with computer software code can utilize flowchart 2 in combination with various user interfaces (described below), to develop a computer program that is executable by computer systems (shown in FIGS. 2 and 3) which are described herein. In one example, a system based acquisition integration tool provides a framework for generating such a plan. Specifically, after a user logs into the system, the system prompts the user, e.g., via a display, to select 4 an integration area from an acquisition integration main user interface. Examples of pre-defined integration areas include commercial, operational, human resources, legal, and financial. Of course, fewer or more integration areas can be designated within the system. Once the user selects 4 an integration area, the system then displays 6 a set of selectable, pre-defined integration events including deliverables checklists for the selected integration area. Each integration event is listed under a respective heading, and each heading representing a phase in the acquisition process. Examples of headings include pre due diligence, due diligence, post sign/pre close, post close and transition to operations. In addition, deliverables are listed under each heading. The list of deliverables can be used to determine whether all tasks associated with a particular integration event have been completed. The acquisition integration plan is formed 8 based on the user-selected integration areas, and the plan includes, for each integration area and each phase of acquisition, integration events and deliverables.

Set forth below are details regarding example hardware architectures (FIGS. 2 and 3), and example computer generated screen shots displayed by the system to facilitate acquisition integration (FIGS. 4 through 19). In addition, a list of pre-defined integration areas and a list of pre-defined integration events are set forth in FIGS. 20 through 80. Using the pre-defined integration areas and integration events, a user, as explained below, is able to construct a customized integration plan using those areas and events the user, for example an integration manager for an upcoming acquisition integration, sees as being pertinent to their acquisition integration. Of course, best practices implemented by an acquiring company may cause certain integration areas and integration events to be required in every acquisition integration project plan. Further, a user is able to add user-defined integration areas and events to their integration, based upon specific integration needs, which, in the future, may be added to the pre-defined integration areas and integration events by a system administrator. The user is able to store their "custom" integration plan for access and use by their integration team as a spreadsheet or as a web page. The user and the integration team is thus provided with an acquisition integration plan, which is based upon pre-defined integration areas and events, which provides rigor and consistency to the acquisition integration process, and user-defined integration areas and events, which provides flexibility to the integration process. Again, although specific embodiments of methods and systems for integrating acquisitions are described herein, the methods and systems are not limited to such specific embodiments.

Hardware Architecture

Figure 2:
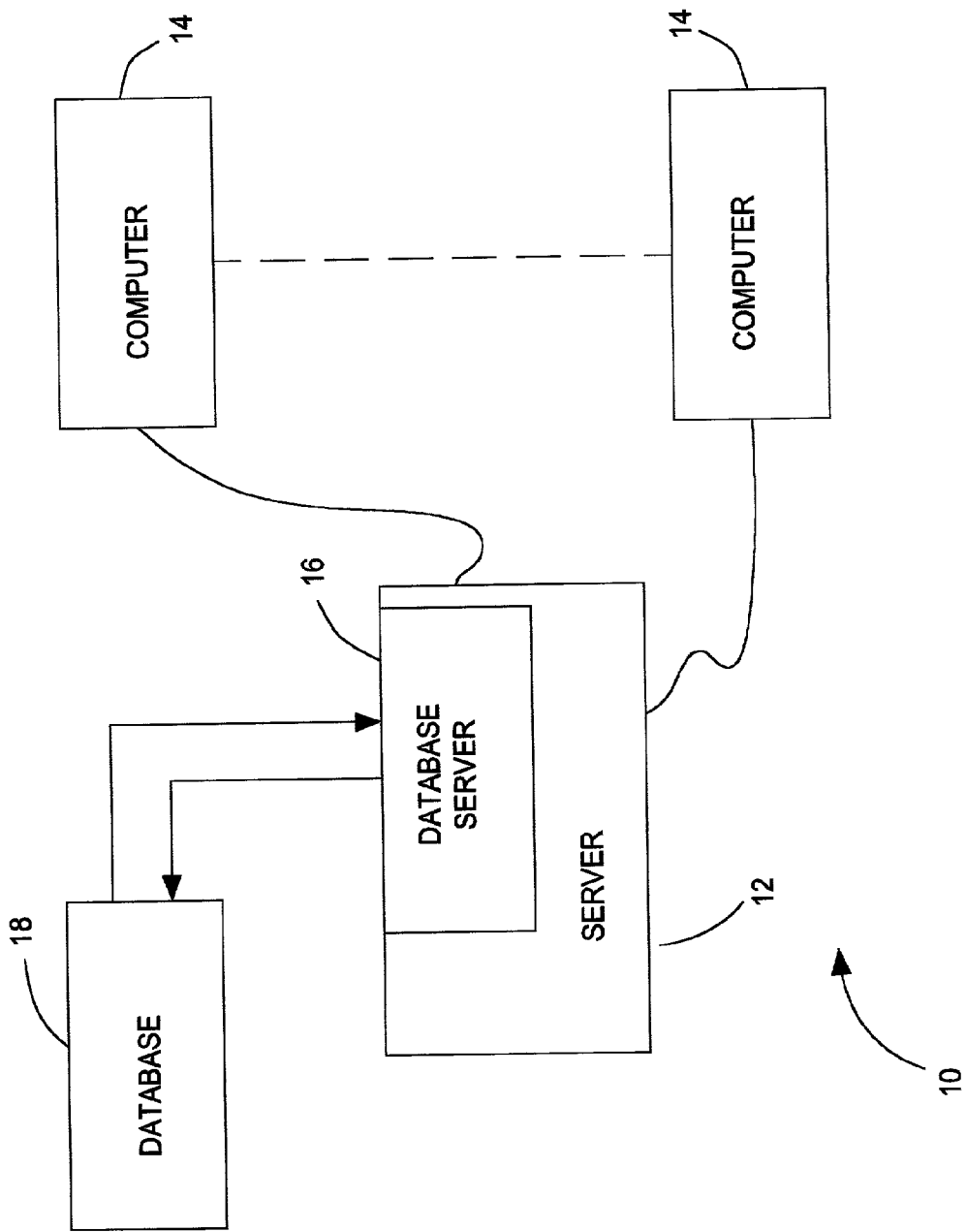
FIG. 2 is a block diagram of a system.
Figure 3:
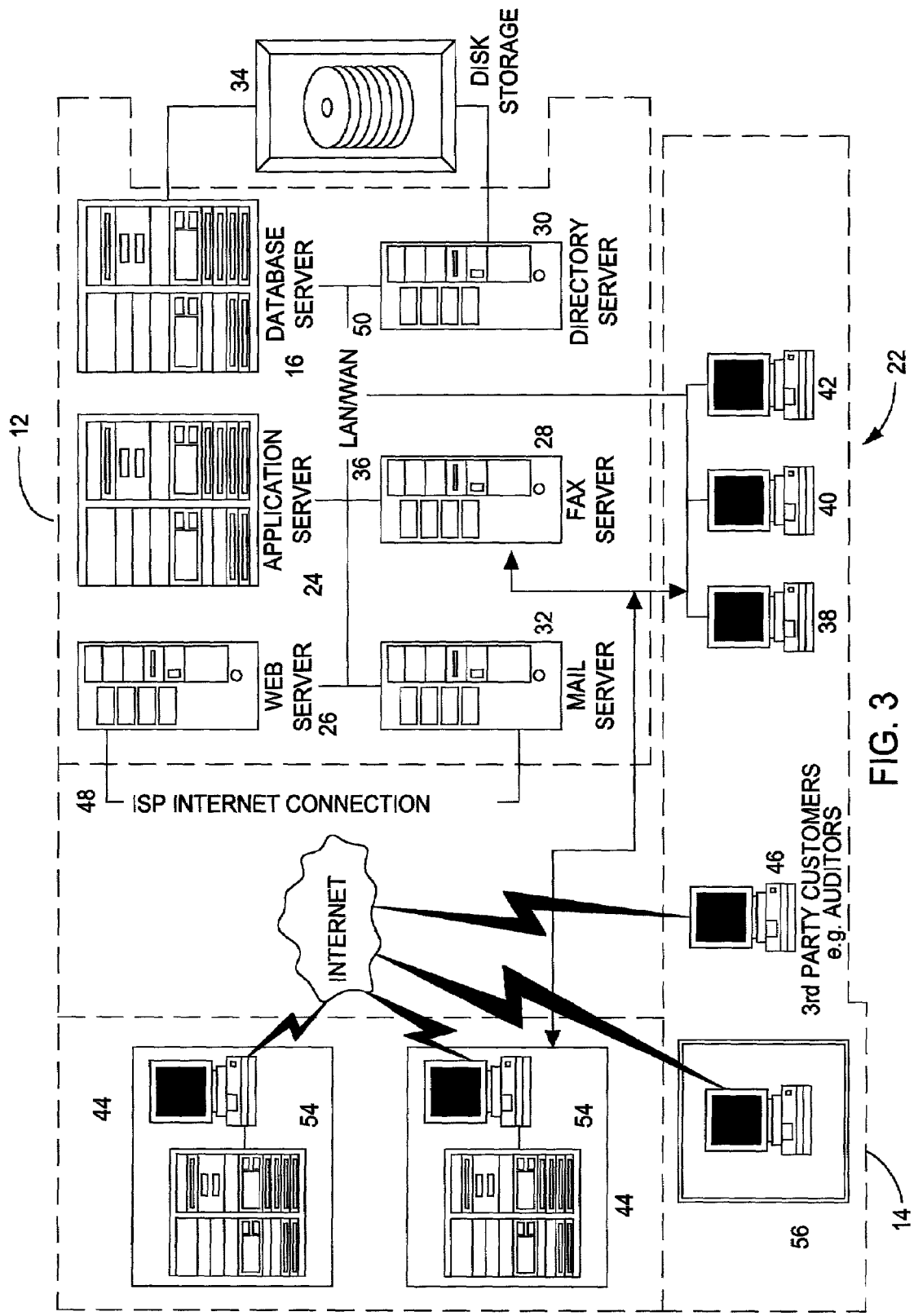
FIG. 3 is a block diagram of a network based system.

FIGS. 2 and 3 illustrate, in block diagram form, hardware architectures that can be utilized in connection with implementing an acquisition integration system. Of course, the system can be implemented on many different platforms and utilizing different architectures. The architectures illustrates in FIGS. 2 and 3, therefore, are examples only.

More specifically, FIG. 2 is a block diagram of a system 10 that includes a server sub-system 12, sometimes referred to herein as server 12, and a plurality of devices 14 connected to server 12. In one embodiment, devices 14 are computers including a web browser, and server 12 is accessible to devices 14 via a network such as an intranet or a wide area network such as the Internet. In an alternative embodiment, devices 14 are servers for a network of user devices.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 18. In one embodiment, centralized database 18 is stored on database server 16 and is accessed by potential users at one of user devices 14 by logging onto server sub-system 12 through one of user devices 14. In an alternative embodiment centralized database 18 is stored remotely from server 12.

FIG. 3 is a block diagram of a network based system 22. System 22 includes server sub-system 12 and user devices 14. Server sub-system 12 includes database server 16, an application server 24, a web server 26, a fax server 28, a directory server 30, and a mail server 32. A disk storage unit 34 incorporating a computer-readable medium is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., user, 46 via an ISP Internet connection 48. The communication in the embodiment described is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the embodiment described, any employee 44 or user 46 having a work station 52 can access server sub-system 12. One of user devices 14 includes a work station 54 located at a remote location. Work stations 52 and 54 are personal computers including a web browser. Also, work stations 52 and 54 are configured to communicate with server subsystem 12. Furthermore, fax server 28 communicates with employees 44 and users 46 located outside the business entity and any of the remotely located customer systems, including a user system 56 via a telephone link. Fax server 28 is configured to communicate with other work stations 38, 40, and 42 as well.

User Interfaces (Screen Shots)

FIG. 4 is an example of a login user interface 100 for an acquisition integration framework tool. Authorized users are able to access the acquisition framework tool by entering a valid user name and password. If a password is forgotten, a link exists where a user can notify a system administrator of the forgotten password. A link where a non-user can request an account is also supplied in the embodiment of user interface 100 shown in FIG. 4. In one embodiment, login user interface 100 includes an advisory. For example, in one embodiment, login user interface 100 includes the following advisory: "In order to become compliant with Web Security Procedures, we need to cancel generic passwords. Please take a moment and register your proper account. Meanwhile you will be added to our users distribution list, so we can keep you more effectively updated about coming AIF updates and enhancements."

Figure 5:
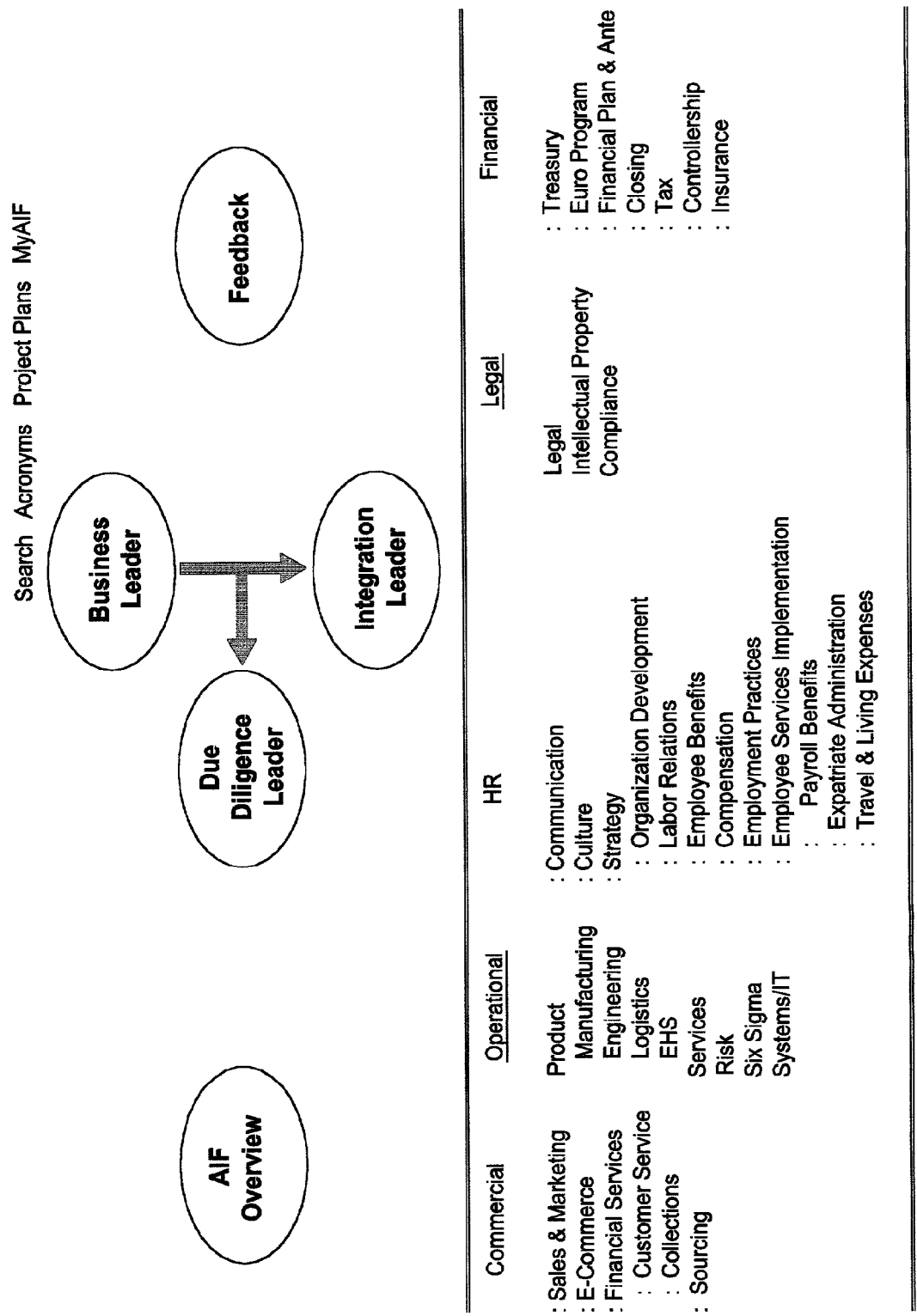
FIG. 5 is an example of a main user interface for an acquisition integration framework tool.

FIG. 5 is an example of an acquisition integration main user interface 110 for athe acquisition integration framework tool. Main user interface 110 includes headings for Commercial, Operational, Human Resources, Legal, and Financial. Under each of the headings are groupings of pre-defined integration areas, which are selectable by a user. Selection of a heading or the integration areas under a heading, causes to be displayed pre-defined integration events for the selected integration area. The display further includes a name for a person responsible for the selected integration area. In one embodiment, data corresponding to integration areas and integration events are stored within database 18 (shown in FIG. 2).

As shown on user interface 110, an example pre-defined set of integration areas that a user can select from, includes, under the Commercial heading, sales and marketing, E-commerce financial services, including customer service and collections, and sourcing. Under an Operational heading, pre-defined integration areas include product, services, risk, six sigma and systems/information technology. The term six sigma, as used herein, refers to a quality initiative for reducing the number of defects to a quantified goal (i.e., six sigma). The product integration areas includes integration areas for manufacturing, engineering, logistics, and environmental health and safety (EHS).

A human resources integration area heading includes, in the embodiment shown, pre-defined integration areas for communication, culture, and strategy, including organization development, labor relations, employee benefits, compensation, employment practices, and employee services implementation (payroll benefits, expatriate administration and travel and living expenses).

A legal integration area heading includes, in the embodiment shown, pre-defined integration areas for legal, intellectual property and compliance. A financial integration area includes treasury, Euro programs, financial planning, closing reporting, tax integration, controllership, and insurance.

Further included on user interface 110 are selectable links, selection of which provide the user with pre-defined integration events for a business leader, a due diligence leader, and an integration leader, in a graphical depiction of the relationship between those leaders. A user is further able to select an acquisition integration framework (AIF) overview or a feedback link (both described below), to provide comments to the administrator regarding system functionality.

Figure 6:
FIG. 6 is an example of a Send Feedback user interface.

FIG. 6 is an example of a Send Feedback user interface 120 for an acquisition integration framework tool, showing a comment area where a user can enter comments for storage in database 18 (shown in FIG. 2) and submission of user-defined integration areas and integration events to a system administrator.

FIG. 7 is an example of an AIF Overview user interface 130. In addition to the AIF overview shown, one embodiment of user interface 130 includes a description of the DMAIC (Define, Measure, Analyze, Implement, and Control) Integration Process, Non-Negotiables (elements that are essential for conducting business), and the Features of the AIF. Data corresponding to the AIF overview is stored within database 18, for display by system 10. AIF Overview user interface 130 describes the philosophy underlying the acquisition integration framework, and is used to inform the user about critical aspects of Acquisition Integration. In one embodiment, AIF overview user interface 130 includes a background section. For example, in one embodiment, AIF overview user interface 130 includes the background: "Acquisition Integration is defined as the 'Process of Preparing for and Assimilating a Newly Acquired Company or Portfolio into the Family'. Integration is the vehicle by which we realize the expected goals and benefits of our acquisitions. Because we do numerous acquisitions each year, integration needs to be a repeatable process. A structured approach to integration serves as a source of competitive advantage by providing a strategy for managing integration efforts from day one. In addition, the Acquisition Integration Framework tool facilitates the sharing of integration best practices and lessons learned. All of the business can benefit from the collective knowledge of our acquisition integration experiences. The AIF tool was designed to greatly increase the speed and success rate of our acquisitions by eliminating the need to 're-create the wheel' each time. One important principle to the Acquisition Integration Framework is to understand that every integration is different. While you can surely benefit and learn from past integration experience, the success factors for one effort may not be relevant to another integration initiative. Similarly, you can't expect all tolls and processes to be equally applicable to every case. So, you must carefully evaluate the objectives set out by the leadership team and the characteristics of the new company to shape and customize the optimal integration approach."

Figure 8:
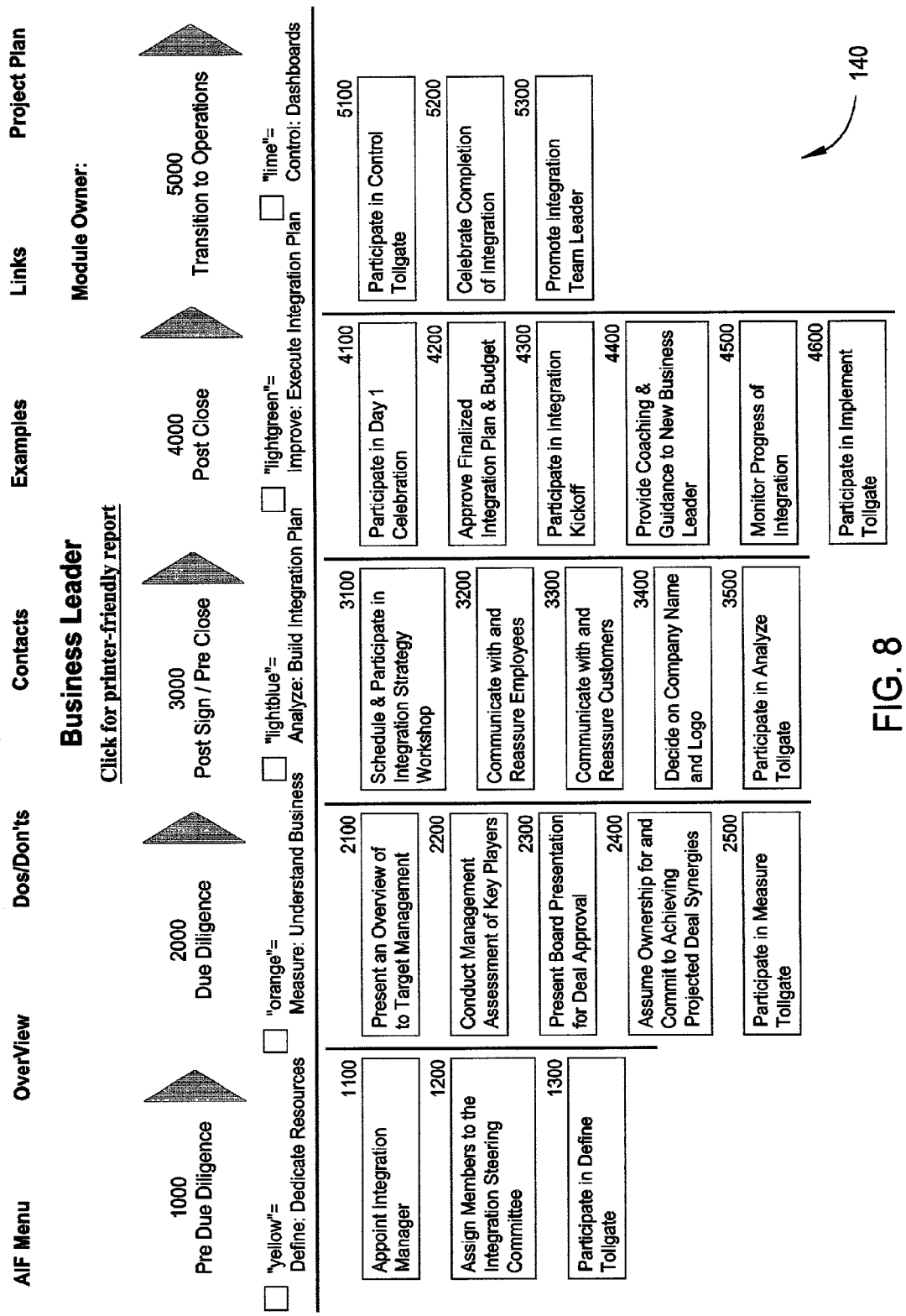
FIG. 8 is an example of a Business Leader integration area user interface.

FIGS. 8 and 9 are an example of a Business Leader integration area and deliverables checklists user interface. In a first portion 140 of the user interface, are links to AIF main user interface 110 (shown in FIG. 5), an Overview user interface, a "Do's/Don'ts" user interface, a Contacts user interface, and Examples user interface, a Links user interface and a Project Plan user interface. It should be noted that the links to the overview, "Do's and Don'ts", contacts, examples user interface, links user interface and project plan are configured for the integration area displayed. For example, selection of the "Do's and Don'ts" link in first portion 140 causes a display describing what a business leader should and should not do in an acquisition integration. More detailed descriptions of the links within an integration area are included below.

First portion 140 also includes under the Business Leader heading a graphical representation of the stages of the acquisition integration, referred to herein as headings for groupings of integration events. The headings include pre-due diligence, due diligence, post signing/pre-closing, post closing, and transition to operations topics. Listed under each of the heading topics are listed pre-defined integration events for the integration area. As will be described below, each integration event is selectable by the user, and selection of an integration event causes a screen to be displayed describing the integration event.

FIG. 9 is a second portion 150 of Business Leader integration area and deliverables checklists user interface. Second portion 150 includes under the headings described above, deliverables which are to be completed before the integration team moves to the next heading. Deliverables checklists are stored within database 18 (shown in FIG. 2). For example, before proceeding to a due diligence, the deliverables "integration leader appointed/steering committee appointed" and "participate in define tollgate" are completed in the pre due diligence stage, and checked. An example of a tollgate is a meeting or conference call to review completeness of deliverables on the checklist and determine whether the integration can proceed to the next stage, for example, pre-closing to post-closing.

FIG. 10 is an example of an integration event explanation user interface 160 which is displayed upon selection of an integration event, for example, the integration events shown in FIG. 8. In particular, user interface 160 shows a Step 2100: Present an Overview to Target Management user interface, showing advice to a manager associated with the acquisition integration and including a link to previous management presentations (described in FIG. 11). In one embodiment, user interface 160 includes the following text below the section entitled Step 2100: Present an Overview to Target Management: "At the beginning of the due diligence, the Business Leader should take the time to introduce his leadership team to the Target Company. Presenting an overview pitch on the due diligence process is helpful for the Target Company to understand what may be required of them and how the process will work. This is also terrific time to get the key members of the Target Company excited about joining the family. Giving an overview presentation on the history and its major accomplishments is recommended. Example: Management presentations." Description of the integration event is important to a person responsible for the integration event, since he or she determines completeness and updates a completion percentage for one or more integration events.

Figure 11:
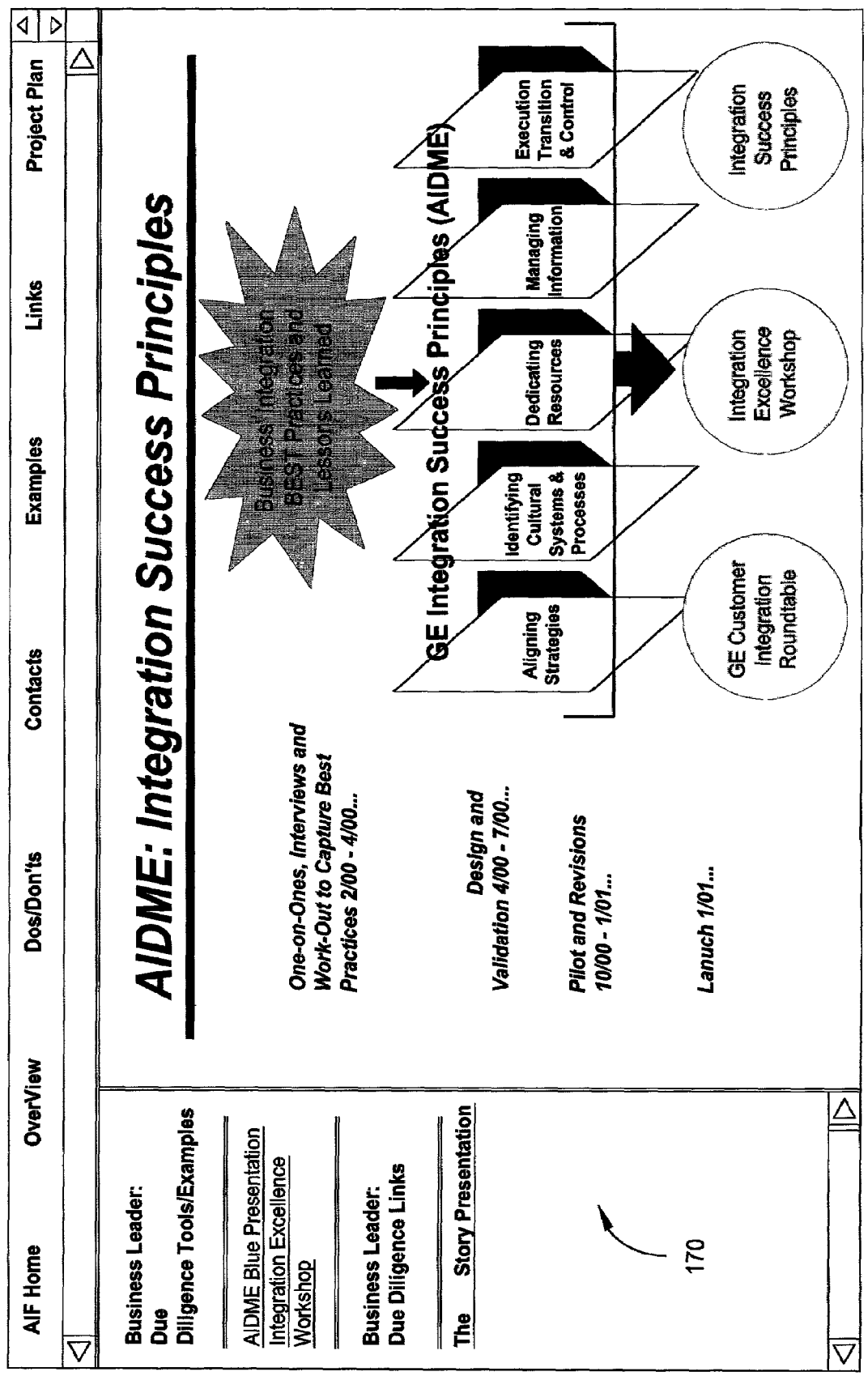
FIG. 11 is an example of a management presentations user interface.

FIG. 11 is an example of a sample presentations user interface 170, in particular a management presentation, which is displayed upon selection of a management presentations link within an integration event description. While content of a management presentation will vary from integration event to integration event, user interface 170 illustrates that sample presentations are typically attached files, for example, slide presentations, presented previously and attached to the acquisition integration tool using system 10. In one embodiment, user interface 170 includes the following text: "One-on-Ones, Interviews and Work-Out to Capture Best Practices 2/00–4/00 . . . Design and Validation 4/00–7/00 . . . Pilot and Revisions 10/00–1/01 . . . Launch 1/01 . . . ". Data corresponding to presentations and explanations of integration events are stored within database 18 (shown in FIG. 2).

Figure 12:
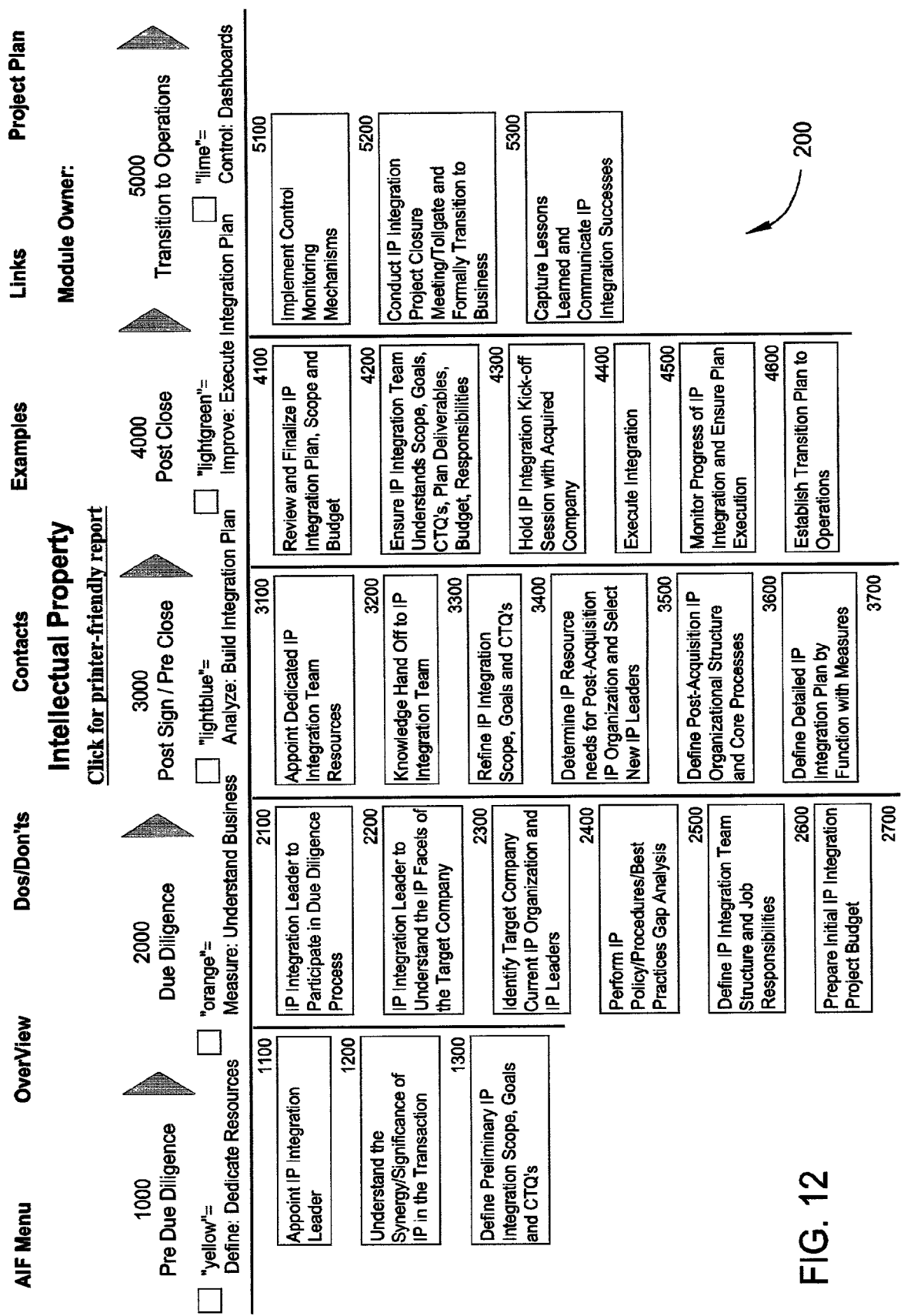
FIG. 12 is an example of an Intellectual Property integration area user interface.

FIG. 12 is an example of an Intellectual Property integration area user interface 200. As shown on user interface 200, for the intellectual property acquisition integration task, there are multiple, pre-defined integration events listed under previously described pre-due diligence, due diligence, post signing/pre-closing, post closing, and transition to operations headings. Further included on user interface 200 are links to an AIF Main user interface, an intellectual property overview user interface, an intellectual property "Do's and Don'ts" user interface, an intellectual property contacts user interface, an intellectual property examples user interface, an intellectual property links user interface and an intellectual property project plan user interface. FIG. 13 includes an intellectual property deliverables checklist 210, which is typically displayed with intellectual property integration area user interface 200. Checklist 210 includes intellectual property "deliverables" which are to be completed for each heading (e.g. pre due diligence) before proceeding to the next heading (e.g. due diligence).

FIG. 14 is an example of an Intellectual Property Overview user interface 220, describing an intellectual property acquisition integration task list which is assigned to the intellectual property integration leader. User interface 220 is accessed by selecting the overview link described in intellectual property integration area user interface 200 (shown in FIG. 12.) In one embodiment, user interface 220 includes the following text under the section entitled Intellectual Property Overview: "Effective and timely intellectual property integration includes a multitude of tasks to be performed over a period of time. IP integration is best achieved where these tasks are planned and initiated early in the acquisition time continuum. The earlier the planning, the better. For this reason, the IP integration framework described hereafter moves the planning tasks and the tasks associated with developing an effective plan and integration team, toward the front of the acquisition time continuum. For example, appointing an IP Integration Leader, performing Gap Analysis, defining an IP integration structure and preparing an initial IP integration budget have all been placed in the measure or pre-signing step. Beginning early on all these tasks facilitates IP integration. However, for any given acquisition, it may be appropriate for several reasons, to slip these tasks downstream in the acquisition time continuum. For example, some of these tasks, such as the Gap Analysis or budget, may be performed in the post-signing/pre-closing or analyze phase. The key is that they are performed. That said, however, the 'define' phase should take place prior to due diligence. From an IP integration perspective, two main objectives need to be achieved prior to commencing the due diligence: 1. An IP Integration Leader needs to be selected. 2. This IP Integration Leader needs to understand the IP aspects of the business case: What role is IP expected to play during and after the transaction? How are we going to implement the IP Objectives?" In addition, in one embodiment, user interface 220 includes the following text under the section entitled 1000 DEFINE: "He or she will be part of or lead the due diligence team and be responsible for transitioning the knowledge to the IP Integration Team. Deliverables for the define phase tollgate include: 1. IP Integration Leader appointed. 2. Scope of IP Integration—assessment of importance of IP in transaction. Define key assumptions and 'must have' underlying IP aspects of business case or synergies. 3. List of goals/CTQ's."

FIG. 15 is an example of an Intellectual Property "Do's and Don'ts" user interface 230, which provides advice to managers of the acquisition integration of a target company's intellectual property. User interface 230 provides advice regarding which actions should be taken and which actions should be avoided. In one embodiment, user interface 230 includes the following Do's: "Begin integration planning before due diligence; Understand the relevance and importance of IP to the transaction; Understand the IP health of the acquired company . . . perform a Gap Analysis; Develop strong cross functional IP integration expertise . . . legal, engineering, human resources, security and so on; Establish clear CTQ's and goals to direct the IP integration; and Involve employees from the acquired company in the integration." In addition, in one embodiment, user interface 230 includes the following Don'ts: Underestimate the cost of the IP integration; Assume existing company has the best practices, look at the best practices of the acquired company; and Don't shy away from tough decisions.

Figure 16:
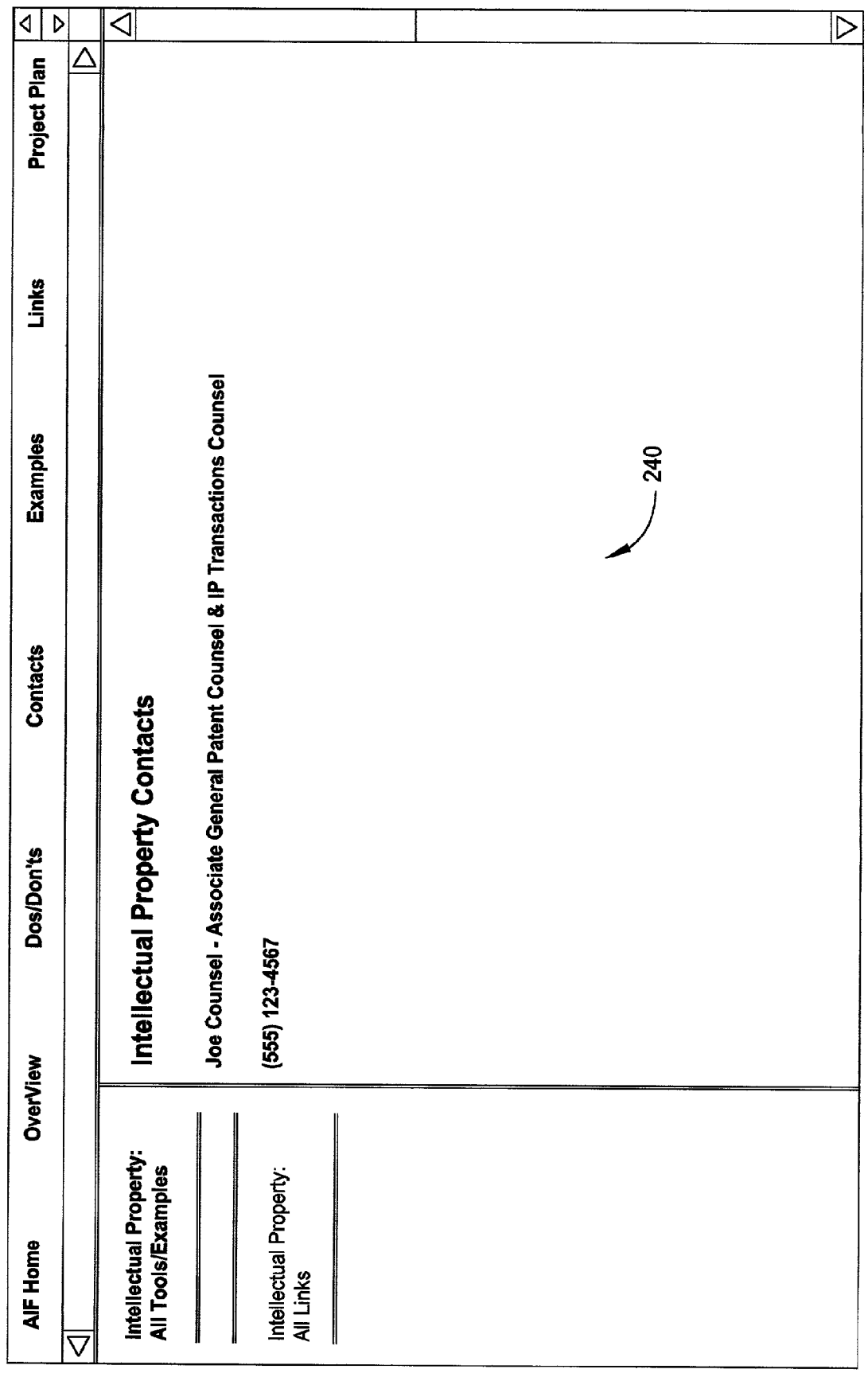
FIG. 16 is an example of an Intellectual Property contacts user interface.

FIG. 16 is an example of an Intellectual Property contacts user interface 240, showing contact information for an individual who has been designated as a source of knowledge when confronting intellectual property acquisition integration issues. In one embodiment, user interface 240 includes the name, title and phone number for an individual who has been designated as a source of knowledge. For example, in one embodiment, user interface 240 includes: "Joe Counsel—Associate General Patent Counsel and IP Transactions Counsel; (555) 123-4567."

FIG. 17 is an example of a portion of an intellectual property integration project plan 250, showing pre-defined intellectual property acquisition integration events, or tasks, to be carried out before due diligence, during due diligence, and during the post-signing/pre-closing phase. A continuation (not shown) of user interface 250 identifies the integration events which take place after closing, and during a transition to normal operations phase. In integration project plan 250 for each integration event, there is listed, a name of a person responsible for the integration event, (e.g. a responsible person), a percentage complete, a date due, and any comments relating to the integration event. User interface 250 further includes integration sub-events, not listed on user interface 200 (shown in FIG. 12), which further define the integration events to be accomplished.

Figure 18:
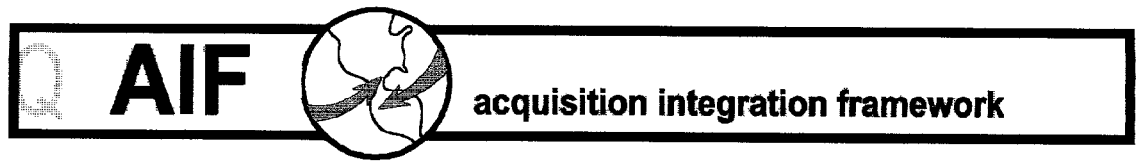
FIG. 18 is an is an example of a Search AIF user interface.

FIG. 18 is an example of a Search AIF user interface 260, where the user can search the acquisition integration tool for the occurrence of a specified term, which is entered by the user.

FIG. 19 is an example of an Integration Progress Report user interface 270, showing a percentage completion against plan with respect to each of the integration areas and headings used to group integration events. Specifically there is shown the processes relevant to integration of the acquisition, broken out by phase in the acquisition integration, including pre-due diligence, due diligence, post signing/pre-closing, post closing, and transition to operations phases.

FIGS. 20 through 80 contain an example acquisition integration plan, including pre-defined integration events, for the following pre-defined integration areas: business leader, integration manager, due diligence leader, sales/marketing, E-commerce, customer services, collections, manufacturing, engineering, logistics, EHS, services, risk management, six sigma, information technology, communication, culture, human resources (HR) strategy, HR labor relations, HR employee benefits, HR compensation, HR employment practices, payroll benefits, expatriate administration, travel and living expenses, legal, intellectual property, compliance, treasury, Euro program, financial planning, closing reporting, tax integration, controllership and insurance.

Each of the above listed acquisition integration areas are accessible from main user interface 110 (shown in FIG. 5), and selection of any of the areas causes to be displayed integration events and deliverables checklists user interfaces for the integration area (similar to those shown in FIGS. 8 and 9). Further as system 10 displays integration area and deliverables checklists user interfaces for the above listed integration areas, integration events are selectable for a displayed description of the integration event. Also, from the integration area and deliverables checklists user interfaces, overviews, "Do's and Don'ts", contacts, examples, links and project plans are selectable for viewing as above described.

Use of system 10 provides an integration team with the resources needed to perform the acquisition integration tasks involved when combining one business entity into another. System 10 provides integration resources by providing a user with a knowledge depository, (e.g. an acquisition integration database based on input from subject area knowledge experts), collected from previous integration experiences, and presented in a format to enable the user to use the gathered knowledge to provide for smoother transitions and repeatable processes when conducting an integration of an acquisition. The user is further provided a integration project management tool where they can prepare their own acquisition integration plan by selecting integration areas and events from the pre-defined integration areas and events, which the integration manager user determines is relevant to their integration of an acquisition. An integration manager uses the selected integration areas and events to provide rigor, repeatability and the benefit of stored experience to their integration process. The integration manager is also free to add user-defined areas and events, based upon individual acquisition integration needs.

While the invention has been described in terms of various specific embodiments, those skilled in the art will recognize that the invention can be practiced with modification within the spirit and scope of the claims.

What is claimed is:

1. A method performed by a computer for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said method comprising the steps of:

automatically displaying on the computer a plurality of integration areas to be selected by a user based on a type of acquisition being performed including at least one of a type of company and a type of asset being acquired, the plurality of integration areas are menu selections selectable by the user and are not entered into the computer by the user, the plurality of integration areas include commercial, operational, human resources, legal and financial;

automatically displaying on the computer a plurality of pre-defined integration events based upon the user selected integration areas, each pre-defined integration event being displayed in association with a phase in an acquisition process including a pre-due diligence phase, a due diligence phase, a post sign/pre-close phase, a post close phase, and a transition to operations phase, the plurality of pre-defined integration events are menu selections selectable by the user and are not entered into the computer by the user, the plurality of pre-defined integration events are associated with a variety of acquisition types, each of the plurality of pre-defined integration events are automatically selectable as a required integration event to be performed as part of the integration for the specific type of acquisition being performed;

displaying on the computer a detailed explanation for each pre-defined integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration, the detailed explanations are viewable by the user and are not entered into the computer by the user;

developing an acquisition integration project plan for the specific acquisition integration by prompting the user to select from the display at least one pre-defined integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process;

displaying a name of a person responsible, a due date, a completion percentage, and a commentary for each user selected, pre-defined integration event and each automatically selected, pre-defined integration event; and storing the user selected and the automatically selected integration events and the name of a person responsible, the due date, the completion percentage, and the commentary for each integration event into corresponding integration areas, as the acquisition integration project plan.

2. A method according to claim 1 further comprising the steps of:
receiving user defined integration events for the integration project;
displaying user defined integration events for the integration project; and
storing the user defined integration events within the acquisition integration project plan.

3. A method according to claim 2 wherein said step of storing the user defined integration events comprises the step of storing the user defined integration events as corresponding to at least one user defined integration area.

4. A method according to claim 3 further comprising the step of forwarding the user defined integration areas and user defined integration events to a system administrator for inclusion into the pre-defined integration areas and pre-defined integration events.

5. A method according to claim 1 wherein the acquisition integration project plan is stored in a spreadsheet format and a web page format.

6. A method according to claim 1 wherein the step of displaying a detailed explanation for each pre-defined integration event further comprises enabling a user to update the advice for performing an integration event and the at least one sample presentation relating to the integration event during an acquisition process.

7. A method according to claim 1 further comprising the step of displaying, without being entered by the user, a deliverable checklist for each integration event.

8. A computer for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said computer programmed to:

automatically display a plurality of integration areas to be selected by a user based on a type of acquisition being performed including at least one of a type of company and a type of asset being acquired, the plurality of integration areas are menu selections selectable by the user and are not entered into the computer by the user, the plurality of integration areas include commercial, operational, human resources, legal and financial;

automatically display a plurality of pre-defined integration events based upon the user selected integration areas, each pre-defined integration event being associated with a phase in an acquisition process including a pre-due diligence phase, a due diligence phase, a post sign/pre-close phase, a post close phase, and a transition to operations phase, the plurality of pre-defined integration events are associated with a variety of acquisition types including at least one of a variety of companies and assets being acquired, the plurality of pre-defined integration events are menu selections selectable by the user and are not entered into the computer by the user, each of the plurality of pre-defined integration events are automatically selectable as a required integration event to be performed as part of the integration for the specific type of acquisition being performed;

display a detailed explanation for each pre-defined integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration, the detailed explanations are viewable by the user and are not entered into the computer by the user;

develop an acquisition integration project plan for the specific acquisition integration by prompting the user to select from the display at least one pre-defined integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process;

display a name of a person responsible, a due date, a completion percentage, and a commentary for each user selected, pre-defined integration event and each automatically selected, pre-defined integration event; and store the user selected and automatically selected integration events and the name of a person responsible, the due date, the completion percentage, and the commentary for each integration event into corresponding integration areas as an acquisition integration project plan.

9. A computer according to claim 8 further programmed to:

display user defined integration events for the integration project; and store the user defined integration events within the acquisition integration project plan.

10. A computer according to claim 9 further programmed to store the user defined integration events as corresponding to at least one user defined integration area.

11. A computer according to claim 10 further programmed to forward the user defined integration areas and user defined integration events to a system administrator for inclusion into the pre-defined integration areas and pre-defined integration events.

12. A computer according to claim 8 further programmed to store the acquisition integration project plan in a spreadsheet format and a web page format.

13. A computer according to claim 8 further programmed to enable a user to update the advice for performing an integration event and the at least one sample presentation related to the integration event during an acquisition process.

14. A computer according to claim 8 further programmed to display a deliverable checklist for each integration event.

15. A system for developing an acquisition integration project plan outlining at least one process for performing an acquisition integration and providing information to perform the acquisition integration including assimilating an acquiring entity with an acquisition including at least one of a newly acquired company and a newly acquired asset including a portfolio, said system comprising:

a client system comprising a browser;

a database for storing data; and a server coupled to said client system and said database, said server programmed to:

automatically display on said client system a plurality of integration areas to be selected by a user based on a type of acquisition being performed including at least one of a type of company and a type of asset being acquired, the plurality of integration areas are menu selections selectable by the user and are not entered into the system by the user, the plurality of integration areas include commercial, operational, human resources, legal and financial;

automatically display on said client system a plurality of integration events based upon the user selected integration areas, each integration event being displayed in association with a phase in an acquisition process including a pre-due diligence phase, a due diligence phase, a post sign/pre-close phase, a post close phase, and a transition to operations phase, the plurality of integration events are menu selections selectable by the user and are not entered into the system by the user, the plurality of pre-defined integration events are associated with a variety of acquisition types, each of the plurality of integration events are automatically selectable as a required integration event to be performed as part of the integration for the specific type of acquisition being performed;

display on said client system a detailed explanation for each integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration, the detailed explanations are viewable by the user and are not entered into the computer by the user;

develop an acquisition integration project plan for the specific acquisition integration by prompting the user to select from the display at least one integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process;

display on said client system a name of a person responsible, a due date, a completion percentage, and a commentary for each user selected integration event and each automatically selected integration event; and store in the database the user selected and automatically selected integration events and the name of a person responsible, the due date, the completion percentage, and the commentary for each integration event into corresponding integration areas, as an acquisition integration project plan.

16. A system according to claim 15 wherein said database further comprises data corresponding to at least one of a name of a person responsible, a completion percentage, a due date, and a commentary for each integration event.

17. A system according to claim 15 wherein said database further comprises data corresponding to an overview of acquisition integration, and feedback received from users.

18. A system according to claim 15 wherein said database further comprises data corresponding to at least one of a deliverables checklist for each integration area and headings for integration events within an integration area of pre-due diligence, due diligence, post sign/pre-close, post close, and transition to operations.

19. A system according to claim 15 wherein said server is configured to cause a screen listing a plurality of integration areas to be displayed at the client system.

20. A system according to claim 19 wherein for an integration area, said server is configured to cause said client system to display a plurality of integration events for the integration area.

21. A system according to claim 20 wherein the integration events are sorted under headings comprising pre-due diligence, due diligence, post sign/pre-close, post close, and transition to operations.

22. A system according to claim 15 wherein said server is configured to cause a screen listing a plurality of deliverables checklists for an integration area.

23. A method for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said method comprising the steps of:

automatically displaying on an electronic interface a plurality of integration areas to be selected by a user based on a type of acquisition being performed including at least one of a type of company and a type of asset being acquired, the plurality of integration areas are menu selections selectable by the user, the plurality of integration areas include commercial, operational, human resources, legal and financial;

selecting, from the electronic interface, at least one of the plurality of integration areas;

automatically displaying on an electronic interface a plurality of integration events based on the user selected integration areas, each integration event being displayed in association with a phase in an acquisition process including a pre-due diligence phase, a due diligence phase, a post sign/pre-close phase, a post close phase, and a transition to operations phase, the plurality of integration events are menu selections selectable by the user, the plurality of integration events are associated with a variety of acquisition types, each of the plurality of integration events are automatically selectable as a required integration event to be performed as part of the integration for the specific type of acquisition being performed;

identifying, from the electronic interface, a responsible person responsible for each integration area;

identifying, from the electronic interface, at least one of a person responsible and a due date for each integration event within an integration area;

requesting, from the electronic interface, a percentage completion for each integration event;

requesting, from the electronic interface, a detailed explanation for an integration event including a description of the integration event, advice for performing the integration event, and a sample presentation relating to the integration event, the description facilitates determining the percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration; and developing an acquisition integration project plan for the specific acquisition integration by prompting the user to select from the display at least one integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

24. A method according to claim 23 wherein the integration areas comprise business leader, integration manager, due diligence leader, sales/marketing, sourcing, customer services, collections, manufacturing, engineering, environmental health and safety, services, risk management, six sigma, information technology, communication, human resources strategy, human resources labor relations, human resources employee benefits, human resources compensation, controllership, legal, intellectual property, treasury, Euro program, financial planning, closing reporting, tax integration, and insurance.

25. A method according to claim 23 further comprising the step of using the electronic interface to update the advice for performing an integration event and the at least one sample presentation relating to the integration event during an acquisition process.

26. A method according to claim 23 further comprising the step of attaching to an integration event, using the electronic interface, at least one sample presentation.

27. A method according to claim 23 further comprising the step of requesting, from the electronic interface, a deliverables checklist for an integration area.

28. A method according to claim 23 further comprising the step of entering, into the electronic interface, comments regarding an acquisition integration.

29. Apparatus for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said apparatus comprising:

means for automatically displaying on a computer a plurality of integration areas to be selected by a user based on a type of acquisition being performed including at least one of a type of company and a type of asset being acquired, the plurality of integration areas are menu selections selectable by the user, the plurality of integration areas include commercial, operational, human resources, legal and financial;

means for automatically displaying on the computer a plurality of integration events for the user selected integration areas, each integration event being displayed in association with a phase in an acquisition process including a pre-due diligence phase, a due diligence phase, a post sign/pre-close phase, a post close phase, and a transition to operations phase, the plurality of integration events are menu selections selectable by the user, the plurality of integration events are associated with a variety of acquisition types, each of the plurality of integration events are automatically selectable as a required integration event to be performed as part of the integration for the specific type of acquisition being performed;

means for displaying on the computer a detailed explanation for each integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration; and means for developing an integration acquisition project plan using the user selected and the automatically selected integration events, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

30. Apparatus according to claim 29 further comprising means for displaying a plurality of sub-events for an integration event.

31. Apparatus according to claim 29 further comprising means for displaying a name of a person responsible for each integration area.

32. Apparatus according to claim 29 further comprising means for displaying an explanation for a selected integration event.

33. Apparatus according to claim 29 further comprising means for displaying sample presentations from other integration projects.

34. Apparatus according to claim 33 wherein the sample presentations are files stored within said apparatus.

35. A computer program embodied on a computer readable medium for developing an acquisition integration project plan and for managing acquisition integration to achieve acquisition synergies, customer satisfaction and operational excellence, acquisition integration including assimilating an acquiring entity with an acquisition target including at least one of a newly acquired company and a newly acquired asset including a portfolio, said computer program comprising a code segment that:

automatically displays on the computer a plurality of integration areas to be selected by a user based on a type of acquisition being performed including at least one of a type of company and a type of asset being acquired, the plurality of integration areas are menu selections selectable by the user, the plurality of integration areas include commercial, operational, human resources, legal and financial;

automatically displays on the computer integration events associated with each user selected integration areas, each integration event associated with a phase in an acquisition process including a pre-due diligence phase, a due diligence phase, a post sign/pre-close phase, a post close phase, and a transition to operations phase, the integration events are associated with a variety of acquisition types, the integration events are menu selections selectable by the user, the plurality of integration events are associated with a variety of acquisition types, each of the plurality of integration events are automatically selectable as a required integration event to be performed as part of the integration for the specific type of acquisition being performed;

displays on the computer a detailed explanation for each integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration; and develops an acquisition integration plan for the specific acquisition integration including a set of integration events and deliverable checklists by prompting the user to select from the display at least one integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

36. A computer program according to claim 35 further comprising a code segment that allows the user to enter names of persons responsible, percentage completions, due dates, and comments for each integration event.

37. A computer program according to claim 35 further comprising a code segment that manages records pertaining to explanations for each integration event.

38. A computer program according to claim 35 further comprising a code segment that manages records pertaining to sample presentations for at least one integration event.

39. A computer program according to claim 35 further comprising a code segment that manages records pertaining to an overview of acquisition integration.

40. A computer program according to claim 35 further comprising a code segment that manages records pertaining to feedback received from users.

41. A computer program according to claim 35 further comprising a code segment that manages records pertaining to a deliverables checklist for at least one integration area.

42. A computer program according to claim 35 wherein the data is received from the user via a graphical user interface.

43. A computer program according to claim 35 further comprising a code segment that generates acquisition integration plan based on pre-stored assumptions in a database.

44. A computer program according to claim 35 further comprising a code segment that displays information through a web page downloaded by a server system.

45. A computer program according to claim 35 further comprising a code segment that:
   accesses a database;
   searches the database regarding the specific inquiry;
   retrieves information from the database; and
   causes the retrieved information to be displayed on the computer.

46. A method for operating a computer to develop an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said method comprising the steps of:
   prompting a user to select an integration area from an acquisition integration main user interface by automatically displaying a plurality of integration areas on the acquisition integration main interface, the plurality of integration areas are menu selections selectable by the user, the plurality of integration areas include commercial, operational, human resources, legal and financial;
   automatically displaying on the computer a set of user selectable and automatically selectable integration events for the user selected integration areas, each integration event being displayed in association with a phase in an acquisition process including a pre-due diligence phase, a due diligence phase, a post sign/pre-close phase, a post close phase, and a transition to operations phase, the integration events are menu selections selectable by the user, the integration events are associated with a variety of acquisition types, each of the integration events are automatically selectable as a required integration event to be performed as part of the integration for a specific type of acquisition being performed;
   displaying on the computer a detailed explanation for each integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration; and
   developing an acquisition integration project plan for the acquisition integration by prompting the user to select from the display at least one integration event for the each user selected integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

47. A method according to claim 46 wherein the acquisition integration project plan further incorporates integration sub-events for one of the integration events.

48. A method according to claim 46 further comprising the step of displaying a name of a person responsible for the selected integration area.

49. A method according to claim 46 wherein said step of displaying a set of selectable integration events further comprises the step of providing a user interface which includes an explanation for a selected integration event.

50. A method according to claim 49 wherein the explanation for a selected integration event comprises sample presentations from other acquisition integration projects.

51. A method according to claim 50 wherein the sample presentations are files stored within the computer.

52. A method according to claim 46 wherein each selectable integration event is displayed under at least one of a plurality of headings, the headings comprising pre-due diligence, due diligence, post sign/pre-close, post close, and transition to operations.

53. A method according to claim 46 wherein said step of prompting a user to select an integration area comprises the step of displaying an integration area list which comprises business leader, integration manager, due diligence leader, sales/marketing, E-commerce, customer services, collections, manufacturing, engineering, logistics, environmental health and safety, services, risk management, six sigma, information technology, communication, culture, human resources (HR) strategy, HR labor relations, HR employee benefits, HR compensation, HR employment practices, payroll benefits, expatriate administration, travel and living expenses, legal, intellectual property, compliance, treasury, Euro program, financial planning, closing reporting, tax integration, controllership and insurance.

54. A computer for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said computer programmed to:
   prompt a user to select an integration area from a computer generated screen configured as an acquisition integration main user interface by automatically displaying on the acquisition integration main user interface a plurality of integration areas, the plurality of integration areas are menu selections selectable by a user, the plurality of integration areas include commercial, operational, human resources, legal and financial;
   automatically display on the computer a set of selectable integration events for the selected integration area, each integration event being displayed in association with a phase in an acquisition process including a pre-due diligence phase, a due diligence phase, a post sign/pre-close phase, a post close phase, and a transition to operations phase, the integration events are menu selections selectable by the user, the integration events are associated with a variety of acquisition types, each of the integration events are automatically selectable as a required integration event to be performed as part of the integration for a specific type of acquisition being performed;

display on the computer a detailed explanation for each integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition integration; and develop an acquisition integration project plan by prompting the user to select from the display at least one integration event for the user selected integration areas, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

55. A computer according to claim 54 further programmed to incorporate integration sub-events for one or more of the integration events within the integration project plan.

56. A computer according to claim 54 wherein for an integration area, said computer displays a computer generated screen with a name of a person responsible for the selected integration area.

57. A computer according to claim 54 wherein for a selected integration event, said computer is programmed to display a computer generated screen providing the user with an explanation of the selected integration event.

58. A computer according to claim 57 wherein the explanation for an integration event comprises sample presentations from other integration projects.

59. A computer according to claim 58 wherein said sample presentations are files stored within said computer.

60. A computer according to claim 54 wherein to display selectable integration events, said computer displays a computer generated screen listing the selectable integration events under headings comprising pre-due diligence, due diligence, post sign/pre-close, post close, and transition to operations.

61. A computer according to claim 54 configured with an integration area list which comprises business leader, integration manager, due diligence leader, sales/marketing, E-commerce, customer services, collections, manufacturing, engineering, logistics, environmental health and safety, services, risk management, six sigma, information technology, communication, culture, human resources (HR) strategy, HR labor relations, HR employee benefits, HR compensation, HR employment practices, payroll benefits, expatriate administration, travel and living expenses, legal, intellectual property, compliance, treasury, Euro program, financial planning, closing reporting, tax integration, controllership and insurance.

62. A computer-readable medium for developing an acquisition integration project plan outlining at least one process for performing an acquisition integration and providing information to perform the acquisition integration, the acquisition integration including assimilating an acquiring entity with an acquisition target including at least one of a newly acquired company and a newly acquired asset including a portfolio, said computer-readable medium executable by a computer for controlling the computer to:

automatically display on the computer a plurality of pre-defined integration areas to be selected by a user based on a type of acquisition being performed including at least one of a type of company and a type of asset being acquired, the plurality of pre-defined integration areas are menu selections selectable by the user, the plurality of integration areas include commercial, operational, human resources, legal and financial;

automatically display on the computer a plurality of pre-defined integration events based upon the user selected integration areas, each pre-defined integration event being displayed in association with a phase in an acquisition process including a pre-due diligence phase, a due diligence phase, a post sign/pre-close phase, a post close phase, and a transition to operations phase, the plurality of pre-defined integration events are menu selections selectable by the user, the plurality of pre-defined integration events are associated with a variety of acquisition types, each of the plurality of pre-defined integration events are automatically selectable as a required integration event to be performed as part of the integration for the specific type of acquisition being performed;

display on the computer a detailed explanation for each selected pre-defined integration event including a description of the integration event, advice for performing the integration event, and a sample presentation relating to the integration event, the description facilitates determining a percentage of completion of the integration event, the advice is based on prior acquisition integrations and provides guidance to a person responsible for performing the integration event on how to accomplish the integration event, the sample presentation includes an attached file including data previously presented by the acquiring entity as part of a prior acquisition processes integration; and develop an acquisition integration plan for the specific acquisition integration by prompting the user to select from the display at least one integration event for each user selected, pre-defined integration area, the acquisition integration project plan includes the user selected integration events and any automatically selected integration events to be performed as part of the acquisition including the integration events to be performed during the pre-due diligence phase of the acquisition process, the due diligence phase of the acquisition process, the post sign/pre-close phase of the acquisition process, the post close phase of the acquisition process, and the transition to operations phase of the acquisition process, the acquisition integration project plan outlines the integration events to be performed in a recommended sequential order from the pre-due diligence phase of the acquisition process through the transition to operations phase of the acquisition process.

63. A computer-readable medium according to claim 62 wherein the computer is further controlled to:

receive user defined integration areas and user defined integration events; and incorporate the user defined integration areas and user defined integration events into the generated acquisition integration plan.

64. A computer-readable medium according to claim 62 wherein the computer is further controlled to display the generated acquisition integration plan in a spreadsheet format and a web page format.

65. A computer-readable medium according to claim 62 wherein the computer is further controlled to store user feedback on said medium.

66. A computer-readable medium according to claim 62 wherein the computer is further controlled to:

group integration events for at least one integration area under headings of pre-due diligence, due diligence, post sign/pre-close, post close and transition to operations; and receive a completion percentage for each heading for each integration area.

67. A computer-readable medium according to claim 66 wherein the computer further controlled to display the completion percentages for all integration areas within an acquisition integration project plan in a spreadsheet format.

* * * * *